US009338474B2

(12) United States Patent
Chen et al.

(10) Patent No.: US 9,338,474 B2
(45) Date of Patent: *May 10, 2016

(54) REFERENCE PICTURE LIST CONSTRUCTION FOR VIDEO CODING

(71) Applicant: QUALCOMM Incorporated, San Diego, CA (US)

(72) Inventors: Ying Chen, San Diego, CA (US); Ye-Kui Wang, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 431 days.

This patent is subject to a terminal disclaimer.

(21) Appl. No.: 13/622,931

(22) Filed: Sep. 19, 2012

(65) Prior Publication Data
US 2013/0077685 A1 Mar. 28, 2013

Related U.S. Application Data

(60) Provisional application No. 61/538,787, filed on Sep. 23, 2011, provisional application No. 61/539,433, filed on Sep. 26, 2011, provisional application No. 61/542,034, filed on Sep. 30, 2011.

(51) Int. Cl.
H04N 7/32 (2006.01)
H04N 7/12 (2006.01)
(Continued)

(52) U.S. Cl.
CPC .............. *H04N 19/58* (2014.11); *H04N 19/105* (2014.11); *H04N 19/174* (2014.11); *H04N 19/176* (2014.11); *H04N 19/463* (2014.11); *H04N 19/70* (2014.11)

(58) Field of Classification Search
CPC .................. H04N 19/00551; H04N 19/00884; H04N 19/00278; H04N 19/00272; H04N 19/00024; H04N 19/00727
USPC ..................................................... 375/240.14
See application file for complete search history.

(56) References Cited

U.S. PATENT DOCUMENTS 7,149,247 B2 12/2006 Sullivan
7,253,831 B2 8/2007 Gu
(Continued)

FOREIGN PATENT DOCUMENTS

JP 2004274732 A 9/2004
JP 2005516496 A 6/2005
(Continued)

OTHER PUBLICATIONS

Bross, et al., High Efficiency Video Coding (HEVC) text specification draft 10 (for FDIS & Last Call), Joint Collaborative Team on Video Coding (JCT-VC) of ITU-T SG16 WP3 and ISO/IEC JTC1/SC29/WG11, 12th Meeting: Geneva, CH, Jan. 14-23, 2013, Document JCTVC-L1003_v34, 310 pp.
(Continued)

Primary Examiner — Hee-Yong Kim
(74) Attorney, Agent, or Firm — Shumaker & Sieffert, P.A.

(57) ABSTRACT

Techniques are described related to modifying an initial reference picture list. The example techniques may identify a reference picture in at least one of the reference picture subsets used to construct the initial reference picture. The example techniques may list the identified reference picture in a current entry of the initial reference picture list to construct a modified reference picture list.

27 Claims, 10 Drawing Sheets

(51) Int. Cl.
*H04N 7/26* (2006.01)
*H04N 19/58* (2014.01)
*H04N 19/105* (2014.01)
*H04N 19/176* (2014.01)
*H04N 19/70* (2014.01)
*H04N 19/463* (2014.01)
*H04N 19/174* (2014.01)

(56) References Cited

U.S. PATENT DOCUMENTS

| | | |
|---|---|---|
| 7,430,361 B2 | 9/2008 | Roelens |
| 7,492,387 B2 | 2/2009 | Yang et al. |
| 7,495,587 B2 | 2/2009 | Bae |
| 7,782,903 B2 | 8/2010 | Yousef |
| 7,782,950 B2 | 8/2010 | Jeon et al. |
| 7,801,223 B2 | 9/2010 | Winger |
| 7,869,501 B2 | 1/2011 | Park et al. |
| 8,036,272 B2 | 10/2011 | Suzuki |
| 8,073,059 B2 | 12/2011 | Lim et al. |
| 8,175,154 B2 | 5/2012 | Luthra |
| 8,194,741 B2 | 6/2012 | Yang et al. |
| 8,582,649 B2 | 11/2013 | Nakaishi et al. |
| 8,693,539 B2 | 4/2014 | Lim et al. |
| 9,106,927 B2 | 8/2015 | Wang et al. |
| 2004/0161033 A1 | 8/2004 | Notoya et al. |
| 2004/0190606 A1 | 9/2004 | Deshpande |
| 2004/0218668 A1* | 11/2004 | Hannuksela et al. .... 375/240.01 |
| 2005/0123056 A1 | 6/2005 | Wang et al. |
| 2005/0201471 A1 | 9/2005 | Hannuksela et al. |
| 2006/0083298 A1 | 4/2006 | Wang et al. |
| 2006/0294171 A1 | 12/2006 | Bossen et al. |
| 2007/0086521 A1 | 4/2007 | Wang et al. |
| 2007/0168644 A1 | 7/2007 | Hummel et al. |
| 2007/0183499 A1 | 8/2007 | Kimata et al. |
| 2007/0206673 A1 | 9/2007 | Cipolli et al. |
| 2007/0247549 A1 | 10/2007 | Jeong et al. |
| 2008/0117985 A1 | 5/2008 | Chen et al. |
| 2008/0137742 A1 | 6/2008 | Chen et al. |
| 2008/0165860 A1 | 7/2008 | Sahraoui et al. |
| 2008/0232467 A1 | 9/2008 | Iguchi et al. |
| 2008/0260034 A1 | 10/2008 | Wang et al. |
| 2008/0301742 A1 | 12/2008 | Hannuksela et al. |
| 2008/0317138 A1 | 12/2008 | Jia |
| 2009/0003445 A1 | 1/2009 | Ying et al. |
| 2009/0003447 A1 | 1/2009 | Christoffersen et al. |
| 2009/0080533 A1 | 3/2009 | Folta et al. |
| 2009/0150620 A1 | 6/2009 | Paver et al. |
| 2009/0168805 A1 | 7/2009 | Sullivan et al. |
| 2009/0168886 A1 | 7/2009 | Ikeda et al. |
| 2009/0220010 A1 | 9/2009 | Park et al. |
| 2009/0238261 A1 | 9/2009 | Bhavani et al. |
| 2009/0238269 A1* | 9/2009 | Pandit et al. ............. 375/240.12 |
| 2009/0257497 A1 | 10/2009 | Kazui |
| 2009/0262804 A1 | 10/2009 | Pandit et al. |
| 2009/0279608 A1 | 11/2009 | Jeon et al. |
| 2009/0296811 A1* | 12/2009 | Jeon et al. ................ 375/240.12 |
| 2009/0297051 A1 | 12/2009 | Nonaka et al. |
| 2009/0304068 A1 | 12/2009 | Pandit et al. |
| 2010/0020870 A1 | 1/2010 | Jeon et al. |
| 2010/0046619 A1* | 2/2010 | Koo et al. ................ 375/240.12 |
| 2010/0074340 A1 | 3/2010 | Luo et al. |
| 2010/0091845 A1 | 4/2010 | Jeon et al. |
| 2010/0118933 A1 | 5/2010 | Pandit et al. |
| 2010/0135385 A1 | 6/2010 | Park et al. |
| 2010/0158120 A1 | 6/2010 | Fang et al. |
| 2010/0189173 A1 | 7/2010 | Chen et al. |
| 2010/0189182 A1 | 7/2010 | Hannuksela |
| 2010/0238822 A1 | 9/2010 | Koyabu et al. |
| 2010/0262711 A1 | 10/2010 | Bouazizi |
| 2010/0266042 A1 | 10/2010 | Koo et al. |
| 2010/0316121 A1 | 12/2010 | Tsai et al. |
| 2011/0013889 A1 | 1/2011 | Wu et al. |
| 2011/0032999 A1 | 2/2011 | Chen et al. |
| 2011/0080949 A1 | 4/2011 | Takahashi et al. |
| 2011/0090957 A1 | 4/2011 | Liao et al. |
| 2011/0096835 A1 | 4/2011 | Lim et al. |
| 2011/0142130 A1 | 6/2011 | Lin et al. |
| 2011/0200112 A1 | 8/2011 | Won et al. |
| 2011/0246659 A1 | 10/2011 | Bouazizi |
| 2012/0069903 A1 | 3/2012 | Lim et al. |
| 2012/0185570 A1 | 7/2012 | Bouazizi et al. |
| 2012/0230401 A1 | 9/2012 | Chen et al. |
| 2012/0230409 A1 | 9/2012 | Chen et al. |
| 2012/0230433 A1 | 9/2012 | Chen et al. |
| 2012/0320984 A1 | 12/2012 | Zhou |
| 2013/0077678 A1 | 3/2013 | Chen et al. |
| 2013/0077679 A1 | 3/2013 | Wang et al. |
| 2013/0077680 A1 | 3/2013 | Wang et al. |
| 2013/0077681 A1 | 3/2013 | Chen et al. |
| 2013/0077685 A1 | 3/2013 | Chen et al. |
| 2013/0077687 A1 | 3/2013 | Wang et al. |
| 2013/0107953 A1 | 5/2013 | Chen et al. |
| 2014/0233647 A1 | 8/2014 | Hendry et al. |

FOREIGN PATENT DOCUMENTS

| | | |
|---|---|---|
| JP | 2006519517 A | 8/2006 |
| JP | 2007067842 A | 3/2007 |
| JP | 2007184791 A | 7/2007 |
| JP | 2008219204 A | 9/2008 |
| JP | 2009060402 A | 3/2009 |
| JP | 2009512306 A | 3/2009 |
| JP | 2009260736 A | 11/2009 |
| JP | 2009290389 A | 12/2009 |
| JP | 2009296078 A | 12/2009 |
| JP | 2009543508 A | 12/2009 |
| JP | 2010516103 A | 5/2010 |
| JP | 2010219983 A | 9/2010 |
| KR | 1020060081970 A | 7/2006 |
| KR | 20080041972 A | 5/2008 |
| KR | 20080066784 A | 7/2008 |
| RU | 2326505 C2 | 6/2008 |
| RU | 2406253 C2 | 12/2010 |
| RU | 2409006 C1 | 1/2011 |
| RU | 2414092 C2 | 3/2011 |
| TW | 200829034 A | 7/2008 |
| WO | 2004088988 A1 | 10/2004 |
| WO | 2006075635 A1 | 7/2006 |
| WO | 2007018669 A1 | 2/2007 |
| WO | 2007114612 A1 | 10/2007 |
| WO | 2008007913 A1 | 1/2008 |
| WO | 2008047304 A1 | 4/2008 |
| WO | 2008047316 A1 | 4/2008 |
| WO | 2008085935 A1 | 7/2008 |
| WO | 2009130561 A1 | 10/2009 |
| WO | 2010109904 A1 | 9/2010 |
| WO | 2013002700 A1 | 1/2013 |

OTHER PUBLICATIONS

Bross, et al. "WD4: Working Draft 4 of High-Efficiency Video Coding," JCTVC-F803_d2, 6th Meeting, Torino; Jul. 14, 2011-Jul. 22, 2011; (Motion Picture Expert Group or ISO/IEC JTC1/SC29/WG11), No. m21449.

Bross, et al., "High Efficiency Video Coding (HEVC) text specification draft 9," Joint Collaborative Team on Video Coding (JCT-VC) of ITU-T SG16 WP3 and ISO/IEC JTC1/SC29/WG11, 11th Meeting: Shanghai, CN, Oct. 10-19, 2012, JCTVC-K1003_v7, 290 pp.

International Preliminary Report on Patentability—PCT/US2012/056362, The International Bureau of WIPO—Geneva, Switzerland, Jan. 20, 2014, 12 pp.

ITU-T H.265, Series H: Audiovisual and Multimedia Systems, Infrastructure of audiovisual services—Coding of moving video, High efficiency video coding, The International Telecommunication Union, Apr. 2013, 317 pp.

Wiegand et al., "WD1: Working Draft 1 of High-Efficiency Video Coding", JCTVC-C403, 3rd Meeting: Guangzhou, CN, Oct. 7-15, 2010, 137 pp.

Wiegand et al., "WD2: Working Draft 2 of High-Efficiency Video Coding," JCTVC-D503, Jan. 20-28, 2011, 153 pp.

(56) References Cited

OTHER PUBLICATIONS

Wiegand et al., "WD3: Working Draft 3 of High-Efficiency Video Coding," Document JCTVC-E603, 5th Meeting: Geneva, CH, Mar. 16-23, 2011,193 pp.
Bross et al., "WD4: Working Draft 4 of High-Efficiency Video Coding," 6th Meeting: JCTVC-F803_d2, Torino, IT, Jul. 14-22, 2011, 226 pp.
Bross et al., "WD5: Working Draft 5 of High-Efficiency Video Coding," 7th Meeting: Geneva, Switzerland, Nov. 2011, JCTVC-G1103_d2, 214 pp.
Bross et al., "High efficiency video coding (HEVC) text specification draft 6," 7th Meeting: Geneva, CH, Nov. 21-30, 2011, JCTVC-H1003, 259 pp.
Bross et al., "High efficiency video coding (HEVC) text specification draft 7," 9th Meeting: Geneva, CH, Apr. 27-May 7, 2012, JCTVC-I1003_d21, 290 pp.
Bross et al., "High efficiency video coding (HEVC) text specification draft 8," 10th Meeting: Stockholm, SE, Jul. 11-20, 2012, JCTVC-J1003_d7, 261 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
Sjoberg et al., "Absolute signaling of reference pictures," 6th Meeting: Torino, IT, Jul. 2011, Document: JCTVC-F493, 15 pp.
Wenger et al., "Adaptation Parameter Set (APS)," JCTVC-F747r3, 6th Meeting: Torino, IT, Jul. 14-22, 2011, 10 pp.
U.S. Appl. No. 13/623,768, by Ying Chen, filed Sep. 20, 2012.
U.S. Appl. No. 13/622,928, by Ye-Kui Wang, filed Sep. 19, 2012.
U.S. Appl. No. 13/622,961, by Ye-Kui Wang, filed Sep. 19, 2012.
U.S. Appl. No. 13/622,929, by Ye-Kui Wang, filed Sep. 19, 2012.
U.S. Appl. No. 13/622,944, by Ying Chen, filed Sep. 19, 2012.
U.S. Appl. No. 13/622,972, by Ye-Kui Wang, filed Sep. 19, 2012.
U.S. Appl. No. 13/664,279, by Ying Chen, filed Oct. 30, 2012.
Flynn et al., "JCT-VC AHG report: Reference picture buffering and list construction (AHG21)," Document No. JCTVC-G021, 7th Meeting, Geneva, CH, Nov. 21-30, 2011, 9 pp.
Hannuksela et al., "AHG21: On reference picture list construction and reference picture marking," Document No. JCTVC-G643, 7th Meeting, Geneva, CH, Nov. 21-30, 2011, 10 pp.
Hannuksela "Signaling of "Clean" Random Access Positions," Document No. JCT-C083, 3rd Meeting, Fairfax, Virginia, May 6-10, 2002, 6 pp.
Hannuksela, "POC Issues," Document No. JVT-F044, 6th Meeting, Awaji Island, JP, Dec. 5-13, 2002, 10 pp.
Shen et al., "Buffer requirement analysis and reference picture marking for temporal scalable video coding", Packet Video, Nov. 1, 2007, pp. 91-97.
Sjöberg et al., "AHG21: Long-term pictures and pruning of reference picture sets," Document No. JCTVC-G637, 7th Meeting, Geneva, CH, Nov. 21-30, 2011, 3 pp.
Sjöberg et al., "Proposed changes to the HEVC Working Draft," Joint Collaborative Team on Video Coding, attachment to JCTVC-F493, Jul. 14-22, 2011, 28 pp.

Tan et al., "Clean Decoding Refresh Definition and Decoding Process," Document No. JCTVC-F381, 6th Meeting, Torino, IT, Jul. 14-22, 2011, 3 pp.
Wahadaniah et al., "AHG21: Construction and modification of predefined reference picture sets and reference picture lists," Document No. JCTVC-G548, 7th Meeting,Geneva, CH, Nov. 12-30, 2011, 21 pp.
Wang et al., "AHG21: On DPB management," Document No. JCTVC-G314, 7th Meeting, Geneva, CH, Nov. 21-30, 2011, 7 pp.
Wang et al., "On reference picture list construction," Document No. JCTVC-D081, 4th Meeting, Daegu, KR, Jan. 20-28, 2011, 3 pp.
Webb "HRD Conformance for Real-time H.264 Video Encoding", Image Processing, IEEE International Conference , Sep. 1, 2007, pp. V-305-V-308.
International Search Report and Written Opinion from application No. PCT/US2012/056362 dated Jan. 30, 2013, 16 pp.
International Search Report and Written Opinion from application No. PCT/US2012/056362 dated Sep. 18, 2013, 7 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
Hsu, Chih-Wei, et al., "Unified Syntax of Reference Picture List Reordering," Document: JCTVC-E053, Geneva, CH, Mar. 16-23, 2011, 4 pp.
Chen et al., "AHG15: Conforming bitstreams starting with CRA pictures", 7. JCT-VC Meeting; 98. MPEG Meeting; Nov. 21, 2011-Nov. 30, 2011; Geneva; (Joint Collaborative Team on Video Coding of ISO/IEC JTC1/SC29/WG11 and ITU-T SG. 16); URL: http://wftp3.itu.int/av-arch/jctvc-site/, No. JCTV-G319, Nov. 9, 2011, XP030110303, pp. 1-6.
Taiwan Search Report from Taiwanese Application No. TW101134813, dated May 20, 2015.
Wang Y.K., et al., "On CDR Picture", Joint Collaborative Team on Video Coding (JCT-VC) of ITU-T SG16 WP3 and ISO/IEC JTC1/SC29/WG11 6th Meeting: Torino, IT, Jul. 1, 2011, JCTVC-F464, pp. 1-3.
Wang Y.K., et al., "On reference picture marking", Joint Collaborative Team on Video Coding (JCT-VC) of ITU-T SG16 WP3 and ISO/IEC JTC1/SC29/WG1, 6th Meeting: Torino, IT, Jul. 22, 2011, [JCTVC-F462], pp. 1-3.
Wang Y.K., et al., "POC Recovery in Random Access Point SEI Message", Joint Video Team (JVT) of ISO/IEC MPEG & ITU-T VCEG (ISO/IEC JTC1/SC29/WG11 and ITU-T SG16 Q.6) 6th Meeting: Awaji, Island, JP, Dec. 13, 2002, JCT-F050, pp. 1-5.
Wang Y.L., et al., "AHG21: On DPB management", Joint Collaborative Team on Video Coding (JCT-VC) of ITU-T SG16 WP3 and ISO/IEC JTC1/SC29/WG11 7th Meeting: Geneva, CH, Nov. 23, 2011, JCTVC-G314, pp. 1-7.
Wiegand T., "Editor's Proposed Draft Text Modifications for Joint Video Specification (ITU-T Rec. H.264 | ISO/IEC 14496-10 AVC), Geneva modifications draft 37", Joint Video Team (JVT) of ISO/IEC MPEG and ITU-T VCEG 5th Meeting: Geneva, Switzerland, Oct. 17, 2002, JVT-E146d37, pp. i, 57-63.

\* cited by examiner

REFERENCE PICTURE LIST CONSTRUCTION FOR VIDEO CODING

REFERENCE PICTURE LIST CONSTRUCTION FOR VIDEO CODING

This application claims the benefit of:
U.S. Provisional Application No. 61/538,787, filed Sep. 23, 2011;
U.S. Provisional Patent Application No. 61/539,433, filed on Sep. 26, 2011; and
U.S. Provisional Patent Application No. 61/542,034, filed on Sep. 30, 2011, the entire contents each of which is incorporated by reference in its entirety.

TECHNICAL FIELD

This disclosure relates to video coding and, more particularly, to techniques for coding video data.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video picture or a portion of a video picture) may be partitioned into video blocks, which may also be referred to as treeblocks, coding tree blocks (CTBs), coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques related to deriving a reference picture set for use in video coding. For example, the reference picture set may constitute a combination of a plurality of reference picture subsets. Each of the reference picture subsets may identify a plurality of potential reference pictures, but less than all potential reference pictures. In example techniques described in this disclosure, a video coder (encoder or decoder) may construct multiple lists that each includes identifiers of a subset of the potential reference pictures. From theses multiple lists, the video coder may construct the plurality of reference picture subsets, which results in the video coder deriving the reference picture set.

In addition to techniques related to deriving the reference picture set, this disclosure describes simplified reference picture list initialization techniques. Such reference picture list initialization may remove the need to reorder the reference pictures. For example, if reference picture list modification is not needed, then the initial reference picture lists may form the final reference picture lists, and may not require any further reordering. The techniques may also be directed to constructing the reference picture list in a manner where the video coder repeatedly adds reference pictures to the reference picture list until the entries the reference picture list is equal to the maximum allowable number of entries.

In some examples, the techniques are directed to reference picture list modification. For example, the video coder may modify the initial reference picture list by referring to one or more of the reference picture subsets, and including one or more pictures in the reference picture subsets in the reference picture list after the construction of the initial reference picture list.

In some examples, the video coder may perform decoded picture buffer (DPB) management. In these examples, the video coder may remove decoded pictures from the DPB if the decoded picture does not belong to the reference picture set. In some instances, the video coder may remove the decoded picture prior to the coding of the current picture.

In one example, the disclosure describes a method for coding video data that includes coding information indicative of reference pictures that belong to a reference picture set. In this example, the reference picture set identifies the reference pictures that can potentially be used for inter-predicting a current picture and can potentially be used for inter-predicting one or more pictures following the current picture in decoding order. The method also includes constructing a plurality of reference picture subsets that each identifies zero or more of the reference pictures of the reference picture set, and coding the current picture based on the plurality of reference picture subsets.

In one example, the disclosure describes a device for coding video data. The device includes a video coder that is configured to code information indicative of reference pictures that belong to a reference picture set. In this example, the reference picture set identifies the reference pictures that can potentially be used for inter-predicting a current picture and can potentially be used for inter-predicting one or more pictures following the current picture in decoding order. The video coder is also configured to construct a plurality of reference picture subsets that each identifies zero or more of the reference pictures of the reference picture set, and code the current picture based on the plurality of reference picture subsets.

In one example, the disclosure describes a computer-readable storage medium having stored thereon instruction that, when executed, cause a processor of a device for coding video data to code information indicative of reference pictures that belong to a reference picture set. In this example, the reference picture set identifies the reference pictures that can potentially be used for inter-predicting a current picture and can potentially be used for inter-predicting one or more pictures following the current picture in decoding order. The instructions also cause the processor to construct a plurality of reference picture subsets that each identifies zero or more of the reference pictures of the reference picture set, and code the current picture based on the plurality of reference picture subsets.

In one example, the disclosure describes a device for coding video data. The device includes means for coding information indicative of reference pictures that belong to a reference picture set. In this example, the reference picture set identifies the reference pictures that can potentially be used for inter-predicting a current picture and can potentially be used for inter-predicting one or more pictures following the current picture in decoding order. The device also includes means for constructing a plurality of reference picture subsets that each identifies zero or more of the reference pictures of the reference picture set, and means for coding the current picture based on the plurality of reference picture subsets.

In one example, the disclosure describes a method for coding video data, the method includes coding information indicative of reference pictures that belong to a reference picture set. In this example, the reference picture set identifies the reference pictures that can potentially be used for inter-predicting a current picture and can potentially be used for inter-predicting one or more pictures following the current picture in decoding order. The method also includes constructing a plurality of reference picture subsets that each identifies zero or more of the reference pictures of the reference picture set, adding reference pictures from a first subset of the plurality of reference picture subsets, followed by reference pictures from a second subset of the plurality of reference picture subsets, and followed by reference pictures from a third subset of the plurality of reference picture subsets into a reference picture list as long as a number of reference picture list entries is not greater than a maximum number of allowable reference list entries, and coding the current picture based on the reference picture list.

In one example, the disclosure describes a device for coding video data. The device includes a video coder configured to code information indicative of reference pictures that belong to a reference picture set. In this example, the reference picture set identifies the reference pictures that can potentially be used for inter-predicting a current picture and can potentially be used for inter-predicting one or more pictures following the current picture in decoding order. The video coder is also configured to construct a plurality of reference picture subsets that each identifies zero or more of the reference pictures of the reference picture set, add reference pictures from a first subset of the plurality of reference picture subsets, followed by reference pictures from a second subset of the plurality of reference picture subsets, and followed by reference pictures from a third subset of the plurality of reference picture subsets into a reference picture list as long as a number of reference picture list entries is not greater than a maximum number of allowable reference list entries, and code the current picture based on the reference picture list.

In one example, the disclosure describes a computer-readable storage medium having stored thereon instruction that, when executed, cause a processor of a device for coding video data to code information indicative of reference pictures that belong to a reference picture set. In this example, the reference picture set identifies the reference pictures that can potentially be used for inter-predicting a current picture and can potentially be used for inter-predicting one or more pictures following the current picture in decoding order. The instructions also cause the processor to construct a plurality of reference picture subsets that each identifies zero or more of the reference pictures of the reference picture set, add reference pictures from a first subset of the plurality of reference picture subsets, followed by reference pictures from a second subset of the plurality of reference picture subsets, and followed by reference pictures from a third subset of the plurality of reference picture subsets into a reference picture list as long as a number of reference picture list entries is not greater than a maximum number of allowable reference list entries, and code the current picture based on the reference picture list.

In one example, the disclosure describes a device for coding video data. The device includes means for coding information indicative of reference pictures that belong to a reference picture set. In this example, the reference picture set identifies the reference pictures that can potentially be used for inter-predicting a current picture and can potentially be used for inter-predicting one or more pictures following the current picture in decoding order. The device also includes means for constructing a plurality of reference picture subsets that each identifies zero or more of the reference pictures of the reference picture set, means for adding reference pictures from a first subset of the plurality of reference picture subsets, followed by reference pictures from a second subset of the plurality of reference picture subsets, and followed by reference pictures from a third subset of the plurality of reference picture subsets into a reference picture list as long as a number of reference picture list entries is not greater than a maximum number of allowable reference list entries, and means for coding the current picture based on the reference picture list.

In one example, the disclosure describes a method for coding video data, the method includes coding information indicative of reference pictures that belong to a reference picture set. In this example, the reference picture set identifies the reference pictures that can potentially be used for inter-predicting a current picture and can potentially be used for inter-predicting one or more pictures following the current picture in decoding order. The method also includes constructing a plurality of reference picture subsets that each identifies zero or more of the reference pictures of the reference picture set, adding reference pictures from the plurality of reference picture subsets into a first set of entries in a reference picture list, determining whether a number of entries in the reference picture list is equal to a maximum number of allowable entries in the reference picture list, when the number of entries in the reference picture list is not equal to the maximum number of allowable entries in the reference picture list, repeatedly re-adding one or more reference pictures from at least one of the reference picture subsets into entries in the reference picture list that are subsequent to the first set of entries until the number of entries in the reference picture list is equal to the maximum number of allowable entries in the reference picture list, and coding the current picture based on the reference picture list.

In one example, the disclosure describes a device for coding video data. The device includes a video coder configured to code information indicative of reference pictures that belong to a reference picture set. In this example, the reference picture set identifies the reference pictures that can potentially be used for inter-predicting a current picture and can potentially be used for inter-predicting one or more pictures following the current picture in decoding order. The video coder is also configured to construct a plurality of reference picture subsets that each identifies zero or more of the reference pictures of the reference picture set, add reference pictures from the plurality of reference picture subsets into a first set of entries in a reference picture list, determine whether a number of entries in the reference picture list is equal to a maximum number of allowable entries in the reference picture list, when the number of entries in the reference picture list is not equal to the maximum number of allowable entries in the reference picture list, repeatedly re-add one or more reference pictures from at least one of the reference picture subsets into entries in the reference picture list that are subsequent to the first set of entries until the number of entries in the reference picture list is equal to the maximum number of allowable entries in the reference picture list, and code the current picture based on the reference picture list.

In one example, the disclosure describes a computer-readable storage medium having stored thereon instructions that, when executed, cause a processor of a device for coding video data to code information indicative of reference pictures that belong to a reference picture set. In this example, the reference picture set identifies the reference pictures that can potentially be used for inter-predicting a current picture and can potentially be used for inter-predicting one or more pictures following the current picture in decoding order. The instructions also cause the processor to construct a plurality of reference picture subsets that each identifies zero or more of the reference pictures of the reference picture set, add reference pictures from the plurality of reference picture subsets into a first set of entries in a reference picture list, determine whether a number of entries in the reference picture list is equal to a maximum number of allowable entries in the reference picture list, when the number of entries in the reference picture list is not equal to the maximum number of allowable entries in the reference picture list, repeatedly re-add one or more reference pictures from at least one of the reference picture subsets into entries in the reference picture list that are subsequent to the first set of entries until the number of entries in the reference picture list is equal to the maximum number of allowable entries in the reference picture list, and code the current picture based on the reference picture list.

In one example, the disclosure describes a device for coding video data. The device includes means for coding information indicative of reference pictures that belong to a reference picture set. In this example, the reference picture set identifies the reference pictures that can potentially be used for inter-predicting a current picture and can potentially be used for inter-predicting one or more pictures following the current picture in decoding order. The device also includes means for constructing a plurality of reference picture subsets that each identifies zero or more of the reference pictures of the reference picture set, means for adding reference pictures from the plurality of reference picture subsets into a first set of entries in a reference picture list, means for determining whether a number of entries in the reference picture list is equal to a maximum number of allowable entries in the reference picture list, when the number of entries in the reference picture list is not equal to the maximum number of allowable entries in the reference picture list, means for repeatedly re-adding one or more reference pictures from at least one of the reference picture subsets into entries in the reference picture list that are subsequent to the first set of entries until the number of entries in the reference picture list is equal to the maximum number of allowable entries in the reference picture list, and means for coding the current picture based on the reference picture list.

In one example, the disclosure describes a method for coding video data, the method includes coding information indicative of reference pictures that belong to a reference picture set. In this example, the reference picture set identifies the reference pictures that can potentially be used for inter-predicting a current picture and can potentially be used for inter-predicting one or more pictures following the current picture in decoding order. The method also includes constructing a plurality of reference picture subsets that each identifies zero or more of the reference pictures of the reference picture set, constructing an initial reference picture list based on the constructed reference picture subsets, and when reference picture modification is needed identifying a reference picture in at least one of the constructed reference picture subsets, and adding the identified reference picture in a current entry of the initial reference picture to construct a modified reference picture list. The method further includes coding the current picture based on the modified reference picture list.

In one example, the disclosure describes a device for coding video data. The device includes a video coder configured to code information indicative of reference pictures that belong to a reference picture set. In this example, the reference picture set identifies the reference pictures that can potentially be used for inter-predicting a current picture and can potentially be used for inter-predicting one or more pictures following the current picture in decoding order. The video coder is also configured to construct a plurality of reference picture subsets that each identifies zero or more of the reference pictures of the reference picture set, construct an initial reference picture list based on the constructed reference picture subsets, and when reference picture modification is needed identify a reference picture in at least one of the constructed reference picture subsets, and add the identified reference picture in a current entry of the initial reference picture to construct a modified reference picture list. The video coder is also configured to code the current picture based on the modified reference picture list.

In one example, the disclosure describes a computer-readable storage medium having stored thereon instructions that, when executed, cause a processor of a device for coding video data to code information indicative of reference pictures that belong to a reference picture set. In this example, the reference picture set identifies the reference pictures that can potentially be used for inter-predicting a current picture and can potentially be used for inter-predicting one or more pictures following the current picture in decoding order. The instructions also cause the processor to construct a plurality of reference picture subsets that each identifies zero or more of the reference pictures of the reference picture set, construct an initial reference picture list based on the constructed reference picture subsets, and when reference picture modification is needed identify a reference picture in at least one of the constructed reference picture subsets, and add the identified reference picture in a current entry of the initial reference picture to construct a modified reference picture list. The instructions also cause the processor to code the current picture based on the modified reference picture list.

In one example, the disclosure describes a device for coding video data. The device includes means for coding information indicative of reference pictures that belong to a reference picture set. In this example, the reference picture set identifies the reference pictures that can potentially be used for inter-predicting a current picture and can potentially be used for inter-predicting one or more pictures following the current picture in decoding order. The device also includes means for constructing a plurality of reference picture subsets that each identifies zero or more of the reference pictures of the reference picture set, means for constructing an initial reference picture list based on the constructed reference picture subsets, and when reference picture modification is needed means for identifying a reference picture in at least one of the constructed reference picture subsets, and means for adding the identified reference picture in a current entry of the initial reference picture to construct a modified reference picture list. The device also includes means for coding the current picture based on the modified reference picture list.

In one example, the disclosure describes a method for coding video data, the method includes coding information indicative of reference pictures that belong to a reference picture set. In this example, the reference picture set identifies the reference pictures that can potentially be used for inter-predicting a current picture and can potentially be used for inter-predicting one or more pictures following the current picture in decoding order. The method includes deriving the reference picture set based on the coded information, determining whether a decoded picture stored in a decoded picture buffer (DPB) is not needed for output and is not identified in the reference picture set, when the decoded picture is not needed for output and is not identified in the reference picture set, removing the decoded picture from the DPB, and subsequent to the removing of the decoded picture, coding the current picture.

In one example, the disclosure describes a device for coding video data. The device includes a video coder configured to code information indicative of reference pictures that belong to a reference picture set. In this example, the reference picture set identifies the reference pictures that can potentially be used for inter-predicting a current picture and can potentially be used for inter-predicting one or more pictures following the current picture in decoding order. The video coder is also configured to derive the reference picture set based on the coded information, determine whether a decoded picture stored in a decoded picture buffer (DPB) is not needed for output and is not identified in the reference picture set, when the decoded picture is not needed for output and is not identified in the reference picture set, remove the decoded picture from the DPB, and subsequent to the removing of the decoded picture, code the current picture.

In one example, the disclosure describes a computer-readable storage medium having stored thereon instructions that, when executed, cause a processor of a device for coding video data to code information indicative of reference pictures that belong to a reference picture set. In this example, the reference picture set identifies the reference pictures that can potentially be used for inter-predicting a current picture and can potentially be used for inter-predicting one or more pictures following the current picture in decoding order. The instructions also cause the processor to derive the reference picture set based on the coded information, determine whether a decoded picture stored in a decoded picture buffer (DPB) is not needed for output and is not identified in the reference picture set, when the decoded picture is not needed for output and is not identified in the reference picture set, remove the decoded picture from the DPB, and subsequent to the removing of the decoded picture, code the current picture.

In one example, the disclosure describes a device for coding video data. The device includes means for coding information indicative of reference pictures that belong to a reference picture set. In this example, the reference picture set identifies the reference pictures that can potentially be used for inter-predicting a current picture and can potentially be used for inter-predicting one or more pictures following the current picture in decoding order. The device also includes means for deriving the reference picture set based on the coded information, means for determining whether a decoded picture stored in a decoded picture buffer (DPB) is not needed for output and is not identified in the reference picture set, when the decoded picture is not needed for output and is not identified in the reference picture set, means for removing the decoded picture from the DPB, and subsequent to the removing of the decoded picture, means for coding the current picture.

In one example, the disclosure describes a method coding video data, the method includes coding syntax elements indicating candidate long-term reference pictures identified in a parameter set. In this example, one or more of the candidate long-term reference pictures belong in a reference picture set of a current picture. Also, in this example, the reference picture set identifies reference pictures that can potentially be used for inter-predicting the current picture and can potentially be used for inter-predicting one or more pictures following the current picture in decoding order. The method also includes coding syntax elements that indicate which candidate long-term reference pictures, identified in the parameter set, belong in the reference picture set of the current picture, and constructing at least one of a plurality of reference picture subsets based on the indication of which candidate long-term reference pictures belong in the reference picture set of the current picture. In this example, the plurality of reference picture subsets form the reference picture set.

In one example, the disclosure describes a device for coding video data. The device includes a video coder configured to code syntax elements indicating candidate long-term reference pictures identified in a parameter set. In this example, one or more of the candidate long-term reference pictures belong in a reference picture set of a current picture. Also, in this example, the reference picture set identifies reference pictures that can potentially be used for inter-predicting the current picture and can potentially be used for inter-predicting one or more pictures following the current picture in decoding order. The video coder is also configured to code syntax elements that indicate which candidate long-term reference pictures, identified in the parameter set, belong in the reference picture set of the current picture, and construct at least one of a plurality of reference picture subsets based on the indication of which candidate long-term reference pictures belong in the reference picture set of the current picture. In this example, the plurality of reference picture subsets form the reference picture set.

In one example, the disclosure describes a computer-readable storage medium having stored thereon instructions that, when executed, cause a processor of a device for coding video data to code syntax elements indicating candidate long-term reference pictures identified in a parameter set. In this example, one or more of the candidate long-term reference pictures belong in a reference picture set of a current picture. Also, in this example, the reference picture set identifies reference pictures that can potentially be used for inter-predicting the current picture and can potentially be used for inter-predicting one or more pictures following the current picture in decoding order. The instructions also cause the processor to code syntax elements that indicate which candidate long-term reference pictures, identified in the parameter set, belong in the reference picture set of the current picture, and construct at least one of a plurality of reference picture subsets based on the indication of which candidate long-term reference pictures belong in the reference picture set of the current picture. In this example, the plurality of reference picture subsets form the reference picture set.

In one example, the disclosure describes a device for coding video data. The device includes means for coding syntax elements indicating candidate long-term reference pictures identified in a parameter set. In this example, one or more of the candidate long-term reference pictures belong in a reference picture set of a current picture. Also, in this example, the reference picture set identifies reference pictures that can potentially be used for inter-predicting the current picture and can potentially be used for inter-predicting one or more pictures following the current picture in decoding order. The device also includes means for coding syntax elements that indicate which candidate long-term reference pictures, identified in the parameter set, belong in the reference picture set of the current picture, and means for constructing at least one of a plurality of reference picture subsets based on the indication of which candidate long-term reference pictures belong in the reference picture set of the current picture. In this example, the plurality of reference picture subsets form the reference picture set.

The details of one or more examples are set forth in the accompanying drawings and the description below. Other features, objects, and advantages will be apparent from the description and drawings, and from the claims.

DETAILED DESCRIPTION

Figure 1:
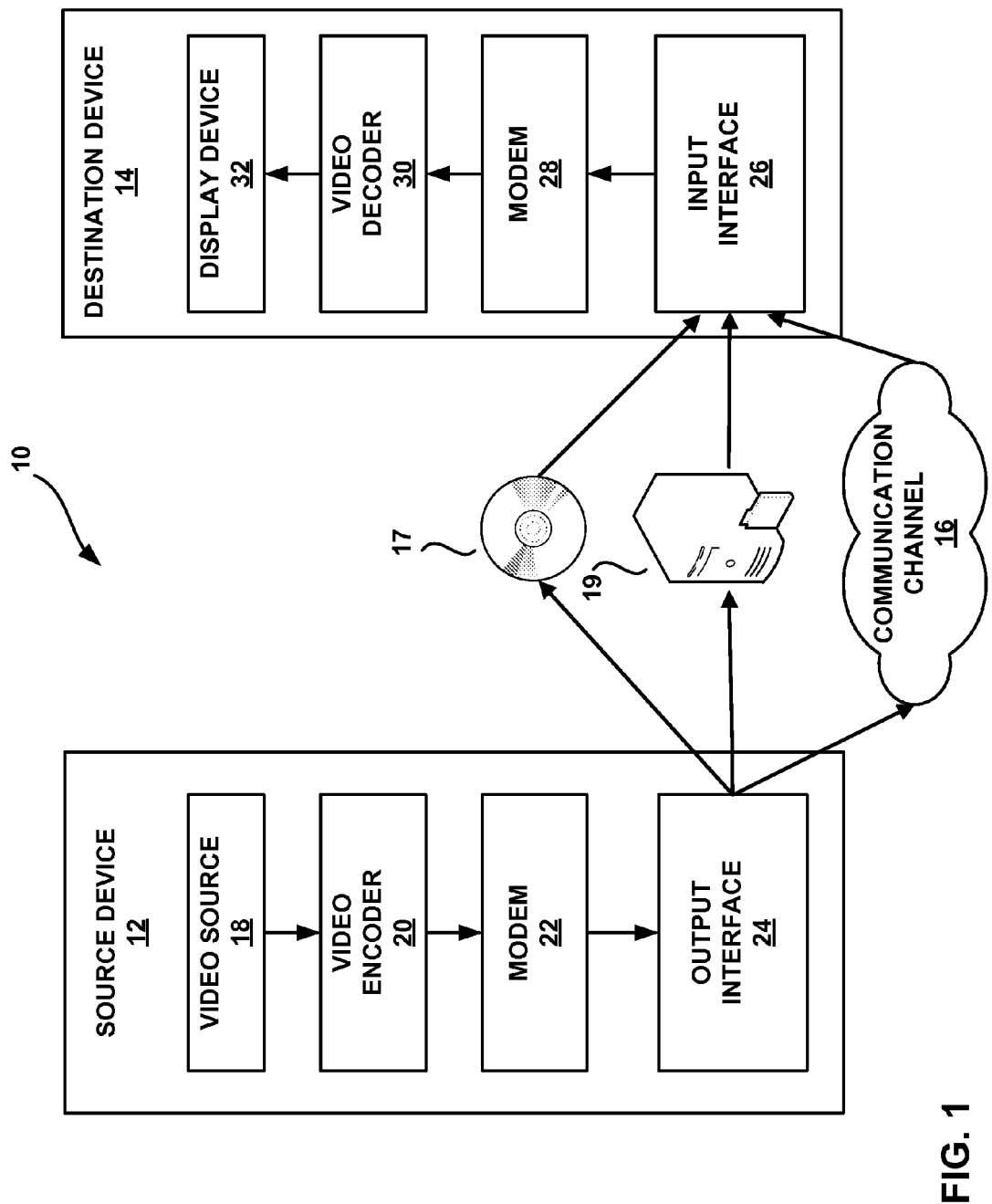
FIG. 1 is a block diagram illustrating an example video encoding and decoding system that may utilize techniques described in this disclosure.

The techniques of this disclosure are generally directed to the management of reference pictures that are used for inter-prediction. For example, a video coder (e.g., a video encoder or a video decoder) includes a decoded picture buffer (DPB). The DPB stores decoded pictures, including reference pictures. Reference pictures are pictures that can potentially be used for inter-predicting a picture. In other words, the video coder may predict a picture, during coding (encoding or decoding) of that picture, based on one or more reference pictures stored in the DPB.

To efficiently utilize the DPB, the DPB management process may be specified, such as the storage process of decoded pictures in the DPB, the marking process of the reference pictures, the output and removal process of the decoded pictures from the DPB, and so forth. In general, in some current and developing video coding standards, the DPB management may include one or more of the following aspects: picture identification and reference picture identification, reference picture list construction, reference picture marking, picture output from the DPB, picture insertion into the DPB, and picture removal from the DPB.

To assist with understanding, the following provides a brief description of how reference picture marking and reference picture list construction may occur in accordance with some video coding standards. Some of the techniques described in this disclosure address issues that may be present in reference picture marking, reference picture list construction, and DPB picture removal and output so as to improve efficiency of the utilization of the DPB.

For reference picture marking, the maximum number, referred to as M (num_ref_frames), of reference pictures used for inter-prediction is indicated in the active sequence parameter set. When a reference picture is decoded, it is marked as "used for reference." If the decoding of the reference picture caused more than M pictures marked as "used for reference," at least one picture must be marked as "unused for reference." The DPB removal process then would remove pictures marked as "unused for reference" from the DPB if they are not needed for output as well.

When a picture is decoded, it may be either a non-reference picture or a reference picture. A reference picture may be a long-term reference picture or short-term reference picture, and when it is marked as "unused for reference", it may become no longer needed for reference. In some video coding standards, there may be reference picture marking operations that change the status of the reference pictures.

There may be two types of operations for the reference picture marking: sliding window and adaptive memory control. The operation mode for reference picture marking may be selected on picture basis; whereas, sliding window operation may work as a first-in-first-out queue with a fixed number of short-term reference pictures. In other words, short-term reference pictures with earliest decoding time may be the first to be removed (marked as picture not used for reference), in an implicit fashion.

The adaptive memory control however removes short-term or long-term pictures explicitly. It also enables switching the status of the short-term and long-term pictures, etc. For example, in adaptive memory control, a video encoder may signal syntax elements that specify which pictures should be marked as used for reference. The video decoder may receive the syntax elements and mark the pictures as specified. In sliding window, the video encoder may not need to signal which pictures should be marked as used for reference. Rather, the video decoder may implicitly (i.e., without receiving syntax elements) determine which pictures should be marked as used for reference based on which pictures are within the sliding window.

The video coder may also be tasked with constructing reference picture lists that indicate which reference pictures may be used for inter-prediction purposes. Two of these reference picture lists are referred to as List 0 and List 1, respectively. The video coder firstly employs default construction techniques to construct List 0 and List 1 (e.g., preconfigured construction schemes for constructing List 0 and List 1). Optionally, after the initial List 0 and List 1 are constructed, the video decoder may decode syntax elements, when present, that instruct the video decoder to modify the initial List 0 and List 1.

The video encoder may signal syntax elements that are indicative of identifier(s) of reference pictures in the DPB, and the video encoder may also signal syntax elements that include indices, within List 0, List 1, or both List 0 and List 1, that indicate which reference picture or pictures to use to decode a coded block of a current picture. The video decoder, in turn, uses the received identifier to identify the index value or values for a reference picture or reference pictures listed in List 0, List 1, or both List 0 and List 1. From the index value(s) as well as the identifier(s) of the reference picture or reference pictures, the video decoder retrieves the reference picture or reference pictures, or part(s) thereof, from the DPB, and decodes the coded block of the current picture based on the retrieved reference picture or pictures and one or more motion vectors that identify blocks within the reference picture or pictures that are used for decoding the coded block.

For example, a reference picture list construction for the first or the second reference picture list of a bi-predicted picture includes two steps: reference picture list initialization and reference picture list modification (also referred to as reference picture list reordering). The reference picture list initialization may be an implicit mechanism that puts the reference pictures in the reference picture memory (also known as decoded picture buffer) into a list based on the order of POC (Picture Order Count, aligned with display order of a picture) values. The reference picture list reordering mechanism may modify the position of a picture that was put in the list during the reference picture list initialization to any new position, or put any reference picture in the reference picture memory in any position even the picture does not belong to the initialized list. Some pictures after the reference picture list reordering (modification), may be put in a very further position in the list. However, if a position of a picture exceeds the number of active reference pictures of the list, the picture is not considered as an entry of the final reference picture list. The number of active reference pictures of may be signaled in the slice header for each list.

The techniques described in this disclosure may be applicable to various video coding standards. Examples of the video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. In addition, there is a new video coding standard, namely High Efficiency Video Coding (HEVC), being developed by the Joint Collaboration Team on Video Coding (JCT-VC) of ITU-T Video Coding Experts Group (VCEG) and ISO/IEC Motion Picture Experts Group (MPEG).

For purposes of illustration only, the techniques are described in context of the HEVC standard. A recent Working Draft (WD) of HEVC, and referred to as HEVC WD8 hereinafter, is available, as of Jul. 20, 2012, from http://phenix.int-evry.fr/jct/doc_end_user/documents/10_Stockholm/wg11/JCTVC-J1003-v8.zip.

As described above, the techniques described in this disclosure may address issues that may be present in existing solutions for decoded picture buffer (DPB) management. As one example, in some example techniques described in this disclosure, the marking of reference pictures as "unused for reference" may not be needed. For example, the techniques described in this disclosure may address issues related to DPB management techniques that may not suit well for temporal scalability, issues related to signaling overhead of long-term reference pictures, issues related to the efficiency and complexity with reference picture list initialization and modification. The techniques described in this disclosure may also address issues related to the marking of "no reference picture" for non-completed entries in a reference picture list during reference picture list initialization, issues related to decoded picture output, insertion into, and removal from the DPB, as well as issues related to possible values for picture order count (POC) values.

In accordance with techniques described in this disclosure, the reference picture lists are constructed from a reference picture set. A reference picture set is defined as a set of reference pictures associated with a picture, consisting of all reference pictures that are prior to the associated picture in decoding order, that may be used for inter prediction of blocks in the associated picture or any picture following the associated picture in decoding order, for example, until the next instantaneous decoding refresh (IDR) picture, or broken link access (BLA) picture. In other words, reference pictures in the reference picture set may require the following characteristics: (1) they are all prior to the current picture in decoding order, and (2) they may be used for inter-predicting the current picture and/or inter-predicting any picture following the current picture in decoding order, and in some examples, until the next IDR picture or BLA picture. There may be other alternate definitions of the reference picture set, which are provided below.

In the example techniques described in this disclosure, the video coder may derive the reference picture set, and after such derivation, the video coder may construct the reference picture lists. For instance, only reference pictures in the reference picture set may be candidate reference pictures that are used to construct the reference picture lists.

To construct the reference picture set, the video coder may construct a plurality of reference picture subsets. The combination of the reference picture subsets may together form the reference picture set. For example, a video encoder may explicitly signal, in a coded bitstream, values that allow a video decoder to determine identifiers for the reference pictures that are included in the reference picture set. For instance, the identifiers of the reference pictures may the picture order counts. Each picture is associated with one picture order count, referred to as PicOrderCnt. PicOrderCnt indicates the output order or display order of the corresponding picture relative to the previous IDR picture in decoding order, and, in some other alternatives, indicates the position of the associated picture in output order relative to the output order positions of the other pictures in the same coded video sequence.

The PicOrderCnt may be referred to as a picture order count (POC) value. A POC value may indicate the output or display order of a picture, and may be used to identify a picture. For example, within a coded video sequence, a picture with a smaller POC value is outputted or displayed earlier than a picture with larger POC value.

The video decoder may determine the identifiers for the reference pictures, and from these identifiers construct the plurality of reference picture subsets. From these reference picture subsets, the video decoder may derive the reference picture set, as described in more detail below. In some examples, each of the reference picture subsets include different reference pictures, in that there is no overlap of reference pictures in the reference picture subsets. In this way, each of the reference pictures may be in only one of the reference picture subsets, and in no other reference picture subset. However, aspects of this disclosure should not be considered so limited.

After determining the identifiers (e.g., POC values) of the reference pictures in the reference picture set or its subsets, the video decoder may construct the reference picture subsets. As described in more detail below, the video decoder may construct six reference picture subsets, although it may be possible for the video decoder to construct more or fewer reference picture subsets.

These six reference picture subsets are named: RefPicSetStCurr0, RefPicSetStCurr1, RefPicSetStFoll0, RefPicSetStFoll1, RefPicSetLtCurr, and RefPicSetLtFoll. The RefPicSetStCurr0 reference picture subset may be referred to as the RefPicSetStCurrBefore reference picture subset, and the RefPicSetStCurr1 reference picture subset maybe referred to as the RefPicSetStCurrAfter reference picture subset.

The RefPicSetStCurr0, RefPicSetStCurr1, RefPicSetStFoll0, and RefPicSetStFoll1 reference picture subsets may identify short-term reference pictures. In some examples, these reference picture subsets may identify short-term reference pictures based on whether the short-term reference pictures are earlier in display order or later in display order than the current picture being coded, as well as whether the short-term reference pictures can potentially be used for inter-predicting the current picture and pictures following the current picture in decoding order, or can potentially be used for inter-predicting only the pictures following the current picture in decoding order.

For example, the RefPicSetStCurr0 reference picture subset may include, and may only include, identification information, such as POC values, of all short-term reference pictures that have an earlier output or display order than the current picture, and that can potentially be used for reference in inter-prediction of the current picture, and can potentially be used for reference in inter-prediction of one or more pictures following the current picture in decoding order. The RefPicSetStCurr1 reference picture subset may include, and may only include, identification information of all short-term reference pictures that have a later output or display order than the current picture and that can potentially be used for reference in inter-prediction of the current picture, and can potentially be used for reference in inter-prediction of one or more pictures following the current picture in decoding order.

The RefPicSetStFoll0 reference picture subset may include, and may only include, identification information of all short-term reference pictures that have an earlier output or display order than the current picture, that can potentially be used for reference in inter-prediction of one or more pictures following the current picture in decoding order, and that cannot be used for reference in inter-prediction of the current picture. The RefPicSetStFoll1 reference picture subset may include, and may only include, identification information of all short-term reference pictures that have a later output or display order than the current picture, that can potentially be used for reference in inter-prediction of one or more pictures following the current picture in decoding order, and that cannot be used for reference in inter-prediction of the current picture.

The RefPicSetLtCurr and the RefPicSetLtFoll reference picture subsets may identify long-term reference pictures. In some examples, these reference picture subsets may identify long-term reference pictures based on whether the long-term reference pictures are earlier in display order or later in display order than the current picture being coded.

For example, the RefPicSetLtCurr reference picture subset may include, and may only include, the identification information of all long-term reference pictures that can potentially be used for reference in inter-prediction of the current picture, and that can potentially be used for reference in inter-prediction of one or more pictures following the current picture in decoding order. The RefPicSetLtFoll reference picture subset may include, and may only include, the identification information of all long-term reference pictures that can potentially be used for reference in inter-prediction of one or more pictures following the current picture in decoding order, and that cannot be used for reference in inter-prediction of the current picture.

After constructing the reference picture subsets, the video decoder may order the reference picture subsets in different order to derive the reference picture set. As one example, the order of the reference picture set may be RefPicSetStCurr0, RefPicSetSetCurr1, RefPicSetFoll0, RefPicSetFoll1, RefPicSetLtCurr, and RefPicSetLtFoll. However, other ordering of the subsets may be possible to derive the reference picture set. For instance, as another example, the order of the reference picture set may be the RefPicSetStCurr0 reference picture subset, followed by the RefPicSetStCurr1 reference picture set, followed by the RefPicSetLtCurr reference picture subset, followed by the RefPicSetStFoll0 reference picture subset, followed by the RefPicSetFoll1 reference picture subset, and followed by RefPicSetLtFoll reference picture subset.

In accordance with the techniques described in this disclosure, the RefPicSetStCurr0, RefPicSetStCurr1, and RefPicSetLtCurr subsets include all reference pictures that may be used in inter-prediction of a block in the current picture and that may be used in inter-prediction of one or more of the pictures following the current picture in decoding order. The RefPicSetStFoll0, RefPicSetStFoll1, and RefPicSetLtFoll subsets include all reference pictures that are not used in inter-prediction of the block in the current picture, but may be used in inter-prediction of one or more of the pictures following the current picture in decoding order.

It should be understood that the six reference picture subsets are described for illustration purposes only, and should not be considered limiting. In alternate examples, there may be more or fewer reference picture subsets. Such reference picture subsets, in these alternate examples, are described in more detail below.

In some techniques described in these disclosures, the video decoder may not need to mark decoded pictures are "used for reference," "unused for reference," "used for short-term reference," or "used for long-term reference." Rather, whether a decoded picture stored in the DPB is needed for inter-prediction is indicated by whether it is included in the reference picture set of the current picture. In alternate examples, it may be possible that the video decoder marks decoded pictures as "used for reference," "unused for reference," "used for short-term reference," or "used for long-term reference." In these examples, after the video decoder decodes a picture, it is a reference picture and marked as "used for reference." Then, after invocation of the process for reference picture set derivation, all reference pictures stored in the DPB, but not included in the reference picture set of the current picture are marked as "unused for reference," before possible removal of decoded pictures from the DPB. Thus, whether a decoded picture stored in the DPB is needed for inter-prediction may be indicated by whether it is marked as "used for reference."

Once the video decoder derives the reference picture set from the plurality of reference picture subsets, the video decoder may construct the reference picture lists (e.g., List 0 and List 1) from the reference picture set. For example, the construction of the reference picture lists may include an initialization step and possibly a modification step. By deriving the reference picture set in the manner described above, the video decoder may be able to improve the efficiency and reduce the complexity for reference picture list initialization and reference picture list modification.

There may be various ways in which the video decoder may construct the reference picture lists. The techniques described in this disclosure provide a mechanism by which the video decoder may construct reference picture lists without needing to reorder the reference pictures to be included in the (initial) reference picture list. For example, the video decoder may be configured to implement a default reference list construction technique in which the video decoder utilizes the reference picture subsets for constructing initial reference picture lists. Then, if reference picture list modification is not needed, the final reference picture lists may be the same as the initial reference picture lists, without needing any additional reordering of the reference picture lists.

In some examples, the techniques described in this disclosure may be related to constructing the reference picture lists in such a manner that there are no non-completed entries. For instance, the techniques may repeatedly add reference pictures to a reference picture list from the one or more of the reference picture subsets. For example, after the video decoder adds reference pictures from one or more of the reference picture subsets for constructing an initial reference picture list, the video decoder may determine whether the number of entries in the reference picture list is less than the maximum allowable number of entries. If the number of entries in the reference picture list is less than the maximum number of allowable number of entries, the video decoder may re-add at least one of the reference pictures from one of the reference picture subsets used to construct the reference picture list, in the reference picture list. This re-adding (also referred to as re-listing) of the reference picture may occur at a different location within reference picture lists, as compared to the location where the reference picture was first added by the video decoder.

As used in this disclosure, relisting or re-adding refers to adding again (e.g., identifying again) a reference picture that was previously added (e.g., identified) in the initial reference picture list. However, when re-adding a reference picture, the reference picture may be located at two different entries in the initial reference picture list. In other words, when re-adding a reference picture, there may be two index values into the initial reference picture list that identify the same reference picture.

In some examples, the techniques described in this disclosure may be related to modifying an initial reference picture list. For example, the video decoder may construct an initial reference picture list. The video decoder may determine that reference picture list modification is needed based on syntax elements signaled by the video encoder in the coded bitstream. When reference picture list modification is needed, the video decoder may identify a reference picture in at least one of the constructed reference picture subsets. The video decoder may list (e.g., add) the identified reference picture in a current entry of the initial reference picture list to construct a modified reference picture list. The video decoder may then decode the current picture based on the modified reference picture list.

In some examples, the techniques described in this disclosure may be related to output and removal of decoded pictures from a decoded picture buffer (DPB). The example techniques may remove a decoded picture from the DPB prior to coding a current picture. For instance, the example techniques may remove the decoded picture if that decoded picture is not identified in the reference picture set of the current picture and if that decoded picture is not needed for output (i.e., it was either not intended for output or it was intended for output but has been outputted already).

FIG. 1 is a block diagram illustrating an example video encoding and decoding system 10 that may utilize techniques described in this disclosure. In general, a reference picture set is defined as a set of reference pictures associated with a picture, consisting of all reference pictures that are prior to the associated picture in decoding order, that may be used for inter prediction of the associate picture or any picture following the associated picture in decoding order. In some examples, the reference pictures that are prior to the associated picture may be reference pictures until the next instantaneous decoding refresh (IDR) picture, or broken link access (BLA) picture. In other words, reference pictures in the reference picture set may all be prior to the current picture in decoding order. Also, the reference pictures in the reference picture set may be used for inter-predicting the current picture and/or inter-predicting any picture following the current picture in decoding order until the next IDR picture or BLA picture.

There may be other alternate definitions of reference picture set. For example, the reference picture set may be a set of reference pictures associated with a picture, consisting of all reference pictures, excluding the associated picture itself, that may be used for inter prediction of the associated picture or any picture following the associated picture in decoding order, and that have temporal_id less than or equal to that of the associated picture. The temporal_id may be a temporal identification value. The temporal identification value may be hierarchical value that indicates which pictures can be used for coding the current picture. In general, a picture with a particular temporal_id value can possibly be a reference picture for pictures with equal or greater temporal_id values, but not vice-versa. For example, a picture with a temporal_id value of 1 can possibly be a reference picture for pictures with temporal_id values of 1, 2, 3, . . . , but not for a picture with a temporal_id value of 0.

The lowest temporal_id value may also indicate the lowest display rate. For example, if a video decoder only decoded pictures with temporal_id values of 0, the display rate may be 7.5 pictures per second. If a video decoder only decoded pictures with temporal_id values of 0 and 1, the display rate may be 15 pictures per second, and so forth.

As another example, reference picture set may be a set of reference pictures associated with a picture, consisting of all reference pictures, excluding the associated picture itself, that may be used for inter prediction of the associated picture or any picture following the associated picture in decoding order. As yet another example, the reference picture set may be defined as a set of reference pictures associated with a picture, consisting of all reference pictures, possibly including the associated picture itself, that may be used for inter prediction of the associated picture or any picture following the associated picture in decoding order. As another example, the reference picture set may be defined as a set of reference pictures associated with a picture, consisting of all reference pictures, possibly including the associated picture itself, that may be used for inter prediction of the associated picture or any picture following the associated picture in decoding order, and that have temporal_id less than or equal to that of the associated picture.

As yet another example, in the above definitions of a reference picture set, the phrase "may be used for inter prediction" is replaced with "are used for inter prediction." Although there may be alternate definitions of the reference picture set, in this disclosure, the examples are described with the definition of the reference picture set being a set of reference pictures associated with a picture, consisting of all reference pictures that are prior to the associated picture in decoding order, that may be used for inter prediction of the associate picture or any picture following the associated picture in decoding order.

For example, some of the reference pictures in the reference picture set are reference pictures that can potentially be used to inter-predict a block of the current picture, and not pictures following the current picture in decoding order. Some of the reference pictures in the reference picture set are reference pictures that can potentially be used to inter-predict a block of the current picture, and blocks in one or more pictures following the current picture in decoding order. Some of the reference pictures in the reference picture set are reference pictures that can potentially be used to inter-predict blocks in one or more pictures following the current picture in decoding order, and cannot be used to inter-predict a block in the current picture.

As used in this disclosure, reference pictures that can potentially be used for inter-prediction refer to reference pictures that can be used for inter-prediction, but do not necessarily have to be used for inter-prediction. For example, the reference picture set may identify reference pictures that can potentially be used for inter-prediction. However, this does not mean that all of the identified reference pictures must be used for inter-prediction. Rather, one or more of these identified reference pictures could be used for inter-prediction, but all do not necessarily have to be used for inter-prediction.

As shown in FIG. 1, system 10 includes a source device 12 that generates encoded video for decoding by destination device 14. Source device 12 and destination device 14 may each be an example of a video coding device. Source device 12 may transmit the encoded video to destination device 14 via communication channel 16 or may store the encoded video on a storage medium 17 or a file server 19, such that the encoded video may be accessed by the destination device 14 as desired.

Source device 12 and destination device 14 may comprise any of a wide range of devices, including a wireless handset such as so-called "smart" phones, so-called "smart" pads, or other such wireless devices equipped for wireless communication. Additional examples of source device 12 and destination device 14 include, but are not limited to, a digital television, a device in digital direct broadcast system, a device in wireless broadcast system, a personal digital assistants (PDA), a laptop computer, a desktop computer, a tablet computer, an e-book reader, a digital camera, a digital recording device, a digital media player, a video gaming device, a video game console, a cellular radio telephone, a satellite radio telephone, a video teleconferencing device, and a video streaming device, a wireless communication device, or the like.

As indicated above, in many cases, source device 12 and/or destination device 14 may be equipped for wireless communication. Hence, communication channel 16 may comprise a wireless channel, a wired channel, or a combination of wireless and wired channels suitable for transmission of encoded video data. Similarly, the file server 19 may be accessed by the destination device 14 through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server.

The techniques of this disclosure, however, may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony In the example of FIG. 1, source device 12 includes a video source 18, video encoder 20, a modulator/demodulator (MODEM) 22 and an output interface 24. In source device 12, video source 18 may include a source such as a video capture device, such as a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video information may be modulated by modem 22 according to a communication standard, such as a wireless communication protocol, and transmitted to destination device 14 via output interface 24. Modem 22 may include various mixers, filters, amplifiers or other components designed for signal modulation. Output interface 24 may include circuits designed for transmitting data, including amplifiers, filters, and one or more antennas.

The captured, pre-captured, or computer-generated video that is encoded by the video encoder 20 may also be stored onto a storage medium 17 or a file server 19 for later consumption. The storage medium 17 may include Blu-ray discs, DVDs, CD-ROMs, flash memory, or any other suitable digital storage media for storing encoded video. The encoded video stored on the storage medium 17 may then be accessed by destination device 14 for decoding and playback.

File server 19 may be any type of server capable of storing encoded video and transmitting that encoded video to the destination device 14. Example file servers include a web server (e.g., for a website), an FTP server, network attached storage (NAS) devices, a local disk drive, or any other type of device capable of storing encoded video data and transmitting it to a destination device. The transmission of encoded video data from the file server 19 may be a streaming transmission, a download transmission, or a combination of both. The file server 19 may be accessed by the destination device 14 through any standard data connection, including an Internet connection. This may include a wireless channel (e.g., a Wi-Fi connection), a wired connection (e.g., DSL, cable modem, Ethernet, USB, etc.), or a combination of both that is suitable for accessing encoded video data stored on a file server.

Destination device 14, in the example of FIG. 1, includes an input interface 26, a modem 28, a video decoder 30, and a display device 32. Input interface 26 of destination device 14 receives information over channel 16, as one example, or from storage medium 17 or file server 17, as alternate examples, and modem 28 demodulates the information to produce a demodulated bitstream for video decoder 30. The demodulated bitstream may include a variety of syntax information generated by video encoder 20 for use by video decoder 30 in decoding video data. Such syntax may also be included with the encoded video data stored on a storage medium 17 or a file server 19. As one example, the syntax may be embedded with the encoded video data, although aspects of this disclosure should not be considered limited to such a requirement. The syntax information defined by video encoder 20, which is also used by video decoder 30, may include syntax elements that describe characteristics and/or processing of video blocks, such as coding tree units (CTUs), coding tree blocks (CTBs), prediction units (PUs), coding units (CUs) or other units of coded video, e.g., video slices, video pictures, and video sequences or groups of pictures (GOPs). Each of video encoder 20 and video decoder 30 may form part of a respective encoder-decoder (CODEC) that is capable of encoding or decoding video data.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

In the example of FIG. 1, communication channel 16 may comprise any wireless or wired communication medium, such as a radio frequency (RF) spectrum or one or more physical transmission lines, or any combination of wireless and wired media. Communication channel 16 may form part of a packet-based network, such as a local area network, a wide-area network, or a global network such as the Internet. Communication channel 16 generally represents any suitable communication medium, or collection of different communication media, for transmitting video data from source device 12 to destination device 14, including any suitable combination of wired or wireless media. Communication channel 16 may include routers, switches, base stations, or any other equipment that may be useful to facilitate communication from source device 12 to destination device 14.

Video encoder 20 and video decoder 30 may operate according to a video compression standard, such as the include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. In addition, there is a new video coding standard, namely High Efficiency Video Coding (HEVC) standard presently under development by the Joint Collaboration Team on Video Coding (JCT-VC) of ITU-T Video Coding Experts Group (VCEG) and ISO/IEC Motion Picture Experts Group (MPEG). A recent Working Draft (WD) of HEVC, and referred to as HEVC WD8 hereinafter, is available, as of Jul. 20, 2012, from http://phenix.int-evey.fr/jct/doc_end_user/documents/10_Stockholm/wg11/JCTVC-J1003-v8.zip.

The techniques of this disclosure, however, are not limited to any particular coding standard. For purposes of illustration only, the techniques are described in accordance with the HEVC standard.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more processors including microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure.

Each of video encoder 20 and video decoder 30 may be included in one or more encoders or decoders, either of which may be integrated as part of a combined encoder/decoder (CODEC) in a respective device. In some instances, video encoder 20 and video decoder 30 may be commonly referred to as a video coder that codes information (e.g., pictures and syntax elements). The coding of information may refer to encoding when the video coder corresponds to video encoder 20. The coding of information may refer to decoding when the video coder corresponds to video decoder 30.

Furthermore, the techniques described in this disclosure may refer to video encoder 20 signaling information. When video encoder 20 signals information, the techniques of this disclosure generally refer to any manner in which video encoder 20 provides the information. For example, when video encoder 20 signals syntax elements to video decoder 30, it may mean that video encoder 20 transmitted the syntax elements to video decoder 30 via output interface 24 and communication channel 16, or that video encoder 20 stored the syntax elements via output interface 24 on storage medium 17 and/or file server 19 for eventual reception by video decoder 30. In this way, signaling from video encoder 20 to video decoder 30 should not be interpreted as requiring transmission from video encoder 20 that is immediately received by video decoder 30, although this may be possible. Rather, signaling from video encoder 20 to video decoder 30 should be interpreted as any technique with which video encoder 20 provides information for eventual reception by video decoder 30, either directly or via an intermediate storage (e.g., in storage medium 17 and/or file server 19).

Video encoder 20 and video decoder 30 may be configured to implement the example techniques described in this disclosure for deriving a reference picture set. For example, video decoder 30 may invoke the process to derive the reference picture set once per picture. Video decoder 30 may invoke the process to derive the reference picture set after decoding of a slice header, but prior to the decoding of any coding unit and prior to the decoding process for the reference picture list construction of the slice.

As described above, the reference picture set is an absolute description of the reference pictures used in the decoding process of the current picture and future coded pictures in decoding order until the next instantaneous decoding refresh (IDR) picture, or broken link access (BLA) picture. In examples described in this disclosure, video encoder 20 may explicitly signal values from which video decoder 30 may determine identifiers for the reference pictures that belong to the reference picture set. The reference picture set signaling is explicit in the sense that all reference pictures included in the reference picture set are listed explicitly, except for certain pictures, e.g., IDR pictures, no reference picture set syntax elements are included in the slice header and the reference picture set is derived to be empty.

There may be various ways in which video encoder 20 may signal syntax elements in a coded bitstream that video decoder 30 may utilize for deriving the reference picture set. For example, video encoder 20 may signal the syntax elements in the picture parameter set (PPS), sequence parameter set (SPS), the picture header (if any), the slice header, or any combination thereof. For purposes of illustration only, video encoder 20 may signal the syntax elements using the SPS, the PPS, and the slice header, as described in more detail.

To derive the reference picture set, video decoder 30 may implement a decoding process to determine the identifiers for pictures that belong to the reference picture set. Video decoder 30 may then construct a plurality of reference picture subsets, where each of the subsets identifies zero or more of the reference pictures that belong the reference picture set. Video decoder 30 may derive the reference picture set from the construed reference picture subsets. For example, video decoder 30 may list the plurality reference picture subsets in a particular order to derive the reference picture set.

There may be various ways in which video decoder 30 may determine the identifiers for pictures that belong to the reference picture set. In general, video encoder 20 may signal values from which video decoder 30 may determine the identifiers for pictures, including the pictures that belong to the reference picture set. The identifiers of the pictures may be the PicOrderCnt (i.e., picture order count (POC) values). As described above, the POC value may indicate the display or output order of a picture, where pictures with smaller POC values are displayed earlier than pictures with larger POC values. The POC value of a given picture may be relative to the previous instantaneous decoding refresh (IDR) picture. For example, the PicOrderCnt (i.e., POC value) for an IDR picture may be 0, the POC value for the picture after the IDR picture in display or output order may be 1, the POC value for the after the picture with POC value 1 in display or output order may be 2, and so forth.

In accordance with the techniques described in this disclosure, when the current picture is not an IDR picture, the following may apply to derive the POC value of the current picture. The following is meant to assist with understanding, and should not be considered as limiting.

For example, consider the list variable listD which includes as elements the PicOrderCnt values (POC values) associated with the list of pictures including all of the following: (1) the first picture in the list is the previous IDR picture in decoding order, and (2) all other pictures follow in decoding order after the first picture in the list and either precede the current picture in decoding order or are the current picture. In this example, the current picture is included in listD prior to invoking of the derivation process for the reference picture set. Also, consider the list variable listO which includes the elements of listD sorted in ascending order of POC values. In this example, listO may not contain a POC value that has a value equal to the POC value of another picture.

In some examples, the POC values may be restricted to the range of $-2^{pocLen-1}$ to $2^{pocLen-1}-1$, inclusive. In this example, pocLen may be equal to long_term_ref_pic_id_len_delta+long_term_ref_pic_id_delta_len_minus4+4. The long_term_ref_pic_id_len_delta, and the long_term_ref_pic_id_delta_len_minus4 may be syntax elements that video decoder 30 receives in the coded bitstream as part of the picture parameter set syntax, as describe in more detail below. As another example, the POC values may be restricted to the range of $-2^{31}$ to $2^{31}-1$, inclusive.

As one example, video decoder 30 may receive in the coded bitstream (i.e., the bitstream signaled by video encoder 20), the pic_order_cnt_lsb syntax element. The pic_order_cnt_lsb syntax element may specify the picture order count modulo MaxPicOrderCntLsb for the coded picture. The length of the pic_order_cnt_lsb syntax element may be log 2_max_pic_order_cnt_lsb_minus4+4 bits. The value of the pic_order_cnt_lsb may be in the range of 0 to MaxPicOrderCntLsb−1, inclusive. Video decoder 30 may receive the pic_order_cnt_lsb syntax element in the slice header syntax for the current picture to be decoded.

Video decoder 30 may also receive the log 2_max_pic_order_cnt_lsb_minus4 syntax element in the coded bitstream signaled by video encoder 20. Video decoder 30 may receive the log 2_max_pic_order_cnt_lsb_minus4 syntax element in the sequence parameter set. The value of log 2_max_pic_order_cnt_lsb_minu4 may be in the range of 0 to 12, inclusive. The log 2_max_pic_order_cnt_lsb_minus4 syntax element may specify the value of the variable MaxPicOrderCntLsb that video decoder 30 uses in the decoding process for determining the POC values. For example:

$$\text{MaxPicOrderCntLsb} = 2^{(\log 2\_max\_pic\_order\_cnt\_lsb\_minus4+4)}.$$

From these received syntax elements, video decoder 30 may determine the POC value of the current picture as follows. For example, video decoder 30 may determine the PicOrderCntMsb for the current picture. The POC value for the current picture may be the determined PicOrderCntMsb for the current picture plus the received pic_order_cnt_lsb for the current picture.

In the following, the function PicOrderCnt(picX) is equal to the POC value for picture X. The function DiffPicOrderCnt(picA, picB) equals PicOrderCnt(picA) minus PicOrderCnt(picB). In some examples, the coded bitstream may not include data that results in the values of DiffPicOrderCnt (picA, picB) used in the decoding process that exceed the range of $-2^{15}$ to $2^{15}-1$, inclusive. Furthermore, let X be the current picture and Y and Z be two other pictures in the same sequence, where Y and Z are considered to be the same output order direction from X when both DiffPicOrderCnt(X, Y) and DiffPicOrderCnt(X, Z) are positive or both are negative. Also, in some examples, video encoder 20 may assign PicOrderCnt proportional to the sampling time of the corresponding picture relative to the sampling time of the previous IDR picture.

As part of the process of determining the POC value for the current picture, video decoder 30 may determine the variables prevPicOrderCntMsb and prevPicOrderCntLsb. For example, if the current picture is an IDR picture, video decoder 30 may set prevPicOrderCntMsb equal to 0, and set prevPicOrderCntLsb equal to 0. Otherwise (i.e., where the current picture is not an IDR picture), video decoder 30 may set prevPicOrderCntMsb equal to PicOrderCntMsb of the previous reference picture in decoding order with less or equal temporal_id than the current picture, and set prevPicOrderCntLsb equal to the value of pic_order_cnt_lsb of the previous reference picture in decoding order with less or equal temporal_id than the current picture.

With these variable values and the values of the syntax elements (e.g., the values of prevPicOrderCntMsb, prevPicOrderCntLsb, pic_order_cnt_lsb, and MaxPicOrderCntLsb), video decoder 30 may determine the value of PicOrderCntMsb based on the steps set forth in the following pseudo code. It should be understood that video decoder 30 may implement the steps set forth in the following pseudo code to determine the PicOrderCntMsb for each current picture, which is used to derive the POC value of the current picture.

```
if( ( pic_order_cnt_lsb < prevPicOrderCntLsb ) &&
( ( prevPicOrderCntLsb - pic_order_cnt_lsb ) >=
( MaxPicOrderCntLsb / 2 ) ) )
    PicOrderCntMsb = prevPicOrderCntMsb + MaxPicOrderCntLsb
else if( ( pic_order_cnt_lsb > prevPicOrderCntLsb ) &&
( ( pic_order_cnt_lsb - prevPicOrderCntLsb ) >
( MaxPicOrderCntLsb / 2 ) ) )
    PicOrderCntMsb = prevPicOrderCntMsb - MaxPicOrderCntLsb
else
    PicOrderCntMsb = prevPicOrderCntMsb
```

After determining the PicOrderCntMsb for the current picture, video decoder 30 may determine the POC value for the current picture based on the PicOrderCntMsb for the current picture and the pic_order_cnt_lsb for the current picture. Video decoder 30 may determine the POC value for the current picture as follows:

PicOrderCnt=PicOrderCntMsb+pic_order_cnt_lsb.

After decoding of a picture, video decoder 30 may store the PicOrderCntMsb value, the pic_order_cnt_lsb value, and the POC value for that picture, including each of the reference pictures that belong to the reference picture set, in a decoded picture buffer (DPB) of video decoder 30. In this way, each picture in the DPB is associated with a POC value, a PicOrderCntMsb value, and a pic_order_cnt_lsb value.

Methods for determining the POC values of the reference pictures included in the reference picture set of a current picture are described in more detail below. From the determined POC values, video decoder 30 may implement the derivation process for the reference picture set. However, prior to describing the manner in which video decoder 30 implements the derivation process for the reference picture set, the following provides tables of syntax elements that video decoder 30 may receive in the coded bitstream signaled by video encoder 20. For example, video encoder 20 may signal the syntax elements in the following tables in the coded bitstream that video decoder 30 receives. Some of these syntax elements have been described above. From the syntax elements, video decoder 30 may determine the POC values of the reference pictures included in the reference picture set and further derive the reference picture set.

For example, in the techniques described in this disclosure, the following syntax structures are modified relative to previous video coding standards: sequence parameter set (SPS) raw byte sequence payload (RBSP) syntax, seq_paramater_set_rbsq( ), picture parameter set (PPS) RBSP syntax, pic_parameter_set_rbsp( ), slice header syntax, slice_header( ), and reference picture list modification syntax, ref_pic_list_modification( ). Reference picture list modification is described in more detail following the description of deriving the reference picture set, and initializing one or more reference picture lists.

Also, in accordance with the techniques described in this disclosure, the following syntax structures are added to the coded bitstream: short-term reference picture set syntax, short_term_ref_pic_set( ), and long-term reference picture set syntax, long_term_ref_pic_set( ). Video decoder 30 may utilize the short-term reference picture set syntax and the long-term reference picture set syntax for purposes of constructing reference picture subsets, from which video decoder 30 derives the reference picture set.

For instance, for video decoder 30 to determine the POC values for the reference pictures that belong to the reference picture set, video encoder 20 may signal reference picture identification information, which video decoder 30 uses to determine the POC values, in the picture parameter set and the index to the list can be referenced in the slice header. However, this is one example manner in which video encoder 20 may signal such reference picture identification information.

In one alternate example, video encoder 20 may signal reference picture information in the sequence parameter set and the index to the list may be referenced in the slice header, which may reduce signaling overhead. In another alternate example, the video coder may signal the reference picture information in a new type of parameter set (e.g., reference picture set parameter set (RPSPS)), and the RPSPS id as well as the index to the list of reference picture identification information may be both referenced in the slice header. This may reduce the signaling overhead as well as not increase the need of the number of picture parameter sets or sequence parameter sets. In other examples, video encoder 20 may utilize any combination of these example techniques to signal the reference picture identification information.

TABLE 1

Sequence Parameter Set RBSP syntax

| seq_parameter_set_rbsp( ) { | Descriptor |
|---|---|
| profile_idc | u(8) |
| reserved_zero_8bits /* equal to 0 */ | u(8) |
| level_idc | u(8) |
| seq_parameter_set_id | ue(v) |
| max_temporal_layers_minus1 | u(3) |
| pic_width_in_luma_samples | u(16) |
| pic_height_in_luma_samples | u(16) |
| bit_depth_luma_minus8 | ue(v) |
| bit_depth_chroma_minus8 | ue(v) |
| pcm_bit_depth_luma_minus1 | u(4) |
| pcm_bit_depth_chroma_minus1 | u(4) |
| log2_max_pic_order_cnt_lsb_minus4 | ue(v) |
| max_num_ref_frames | ue(v) |
| log2_min_coding_block_size_minus3 | ue(v) |
| log2_diff_max_min_coding_block_size | ue(v) |
| log2_min_transform_block_size_minus2 | ue(v) |
| log2_diff_max_min_transform_block_size | ue(v) |
| log2_min_pcm_coding_block_size_minus3 | ue(v) |
| max_transform_hierarchy_depth_inter | ue(v) |
| max_transform_hierarchy_depth_intra | ue(v) |
| chroma_pred_from_luma_enabled_flag | u(1) |
| loop_filter_across_slice_flag | u(1) |
| sample_adaptive_offset_enabled_flag | u(1) |
| adaptive_loop_filter_enabled_flag | u(1) |
| pcm_loop_filter_disable_flag | u(1) |
| cu_qp_delta_enabled_flag | u(1) |
| temporal_id_nesting_flag | u(1) |
| inter_4x4_enabled_flag | u(1) |
| rbsp_trailing_bits( ) | |
| } | | pic_width_in_luma_samples may specify the width of each decoded picture in luma samples. The value of pic_width_in_luma_samples may be in the range of 0 to $2^{16}-1$, inclusive.

pic_height_in_luma_samples may specify the height of each decoded picture in luma samples. The value of pic_height_in_luma_samples may be in the range of 0 to $2^{16}-1$, inclusive.

As indicated in Table 1, video decoder 30 may receive in the sequence parameter set (SPS), the log 2_max_pic_order_cnt_lsb_minus4 syntax element. As described above, the value of log 2_max_pic_order_cnt_lsb_minu4 may specify the value of the variable MaxPicOrderCntLsb that video decoder 30 uses in the decoding process for determining the POC values, where $\text{MaxPicOrderCntLsb} = 2^{(log\_2\_max\_pic\_order\_cnt\_lsb\_minus4+4)}$

TABLE 2

Picture Parameter Set RBSP syntax

| pic_parameter_set_rbsp( ) { | Descriptor |
|---|---|
|   pic_parameter_set_id | ue(v) |
|   seq_parameter_set_id | ue(v) |
|   entropy_coding_mode_flag | u(1) |
|   num_short_term_ref_pic_sets_pps | ue(v) |
|   for( i = 0; i < num_short_term_ref_pic_sets_pps; i++ ) | |
|     short_term_ref_pic_set( ) | |
|   long_term_ref_pics_present_flag | u(1) |
|   if( long_term_ref_pics_present_flag ) { | |
|     long_term_ref_pic_id_delta_len_minus4 | ue(v) |
|     long_term_ref_pic_id_len_delta | ue(v) |
|     num_long_term_ref_pics_pps | ue(v) |
|     for( i = 0; i < num_long_term_ref_pics_pps; i++ ) | |
|       long_term_ref_pic_id_pps[ i ] | i(v) |
|   } | |
|   num_temporal_layer_switching_point_flags | ue(v) |
|   for( i = 0; i < num_temporal_layer_switching_point_flags; i++ ) | |
|     temporal_layer_switching_point_flag[ i ] | u(1) |
|   num_ref_idx_l0_default_active_minus1 | ue(v) |
|   num_ref_idx_l1_default_active_minus1 | ue(v) |
|   pic_init_qp_minus26 /* relative to 26 */ | se(v) |
|   constrained_intra_pred_flag | u(1) |
|   slice_granularity | u(2) |
|   shared_pps_info_enabled_flag | u(1) |
|   if( shared_pps_info_enabled_flag ) | |
|     if( adaptive_loop_filter_enabled_flag ) | |
|       alf_param( ) | |
|   if( cu_qp_delta_enabled_flag ) | |
|     max_cu_qp_delta_depth | u(4) |
|   rbsp_trailing_bits( ) | |
| } | | num_short_term_ref_pic_sets_pps specifies the number of short_term_ref_pic_set( ) syntax structures included in the picture parameter set. The value of num_short_term_ref_pic_sets_pps shall be in the range of 0 to 32, inclusive.

long_term_ref_pics_present_flag equal to 0 specifies that no long-term reference picture is used for inter prediction of any coded picture referring to the picture parameter set and the syntax elements long_term_ref_pic_id_delta_len_minus4, long_term_ref_pic_id_len_delta and num_long_term_ref_pics_pps are not present. long_term_ref_pics_present_flag equal to 1 specifies that long-term reference pictures may be used for inter prediction of one or more coded picture referring to the picture parameter set and the syntax elements long_term_ref_pic_id_delta_len_minus4, long_term_ref_pic_id_len_delta and num_long_term_ref_pics_pps are present.

long_term_ref_pic_id_delta_len_minus4 plus 4 specifies the length in bits of the long_term_ref_pic_id_delta_add_foll [i] syntax elements. The value of long_term_ref_pic_id_delta_len_minus4 shall be in the range of 0 to 12, inclusive.

long_term_ref_pic_id_len_delta_plus_ long_term_ref_pic_id_delta_len_minus4 plus 4 specifies the length in bits of the long_term_ref_pic_id_pps[i] syntax element. The value of long_term_ref_pic_id_len_delta may be in the range of 0 to 28—long_term_ref_pic_id_delta_len_minus4, inclusive. The value of long_term_ref_pic_id_len_delta+long_term_ref_pic_id_delta_len_minus4+4 in all picture parameter sets referring to one particular sequence parameter set may be identical.

num_long_term_ref_pics_pps specifies the number of identifications of long-term reference pictures included in the picture parameter set. The value of num_long_term_ref_pics_pps may be in the range of 0 to 32, inclusive.

long_term_ref_pic_id_pps[i] specifies i-th long-term reference picture identification information included in the picture parameter set. The number of bits used to represent long_term_ref_pic_id_pps[i] may be equal to long_term_ref_pic_id_len_delta+long_term_pic_id_len_minus4+4.

TABLE 3

Short-term reference picture set syntax

| short_term_ref_pic_set( ) { | Descriptor |
|---|---|
|   num_short_term_curr0 | ue(v) |
|   num_short_term_curr1 | ue(v) |
|   num_short_term_foll0 | ue(v) |
|   num_short_term_foll1 | ue(v) |
|   NumShortTerm =   num_short_term_curr0 + | |
|                        num_short_term_curr1 + | |
|                        num_short_term_foll0 + | |
|                        num_short_term_foll1 | |
|   for( i = 0; i < NumShortTerm; i++ ) | |
|     short_term_ref_pic_id_delta_minus1[ i ] | ue(v) |
| } | |

The short-term reference picture set syntax may be for short-term pictures. A short-term picture may be defined as a reference picture for which the identification information is included in the short_term_ref_pic_set( ) syntax structure for a coded picture, either included in the slice header(s) or included in the referred picture parameter set and reference by the short_term_ref_pic_set_idx syntax element in the slice header(s). The slice header syntax elements are provided in Table 4 below.

num_short_term_curr0 specifies the number of short-term reference pictures in RefPicSetStCurr0 when the short_term_ref_pic_set( ) syntax structure is used for derivation of the reference picture set of a coded picture, as describe below. The value of num_short_term_curr0 may be in the range of 0 to max_num_ref_frames, inclusive.

num_short_term_curr1 specifies the number of short-term reference pictures in RefPicSetStCurr1 when the short_term_ref_pic_set( ) syntax structure is used for derivation of the reference picture set of a coded picture, as describe below. The value of num_short_term_curr1 may be in the range of 0 to max_num_ref_frames−num_short_term_curr0, inclusive.

num_short_term_foll0 specifies the number of short-term reference pictures in RefPicSetStFoll0 when the short_term_ref_pic_set( ) syntax structure is used for derivation of the reference picture set of a coded picture, as describe below. The value of num_short_term_foll0 may be in the range of 0 to max_num_ref_frames−num_short_term_curr0−num_short_term_curr1, inclusive.

num_short_term_foll1 specifies the number of short-term reference pictures in RefPicSetStFoll1 when the short_term_ref_pic_set( ) syntax structure is used for derivation of the reference picture set of a coded picture, as describe below. The value of num_short_term_foll1 shall be in the range of 0 to max_num_ref_frames−num_short_term_curr0−num_short_term_curr1−num_short_term_foll0, inclusive.

short_term_ref_pic_id_delta_minus1[i] specifies the identification information of the i-th short-term reference picture included in the short_term_ref_pic_set( ) syntax structure.

TABLE 4

Slice header syntax

| slice_header( ) { | Descriptor |
|---|---|
|   lightweight_slice_flag | u(1) |
|   if( !lightweight_slice_flag ) { | |
|     slice_type | ue(v) |
|     pic_parameter_set_id | ue(v) |
|     if( IdrPicFlag ) { | |
|       idr_pic_id | ue(v) |
|       no_output_of_prior_pics_flag | u(1) |
|     } | |
|     pic_order_cnt_lsb | u(v) |
|     if( !IdrPicFlag ) { | |
|       short_term_ref_pic_set_pps_flag | u(1) |
|       if( short_term_ref_pic_set_pps_flag ) | |
|         short_term_ref_pic_set_idx | ue(v) |
|       Else | |
|         short_term_ref_pic_set( ) | |
|       if( long_term_ref_pics_present_flag ) | |
|         long_term_ref_pic_set( ) | |
|     } | |
|     if( slice_type = = P || slice_type = = B ) { | |
|       num_ref_idx_active_override_flag | u(1) |
|       if( num_ref_idx_active_override_flag ) { | |
|         num_ref_idx_l0_active_minus1 | ue(v) |
|         if( slice_type = = B ) | |
|           num_ref_idx_l1_active_minus1 | ue(v) |
|       } | |
|     } | |
|     ref_pic_list_modification( ) | |
|     ref_pic_list_combination( ) | |
|   } | |
|   if( entropy_coding_mode_flag && slice_type != I ) | |
|     cabac_init_idc | ue(v) |
|   first_slice_in_pic_flag | u(1) |
|   if( first_slice_in_pic_flag == 0 ) | |
|     slice_address | u(v) |
|   if( !lightweight_slice_flag ) { | |
|     slice_qp_delta | se(v) |
|     if( sample_adaptive_offset_enabled_flag ) | |
|       sao_param( ) | |
|     if( deblocking_filter_control_present_flag ) { | |
|       disable_deblocking_filter_idc | |
|       if( disable_deblocking_filter_idc != 1 ) { | |
|         slice_alpha_c0_offset_div2 | |
|         slice_beta_offset_div2 | |
|       } | |
|     } | |
|     if( slice_type = = B ) | |
|       collocated_from_l0_flag | u(1) |
|     if( adaptive_loop_filter_enabled_flag ) { | |
|       if( !shared_pps_info_enabled_flag ) | |
|         alf_param( ) | |
|       alf_cu_control_param( ) | |
|     } | |
|   } | |
| } | | no_output_of_prior_pics_flag specifies how the previously-decoded pictures in the decoded picture buffer are treated after decoding of an IDR picture. When the IDR picture is the first IDR picture in the bitstream, the value of no_output_of_prior_pics_flag may have no effect on the decoding process. When the IDR picture is not the first IDR picture in the bitstream and the value of pic_width_in_luma_samples or pic_height_in_luma_samples or max_dec_frame_buffering derived from the active sequence parameter set may be different from the value of pic_width_in_luma_samples or pic_height_in_luma_samples or max_dec_frame_buffering derived from the sequence parameter set active for the preceding picture, no_output_of_prior_pics_flag equal to 1 may, but not necessarily, be inferred by the decoder, regardless of the actual value of no_output_of_prior_pics_flag.

short_term_ref_pic_set_pps_flag equal to 1 specifies that the identification information of the set of short-term reference pictures included in the reference picture set for the current picture is present in the referred picture parameter set. short_term_ref_pic_set_pps_flag equal to 0 specifies that the identification information of the set of short-term reference pictures included in the reference picture set for the current picture is not present in the referred picture parameter set.

short_term_ref_pic_set_idx specifies the index of the short_term_ref_pic_set( ) syntax structure, included in the referred picture parameter set, that includes the identification information of the set of short-term reference pictures in the reference picture set for the current picture.

The variable NumShortTermCurr0 and NumShortTermCurr1 are specified as:

NumShortTermCurr0=num_short_term_curr0

NumShortTermCurr1=num_short_term_curr1

Where num_short_term_curr0 and num_short_term_curr0 are the syntax elements of the same names, respectively, in the short_term_ref_pic_set( ) syntax structure, either present in the referred picture parameter set and referenced by short_term_ref_pic_set_idx, or directly present in the slice header.

num_ref_idx_l0_active_minus1 specifies the maximum reference index for reference picture list 0 that shall be used to decode the slice.

When the current slice is a P or B slice and num_ref_idx_l0_active_minus1 is not present, num_ref_idx_l0_active_minus1 may be inferred to be equal to num_ref_idx_l0_default_active_minus1.

The value of num_ref_idx_l0_active_minus1 may be in the range of 0 to 15, inclusive.

num_ref_idx_l1_active_minus1 specifies the maximum reference index for reference picture list 1 that shall be used to decode the slice.

When the current slice is a P or B slice and num_ref_idx_l1_active_minus1 is not present, num_ref_idx_l1_active_minus1 may be inferred to be equal to num_ref_idx_l1_default_active_minus1.

The value of num_ref_idx_l1_active_minus1 may be in the range of 0 to 15, inclusive.

TABLE 5

Long-term reference picture set syntax

| long_term_ref_pic_set( ) { | Descriptor |
|---|---|
|   num_long_term_pps_curr | ue(v) |
|   num_long_term_add_curr | ue(v) |
|   num_long_term_pps_foll | ue(v) |
|   num_long_term_add_foll | ue(v) |
|   for( i = 0; i < num_long_term_pps_curr + | |
|   num_long_term_pps_foll; i++ ) | |
|     long_term_ref_pic_set_idx_pps[ i ] | ue(v) |
|   for( i = 0; i < num_long_term_add_curr + | |
|   num_long_term_add_foll; i++ ) | |
|     long_term_ref_pic_id_delta_add[ i ] | i(v) |
| } | |

The long-term reference picture set syntax may be for long-term pictures. A long-term picture may be defined as a reference picture for which the identification information is included in the long_term_ref_pic_set( ) syntax structure for a coded picture.

num_long_term_pps_curr specifies the number of all long-term reference pictures that the identification information is included in the referred picture parameter set and that may be used for inter prediction of the current picture. If num_long_term_pps_curr is not present, the value may be derived as equal to 0. The value of num_long_term_pps_curr may be in the range of 0 to max_num_ref_frames, inclusive.

num_long_term_add_curr specifies the number of all long-term reference pictures that the identification information is not included in the referred picture parameter set and that may be used for inter prediction of the current picture. If num_long_term_add_curr is not present, the value may be derived as equal to 0. The value of num_long_term_add_curr may be in the range of 0 to max_num_ref_frames−num_long_term_pps_curr, inclusive.

The variable NumLongTermCurr is specified as:

NumLongTermCurr=num_long_term_pps_curr+num_long_term_add_curr num_long_term_pps_foll specifies the number of all long-term reference pictures that the identification information is included in the referred picture parameter set, that are not used for inter prediction of the current picture, and that may be used for inter prediction of any of the pictures following the current picture in decoding order. If num_long_term_pps_foll is not present, the value may be derived as equal to 0. The value of num_long_term_pps_foll may be in the range of 0 to max_num_ref_frames, inclusive.

num_long_term_add_foll specifies the number of all long-term reference pictures that the identification information is not included in the referred picture parameter set, that are not used for inter prediction of the current picture, and that may be used for inter prediction of any of the following pictures in decoding order. If num_long_term_add_foll is not present, the value may be derived as equal to 0. The value of num_long_term_add_foll may be in the range of 0 to max_num_ref_frames−num_long_term_pps_foll, inclusive.

long_term_ref_pic_set_idx_pps[i] specifies the index, to the list of long-term reference picture identification information included in the referred picture parameter set, of the i-th long-term reference picture inherited from the referred picture parameter set to the reference picture set of the current picture. The value of long_term_ref_pic_set_idx_pps[i] may be in the range of 0 to 31, inclusive.

long_term_ref_pic_id_delta_add[i] specifies the long-term reference picture identification information of the i-th long-term reference picture that is not inherited from the referred picture parameter set but included in the reference picture set of the current picture. The number of bits used to represent long_term_ref_pic_id_add_curr[i] may be equal to long_term_pic_id_len_minus4+4.

With the above signaled or derived values (i.e., the values in Tables 1-5), video decoder 30 may derive the reference picture set. As described above, the derived reference picture set may identify reference pictures that can potentially be used to code/predict the current picture (i.e., the picture that is currently being decoded), and pictures that follow the current picture in decoding order. In accordance with the techniques described in this disclosure, the decoding order of all of the reference pictures in the derived reference picture set is earlier than the decoding order of the current picture.

The derivation process may include constructing the reference picture set from a plurality of reference picture subsets. This process may be invoked once per picture, after decoding of a slice header but prior to the decoding of any coding unit and prior to the decoding process for reference picture list construction of the slice. For example, from the derived values and the signaled syntax elements, video decoder 30 may determine the POC values for the reference pictures that belong to the reference picture set. From the determined POC values, video decoder 30 may construct reference picture subsets that together form the reference picture set. In this way, by constructing the reference picture subsets, video decoder 30 may construct the reference picture set. For example, video decoder 30 may order the reference picture subsets in a particular manner to derive the reference picture set. Ordering may refer to the manner in which video decoder 30 lists the reference picture subsets to derive the reference picture set.

As described above, to derive the reference picture set, video decoder 30 may construct a plurality of reference picture subsets. In some examples, video decoder 30 may construct six reference picture subsets. The six reference picture subsets may be named: RefPicSetStCurr0, RefPicSetStCurr1, RefPicSetStFoll0, RefPicSetStFoll1, RefPicSetLtCurr, and RefPicSetLtFoll. RefPicSetStCurr0 may be referred to as RefPicSetStCurrBefore, and RefPicSetStCurr1 may be referred to as RefPicSetStCurrAfter.

It should be understood that the six reference picture subsets are described for purposes of illustration, and should not be construed limiting. As one example, video decoder 30 may construct fewer reference picture subsets than six reference picture subsets, e.g., by combining some of the subsets. Some of these examples where video decoder 30 constructs less than six reference picture subsets are described below. However, for purposes of illustration, the techniques are described with examples where video decoder 30 constructs six reference picture subsets.

The RefPicSetStCurr0, RefPicSetStCurr1, RefPicSetStFoll0, and RefPicSetStFoll1 reference picture subsets may identify short-term reference pictures. In some examples, these reference picture subsets may identify short-term reference pictures based on whether the short-term reference pictures are earlier in display order or later in display order than the current picture being coded, as well as whether the short-term reference pictures can potentially be used for inter-predicting the current picture and pictures following the current picture in decoding order, or can potentially be used for inter-predicting only the pictures following the current picture in decoding order.

For example, the RefPicSetStCurr0 reference picture subset may include, and may only include, identification information, such as POC values, of all short-term reference pictures that have an earlier output or display order than the current picture, and that can potentially be used for reference in inter-prediction of the current picture, and can potentially be used for reference in inter-prediction of one or more pictures following the current picture in decoding order. The RefPicSetStCurr1 reference picture subset may include, and may only include, identification information of all short-term reference pictures that have a later output or display order than the current picture and that can potentially be used for reference in inter-prediction of the current picture, and can potentially be used for reference in inter-prediction of one or more pictures following the current picture in decoding order.

The RefPicSetStFoll0 reference picture subset may include, and may only include, identification information of all short-term reference pictures that have an earlier output or display order than the current picture, that can potentially be used for reference in inter-prediction of one or more pictures following the current picture in decoding order, and that cannot be used for reference in inter-prediction of the current picture. The RefPicSetStFoll1 reference picture subset may include, and may only include, identification information of all short-term reference pictures that have a later output or display order than the current picture, that can potentially be used for reference in inter-prediction of one or more pictures following the current picture in decoding order, and that cannot be used for reference in inter-prediction of the current picture.

The RefPicSetLtCurr and the RefPicSetLtFoll reference picture subsets may identify long-term reference pictures. In some examples, these reference picture subsets may identify long-term reference pictures based on whether the long-term reference pictures are earlier in display order or later in display order than the current picture being coded.

For example, the RefPicSetLtCurr reference picture subset may include, and may only include, the identification information of all long-term reference pictures that can potentially be used for reference in inter-prediction of the current picture, and that can potentially be used for reference in inter-prediction of one or more pictures following the current picture in decoding order. The RefPicSetLtFoll reference picture subset may include, and may only include, the identification information of all long-term reference pictures that can potentially be used for reference in inter-prediction of one or more pictures following the current picture in decoding order, and that cannot be used for reference in inter-prediction of the current picture.

If the current picture to be decoded is an IDR picture, video decoder 30 may set the RefPicSetStCurr0, RefPicSetStCurr1, RefPicSetStFoll0, RefPicSetStFoll1, RefPicSetLtCurr, and RefPicSetLtFoll reference picture subsets to empty. This may be because the IDR picture may not be inter-predicted and that no picture after the IDR picture in decoding order can use any picture prior to the IDR picture in decoding for reference. Otherwise (e.g., when the current picture is non-IDR picture), video decoder 30 may construct the short-term reference picture subsets and the long-term reference picture subsets by implementing the following pseudo code.

For example, when video decoder 30 decodes an instance of the short_term_ref_pic_set( ) syntax structure, either in the slice header or by reference to the referred picture parameter set, video decoder 30 may implement the following pseudo code to construct the RefPicSetStCurr0, RefPicSetStCurr1, RefPicSetStFoll0, and RefPicSetStFoll1 reference picture subsets.

```
cIdx = 0
for( i = 0, pocPred = PicOrderCnt( CurrPic ); i < num_short_term_curr0; pocPred = RefPicSetStCurr0[ i ], i++, cIdx++ )
    RefPicSetStCurr0[ i ] = pocPred – short_term_ref_pic_id_delta_minus1[ cIdx ]
    – 1
for( i = 0, pocPred= PicOrderCnt( CurrPic ); i < num_short_term_curr1; pocPred = RefPicSetStCurr1[ i ], i++, cIdx++ )
    RefPicSetStCurr1[ i ] = short_term_ref_pic_id_delta_minus1[ cIdx ] + 1 –
    pocPred
for( i = 0, pocPred= PicOrderCnt( CurrPic ); i < num_short_term_foll0; pocPred = RefPicSetStFoll0[ i ], i++, cIdx++ )
    RefPicSetStFoll0[ i ] = pocPred – short_term_ref_pic_id_delta_minus1[ cIdx ] –
    1
for( i = 0, pocPred= PicOrderCnt( CurrPic ); i < num_short_term_foll1; pocPred = RefPicSetStFoll1[ i ], i++, cIdx++ )
    RefPicSetStFoll1[ i ] = short_term_ref_pic_id_delta_minus1[ cIdx ] + 1 –
    pocPred
```

If video decoder 30 determines that the long_term_ref_pics_present_flag is equal to 0, video decoder 30 may set the RefPicSetLtCurr and the RefPicSetLtFoll to empty because, for this case, there are no long-term reference pictures. Otherwise, if video decoder 30 decodes an instance of the long_term_ref_pic_set( ) syntax structure in the slice header, video decoder 30 may implement the following pseudo code to construct the RefPicSetLtCurr and RefPicSetLtFoll reference picture subsets.

```
cIdx = 0
for( i = 0; i < num_long_term_pps_curr; i++, cIdx++ )
{
    pIdx = long_term_ref_pic_idx_pps[ i ]
    RefPicSetLtCurr[ cIdx ] = long_term_ref_pic_id_ pps[ pIdx ]
}
for( i = 0; i < num_long_term_add_curr; i++, cIdx++ )
{
    picIdDelta = long_term_ref_pic_id_delta_add[ i ]
    RefPicSetLtCurr[ cIdx ] = PicOrderCnt( CurrPic ) – picIdDelta
}
cIdx = 0
for( i = 0; i < num_long_term_pps_foll; i++, cIdx++ )
{
    pIdx = long_term_ref_pic_idx_pps[ i +
    num_long_term_pps_curr ]
    RefPicSetLtFoll[ cIdx ] = long_term_ref_pic_id_ pps[ pIdx ]
}
for( i = 0;i < num_long_term_add_foll; i++, cIdx++ )
{
    picIdDelta = long_term_ref_pic_id_delta_add[ i +
    num_long_term_add_curr]
    RefPicSetLtFoll[ cIdx] = PicOrderCnt( CurrPic ) – picIdDelta
}
```

In accordance with the techniques described in this disclosure, a reference picture with a particular value of PicOrderCnt (POC value) may be referred to as included in the reference picture set of a coded picture if the reference picture is included in any of the six subsets of the reference picture set of that coded picture. A reference picture with a particular value of PicOrderCnt is referred to as included in a particular subset of the reference picture set if the particular value of PicOrderCnt (POC value) is equal to one of the PicOrderCnt values included in the that subset.

After constructing the reference picture subsets, video decoder 30 may derive the reference picture set. For example, video decoder 30 may order the reference picture subsets to derive the reference picture set. As one example, video decoder 30 may list the RefPicSetStCurr0 reference picture subset, followed by the RefPicSetStCurr1 reference picture subset, followed by the RefPicSetStFoll0 reference picture subset, followed by the RefPicSetStFoll1 reference picture subset, followed by the RefPicSetLtCurr reference picture subset, and then the RefPicSetLtFoll reference picture subset. As another example, video decoder 30 may list the RefPicSetStCurr0 reference picture subset, followed by the RefPicSetStCurr1 reference picture subset, followed by the RefPicSetLtCurr reference picture subset, followed by the RefPicSetStFoll0 reference picture subset, followed by the RefPicSetStFoll1, and then the RefPicSetLtFoll reference picture subset.

Other permutations of the manner in which video decoder 30 orders the reference picture subsets may be possible for deriving the reference picture set. In some examples, the constructing of the reference picture subsets and the deriving of the reference picture set may be combined together. For example, the constructing of the reference picture subsets may automatically result in video decoder 30 deriving the reference picture set. In other words, video decoder 30 may not need to perform different steps for constructing the reference picture subsets and deriving the reference picture set, although it may be possible for video decoder 30 to first construct the reference picture subsets and then derive the reference picture set.

Also, in accordance with the techniques described in this disclosure, constructing the reference picture set in the manner described above may result in video decoder 30 satisfying the following restrictions. For example, a particular reference picture with a particular value of PicOrderCnt may not be included in more than one of the reference picture subsets of the reference picture set of the current picture. In other words, a reference picture identified in one of the reference picture subsets may not be identified in any of the other reference picture subsets. As another example, in the derived reference picture set, there may be no reference picture with temporal_id greater than the current picture that is included in any of the reference picture subsets that form the reference picture set.

As described above, the temporal identification value (temporal_id) may be a hierarchical value that indicates which pictures can be used for coding/predicting the current picture. In general, a picture with a particular temporal_id value can possibly be a reference picture for pictures with equal or greater temporal_id values, but not vice-versa. For example, a picture with a temporal_id value of 1 can possibly be a reference picture for pictures with temporal_id values of 1, 2, 3, . . . , but not for a picture with a temporal_ID value of 0.

The lowest temporal_id value may also indicate the lowest display rate. For example, if video decoder 30 only decoded pictures with temporal_id values of 0, the display rate may be 7.5 pictures per second. If video decoder 30 only decoded pictures with temporal_id values of 0 and 1, the display rate may be 15 pictures per second, and so forth.

In some examples, only pictures with temporal_id values less than or equal to the temporal_id of the current picture may be included in the reference picture set of the current picture. As described above, only pictures with temporal_id values less than or equal to the temporal_id of the current picture can be used as reference pictures. Thus, all reference pictures with lower or equal temporal_id values may be used by the current picture for inter-prediction and may be included in the reference picture set. Also, some reference pictures that have greater temporal_id values than the current picture and that are to be used by pictures following the current picture in decoding order and having greater temporal_id values than the current picture are excluded from the reference picture set.

With these techniques, signaling of temporal_id in addition to the picture identification for derivation of the reference picture set is not needed; hence, the reference picture set signaling becomes more efficient. For example, video encoder 20 may not signal temporal_id values of the reference pictures that belong to the reference picture set, and video decoder 30 may not need to receive temporal_id values of the reference pictures that belong to the reference picture set for purposes of deriving the reference picture set.

Furthermore, in this manner, the constructed reference picture subsets may not identify reference pictures with temporal_id values greater than that of the current picture. For example, video decoder 30 may be able to construct the reference picture subsets, and ensure that no reference picture identified in any of the reference picture subsets has a temporal_id value greater than that of the current picture because the bitstream conformance may require that the temporal_id values are not included in bitstream signaled by video encoder 20 and received by video decoder 30. In this manner, video decoder 30 may derive the reference picture set without receiving temporal identification values for the reference pictures that belong to the reference picture set.

In the above examples, video decoder 30 may construct six reference picture subsets, four for short-term reference pictures (i.e., RefPicSetStCurr0, RefPicSetStCurr1, RefPicSetStFoll0, and RefPicSetStFoll1), and two for long-term reference pictures (i.e., RefPicSetLtCurr and RefPicSetLtFoll). However, aspects of this disclosure are not so limited. In other examples, two or more of these reference picture subsets may be combined into one reference picture subset, resulting in fewer reference picture subsets that video decoder 30 constructs. The following describe some non-limiting examples in which video decoder 30 may construct fewer reference picture subsets. There may be other ways in which video decoder 30 may construct fewer reference picture subsets.

For instance, in some examples, there may be no separation of the subset for the current picture and the subset for the following pictures in decoding order. Thus, there may be two subsets for short-term reference pictures, referred to as RefPicSetSt0 and RefPicSetSt1, and there may be only one subset for long-term reference pictures, referred to as RefPicSetLt. In this example, the RefPicSetSt0 reference picture subset may be the concatenation of RefPicSetStCurr0 and RefPicSetStFoll0, with RefPicSetStCurr0 at the beginning of the concatenation result. In this example, the RefPicSetSt1 reference picture subset may be the concatenation of RefPicSetStCurr1 and RefPicSetStFoll1, with RefPicSetStCurr1 at the beginning of the concatenation result. The RefPicSetLt reference picture subset may be the concatenation of RefPicSetLtCurr and RefPicSetLtFoll, with RefPicSetLtCurr at the beginning of the concatenation result.

As another example, there may be no separation of the subset with earlier or later output order than the current picture. This may apply only to short-term reference pictures. Thus, there may be two subsets for short-term reference pictures, referred to as RefPicSetStCurr and RefPicSetStFoll. The RefPicSetStCurr reference picture subset may be the concatenation of RefPicSetStCurr0 and RefPicSetStCurr1, with RefPicSetStCurr0 at the beginning of the concatenation result. The RefPicSetStFoll reference picture subset may be the concatenation of RefPicSetStFoll0 and RefPicSetStFoll1, with RefPicSetStFoll0 at the beginning of the concatenation result.

As another example, both types of separations mentioned above may not be applied. Thus, there may be only one subset for short-term reference pictures, referred to as RefPicSetSt, and only one subset for long-term reference pictures, referred to as RefPicSetLt. The RefPicSetSt reference picture subset may be a concatenation of RefPicSetStCurr0, RefPicSetStCurr1, RefPicSetStFoll0, and RefPicSetStFoll1, in the order listed (or any other order), and RefPicSetLt may be the same as above.

The above techniques describe an example manner in which video decoder 30 may derive the reference picture set. During the encoding process, video encoder 20 may also need to decode encoded pictures for purposes of encoding subsequent pictures, in what is referred to as the reconstruction process. Accordingly, in some examples, video encoder 20 may also be configured to derive the reference picture set. In some examples, video encoder 20 may implement the same techniques that video decoder 30 implemented to derive the reference picture set. However, derivation of the reference picture set by video encoder 20 may not be required in every example, and video decoder 30 may be the only coder that derives the reference picture set.

Accordingly, in some examples, a video coder (e.g., video encoder 20 or video decoder 30) may code (e.g., encode or decode, respectively) information indicative of reference pictures that belong to a reference picture set. For example, video encoder 20 may signal an encoded bitstream that includes values to determine which reference pictures belong to the reference picture set. Similarly, video decoder 30 may decode the bitstream to determine which reference pictures belong to the reference picture set.

The video coder may construct a plurality of reference picture subsets that each identifies zero or more of the reference pictures. For example, the video coder may construct six reference picture subsets (i.e., the RefPicSetStCurr0, RefPicSetStCurr1, RefPicSetStFoll0, RefPicSetStFoll1, RefPicSetLtCurr, and RefPicSetLtFoll reference picture subsets), where each of the subsets identifies zero or more reference pictures. In some examples, the video coder may code the current picture based on the plurality of reference picture subsets.

For instance, the video coder may derive the reference picture set from the constructed plurality of reference picture subsets. For example, the video coder may order the reference picture subsets in any order to derive the reference picture set, or may derive the reference picture set as part of the construction of the reference picture subsets. In some examples, from the derived reference picture set, the video coder may code the current picture. Because the reference picture set is derived from the plurality of reference picture subsets, the video coder may be considered as coding the current picture based on the plurality of reference picture subsets.

In some examples, to order the reference picture subsets, the video coder may construct the reference picture subsets in the order in which the reference picture subset are to be listed in the reference picture set. For example, the video coder may first construct the RefPicSetLtCurr reference picture subset, then construct the RefPicSetLtFoll reference picture subset, then construct the RefPicSetStCurr0 reference picture subset, then construct the RefPicSetStCurr1 reference picture subset, then construct the RefPicSetStFoll0 reference picture subset, and then construct the RefPicSetStFoll1 reference picture subset. In this illustrative example, the order of the reference picture subsets in the reference picture set may be RefPicSetLtCurr, RefPicSetLtFoll, RefPicSetStCurr0, RefPicSetStCurr1, RefPicSetStFoll0, and RefPicSetStFoll1, in that order, although other orders are possible.

In accordance with the example techniques described in this disclosure, after deriving the reference picture set, video decoder 30 may being decoding of slices within the current picture. Part of the decoding process involves construction of one or two reference picture lists. A reference picture list is a list of reference pictures that is used for prediction of a P or B slice. For the decoding process of a P slice, there is one reference picture list (List 0). For the decoding process of a B slice, there are two reference picture lists (List 0 and List 1). List 0, sometimes referred to as reference picture list 0 or RefPicList0, is a reference picture list used for inter-prediction of a P or B slice. All inter-prediction used for P slices uses List 0. Reference picture list 0 is one of the two reference picture lists used for bi-prediction for a B slice, with the other being reference picture list 1. List 1, sometimes referred to as reference picture list 1 or RefPicList1, is a reference picture list used for prediction of a B slice. Reference picture list 1 is one of two reference picture lists used for prediction for a B slice, with the other being reference picture list 0. Some blocks in a B slice may be bi-predicted, using both List 0 and List 1, and some blocks in a B slice may be uni-predicted, using either List 0 or List 1.

To construct the reference picture lists, video decoder 30 may implement a default construction technique to construct initial List 0 and, for B slices, initial List 1. The construction of the initial List 0 and initial List 1 may be referred to as the initialization process. In some examples, the coded bitstream may indicate that video decoder 30 should modify the initial List 0 and/or initial List 1 to generate the final List 0 and the final List 1. The modification of the initial List 0 and/or initial List 1 may be referred to as the modification process. The modification process may not be required in every example, and the manner in which video decoder 30 may implement the modification process is described in more detail below. In accordance with the techniques described in this disclosure, when the modification of the initial List 0 or the initial List 1 is not needed, the final List 0 or the final List 1 (i.e., the reference picture list 0 or 1 that is used to decode the slice of the current picture) may be equal to the initial List 0 or the initial List 1. In this way, reference picture list reordering may not be needed.

In the techniques described in this disclosure, video decoder 30 may construct the initial List 0 or the initial List 1 in such a manner that video decoder 30 may not need to perform reordering of the reference pictures to be included in the initial List 0 or the initial List 1, regardless of whether the modification process is needed, because the reference pictures in each of the reference picture subsets are already in a proper order. For example, in some other techniques, regardless of whether the modification process is needed, reordering of the reference pictures to be included in the initial List 0 or the initial List 1 according to their POC values when adding or listing the reference pictures into the initial List 0 or the initial List 1 is needed.

In the initialization process, video decoder 30 may implement a default construction technique to construct the initial List 0 and the initial List 1. The default construction technique may mean that video decoder 30 constructs the initial reference picture lists without receiving syntax elements from video encoder 20 regarding the manner in which video decoder 30 should construct the initial reference picture lists, or which reference pictures should be identified in the initial reference picture lists.

Video decoder 30 may invoke the reference picture list construction process when decoding a P or B slice header. For example, when decoding a P slice, video decoder 30 may invoke the process for constructing initial List 0, but may not invoke the process for constructing the initial List 1 because a block in a P slice is only un-predicted with respect to a reference picture identified in List 0. When decoding a B slice, video decoder 30 may invoke the process for constructing the initial List 0 and constructing the initial List 1 because a block in a B slice may be bi-predicted with respect to reference pictures identified in each of the List 0 and the List 1.

In accordance with the example techniques described in this disclosure, video decoder 30 may utilize reference picture subsets for constructing the initial List 0 and the initial List 1. For example, the initial List 0 and the initial List 1 may list zero or more reference pictures identified in RefPicSetStCurr0, RefPicSetStCurr1, or RefPicSetLtCurr. In this example, when the reference picture list construction process is invoked, there may be at least one reference picture in RefPicSetStCurr0, RefPicSetStCurr1, and RefPicSetLtCurr. Although the initial List 0 and the initial List 1 may identify one or more reference pictures from the same reference picture subsets, the order in which video decoder 30 adds the reference pictures in the initial List 0 may be different than the order in which video decoder 30 adds the reference pictures in the initial List 1.

In this disclosure, when video decoder 30 adds (e.g., lists) reference pictures from one or more of the reference picture subsets in initial List 0 or initial List 1, this disclosure refers to video decoder 30 identifying the reference pictures in the initial List 0 or initial List 1. For example, the plurality of reference picture subsets may each identify zero or more reference pictures. To construct initial List 0 and initial List 1, video decoder 30 may identify one or more of the reference pictures that are identified in the reference picture subsets into the initial List 0 or the initial List 1.

To avoid confusion and to assist with clarity, this disclosure may refer to video decoder 30 listing or adding zero or more of the reference pictures that are identified in the reference picture subsets into the initial List 0 and the initial List 1 to construct the initial List 0 and the initial List 1. In this manner, video decoder 30 adding or listing reference pictures means that video decoder 30 adds or lists an identifier of the reference picture identified in reference picture subset. Accordingly, the resulting initial List 0 and initial List 1 include a plurality of identifiers for the reference pictures that can potentially be used for coding a block or slice of a current picture. These reference pictures are stored in respective decoded picture buffers of video decoder 30 and video encoder 20.

For example, to construct the initial List 0, video decoder 30 may first list (e.g., add) the reference pictures identified in RefPicSetStCurr0 in initial List 0, followed by the reference pictures identified in RefPicSetStCurr1 in initial List 0, and then reference pictures identified in RefPicSetLtCurr in initial List 0. To construct the initial List 1, video decoder 30 may first list (e.g., add) the reference pictures identified in RefPicSetStCurr1 in initial List 1, followed by the reference pictures identified in RefPicSetStCurr0 in initial List 1, and then reference pictures identified in RefPicSetLtCurr in initial List 1.

Moreover, in addition to adding the reference pictures in the reference picture subsets in different order, video decoder 30 may utilize a different number of reference pictures from each of the reference picture subsets when constructing List 0 and List 1. For example, List 0 and List 1 need not include all of the reference pictures from RefPicSetStCurr0, RefPicSetStCurr1, and RefPicSetLtCurr. Rather, the number of reference pictures that are listed from these example reference picture subsets to construct initial List 0 and initial List 1 may be based on the syntax elements that indicate the maximum number of reference pictures within each of the initial List 0 and the initial List 1.

For example, for the initial List 0, video encoder 20 may signal the num_ref_idx_l0_active_minus1 syntax element for P and B slices in the slice header, and the num_ref_idx_l1_active_minus1 syntax element for B slices that are bi-predicted. As described above, the num_ref_idx_l0_active_minus1 may define the maximum number of reference pictures that can be in the initial List 0, and num_ref_idx_l1_active_minus1 may define the maximum number of reference pictures that can be in the initial List 1. In some examples, it may be possible that the value of num_ref_idx_l0_active_minus1 is different than the value of num_ref_idx_l1_active_minus1, although this may not be necessary in every example. In some examples, the value of num_ref_idx_l0_active_minus1 may be the same as the value of num_ref_idx_l1_active_minus1.

As described above, video decoder 30 may receive in the coded bitstream the values for num_short_term_curr0 and num_short_term_curr1. Video decoder 30 may define the variable NumShortTermCurr0 equal to num_short_term_curr0 and define the variable NumShortTermCurr1 equal to num_short_term_curr1. NumShortTermCurr0 may indicate the number of reference pictures in the RefPicSetStCurr0 reference picture subset, and NumShortTermCurr1 may indicate the number of reference pictures in the RefPicSetStCurr1 reference picture subset.

Video decoder 30 may also receive in the coded bitstream the values for num_long_term_pps_curr and num_long_term_add_curr. Video decoder 30 may define the variable NumLongTermCurr as equal to num_long_term_pps_curr plus num_long_term_add_curr. NumLongTermCurr may indicate the number of reference pictures in RefPicSetLtCurr.

To construct the initial List 0, video decoder 30 may first add reference pictures in RefPicSetStCurr0 into the initial List 0 until video decoder 30 added all reference pictures in RefPicSetStCurr0 into the initial List 0, and as long as the number of entries in initial List 0 (e.g., the number of reference pictures identified in List 0) is less than or equal to num_ref_idx_l0_active_minus1. For example, NumShortTermCurr0 may indicate the number of reference pictures in the RefPicSetStCurr0 reference picture subset. In this example, video decoder 30 may list (e.g., add) reference pictures from the RefPicSetStCurr0 reference picture subset until the number of reference pictures listed from RefPicSetStCurr0 equals NumShortTermCurr0. However, while listing reference pictures of RefPicSetStCurr0 into initial List 0, if the total number of entries in initial List 0 equals num_ref_idx_l0_active_minus1, then video decoder 30 may stop adding reference pictures in the RefPicSetStCurr0 reference picture subset even if there are additional pictures in RefPicSetStCurr0 that have not been listed in initial List 0. In this case, video decoder 30 may have completed the construction of initial List 0.

After video decoder 30 listed all reference pictures in the RefPicSetStCurr0 reference picture subset and the total number of entries in initial List 0 is less than num_ref_idx_l0_active_minus1, video decoder 30 may then add reference pictures in RefPicSetStCurr1 until video decoder 30 identified all reference pictures in RefPicSetStCurr1, and as long as the number of entries in initial List 0 (e.g., the number of reference pictures identified in List 0) is less than or equal to num_ref_idx_l0_active_minus1. For example, similar to above, NumShortTermCurr1 may indicate the number of reference pictures in the RefPicSetStCurr1 reference picture subset. In this example, video decoder 30 may list reference pictures from the RefPicSetStCurr1 reference picture subset until the number of reference pictures listed from the RefPicSetStCurr1 equals NumShortTermCurr1. However, while listing reference pictures from RefPicSetStCurr1, if the total number of entries in initial List 0 equals num_ref_idx_l0_active_minus1, then video decoder 30 may stop adding reference pictures from the RefPicSetStCurr1 reference picture subset even if there are additional pictures in RefPicSetStCurr1 that have not been listed in initial List 0. In this case, video decoder 30 may have completed the construction of initial List 0.

After video decoder 30 lists all reference pictures in the RefPicSetStCurr1 reference picture subset and the total number of entries in initial List 0 is less than num_ref_idx_l0_active_minus1, video decoder 30 may then list reference pictures in RefPicSetLtCurr until video decoder 30 listed all reference pictures in RefPicSetLtCurr, and as long as the number of entries in initial List 0 (e.g., the number of reference pictures identified in List 0) is less than or equal to num_ref_idx_l0_active_minus1. For example, similar to above, NumLongTermCurr may indicate the number of reference pictures in the RefPicSetLtCurr reference picture subset. In this example, video decoder 30 may list reference pictures from the RefPicSetLtCurr reference picture subset until the number of reference pictures listed from the RefPicSetLtCurr equals NumLongTermCurr. However, while listing reference pictures from RefPicSetLtCurr into initial List 0, if the total number of entries in initial List 0 equals num_ref_idx_l0_active_minus1, then video decoder 30 may stop adding reference pictures in the RefPicSetLtCurr reference picture subset even if there are additional pictures in RefPicSetLtCurr that have not been listed in initial List 0. In this case, video decoder 30 may have completed the construction of initial List 0.

The following pseudo code illustrates the manner in which video decoder 30 may construct the initial List 0.

```
cIdx = 0
while( cIdx <= num_ref_idx_l0_active_minus1 )
{
    for( i=0; i < NumShortTermCurr0 && cIdx <=
num_ref_idx_l0_active_minus1; cIdx++, i++ )
        RefPicList0[ cIdx ] = RefPicSetStCurr0[ i ]
    for( i=0; i < NumShortTermCurr1 && cIdx <=
num_ref_idx_l0_active_minus1; cIdx++, i++ )
        RefPicList0[ cIdx ] = RefPicSetStCurr1[ i ]
    for( i=0; i < NumLongTermCurr && cIdx <=
num_ref_idx_l0_active_minus1; cIdx++, i++ )
        RefPicList0[ cIdx ] = RefPicSetLtCurr[ i ]
}
```

In the above pseudo code, RefPicList0 may be the initial List 0. In examples where modification of the List 0 is not needed, the final List 0 may equal the initial List 0. Therefore, in examples where modification of the List 0 is not needed, RefPicList0, in the above pseudo code, may be the final List 0.

Video decoder 30 may similarly construct the initial List 1. However, to construct the initial List 1, video decoder 30 may first add the reference pictures from the RefPicSetStCurr1 reference picture subset into initial List 1, followed by the RefPicSetStCurr0 reference picture subset into initial List 1, and followed by the RefPicSetLtCurr reference picture subset into initial List 1. Also, similar to above, if, while listing reference pictures from any one of the RefPicSetStCurr1, RefPicSetStCurr0, and RefPicSetLtCurr reference picture subsets, the total number of entries in the initial List 1 equals num_ref_idx_l1_active_minus1, video decoder 30 may stop adding reference pictures, even if there are additional reference pictures in these reference picture subsets.

For example, to construct the initial List 1, video decoder 30 may first list reference pictures from RefPicSetStCurr1 until video decoder 30 identified all reference pictures in RefPicSetStCurr1, and as long as the number of entries in the initial List 1 (e.g., the number of reference pictures identified in List 1) is less than or equal to num_ref_idx_l1_active_minus1. For example, the value of NumShortTermCurr1 may indicate when video decoder 30 completed listing all of the reference pictures in the RefPicSetStCurr1 reference picture subset. However, while listing reference pictures from RefPicSetStCurr1, if the total number of entries in the initial List 1 equals num_ref_idx_l1_active_minus1, then video decoder 30 may stop adding reference pictures in the RefPicSetStCurr1 reference picture subset even if there are additional pictures in RefPicSetStCurr1 that have not been listed in the initial List 1. In this case, video decoder 30 may have completed the construction of the initial List 1.

After video decoder 30 lists all reference pictures in the RefPicSetStCurr1 reference picture subset and the total number of entries in the initial List 1 is less than num_ref_idx_l1_active_minus1, video decoder 30 may then list reference pictures from RefPicSetStCurr0 until video decoder 30 listed all reference pictures in RefPicSetStCurr0, and as long as the number of entries in the initial List 1 (e.g., the number of reference pictures identified in List 1) is less than or equal to num_ref_idx_l1_active_minus1. For example, similar to above, the value of NumShortTermCurr0 may indicate when video decoder 30 completed listing all of the reference pictures in the RefPicSetStCurr0 reference picture subset. However, while listing reference pictures from RefPicSetStCurr0 into initial List 1, if the total number of entries in the initial List 1 equals num_ref_idx_l1_active_minus1, then video decoder 30 may stop adding reference pictures in the RefPicSetStCurr0 reference picture subset even if there are additional pictures in RefPicSetStCurr0 that have not been listed in the initial List 1. In this case, video decoder 30 may have completed the construction of the initial List 1.

After video decoder 30 lists all reference pictures in the RefPicSetStCurr0 reference picture subset and the total number of entries in the initial List 1 is less than num_ref_idx_l1_active_minus1, video decoder 30 may then list reference pictures in RefPicSetLtCurr until video decoder 30 lists all reference pictures in RefPicSetLtCurr, and as long as the number of entries in the initial List 1 (e.g., the number of reference pictures identified in List 1) is less than or equal to num_ref_idx_l1_active_minus1. For example, similar to above, the value of NumLongTermCurr may indicate when video decoder 30 completed listing all of the reference pictures in the RefPicSetLtCurr reference picture subset. However, while listing reference pictures from RefPicSetLtCurr, if the total number of entries in the initial List 1 equals num_ref_idx_l1_active_minus1, then video decoder 30 may stop adding reference pictures in the RefPicSetLtCurr reference picture subset even if there are additional pictures in RefPicSetLtCurr that have not been listed in the initial List 1. In this case, video decoder 30 may have completed the construction of the initial List 1.

The following pseudo code illustrates the manner in which video decoder 30 may construct the initial List 1.

```
cIdx = 0
while( cIdx <= num_ref_idx_l1_active_minus1 )
{
    for( i=0; i < NumShortTermCurr1 && cIdx <=
num_ref_idx_l1_active_minus1; cIdx++, i++ )
        RefPicList1[ cIdx ] = RefPicSetStCurr1 [ i ]
    for( i=0; i < NumShortTermCurr0 && cIdx <=
num_ref_idx_l1_active_minus1; cIdx++, i++ )
        RefPicList1[ cIdx ] = RefPicSetStCurr0[ i ]
    for( i=0; i < NumLongTermCurr && cIdx <=
num_ref_idx_l1_active_minus1; cIdx++, i++ )
        RefPicList1[ cIdx ] = RefPicSetLtCurr[ i ]
}
```

In the above pseudo code, RefPicList1 may be the initial List 1. In examples where modification of List 1 is not needed, the final List 1 may equal the initial List 1. Therefore, in examples where modification of List 1 is not needed, RefPicList1, in the above pseudo code, may be the final List 1.

The preceding is one example way in which video decoder 30 may construct the final list 0 and final list 1, when reference picture list modification is not needed. In other examples, video decoder 30 may add the reference picture subsets in a different order than those described above. In yet some other examples, video decoder 30 may add reference picture subsets other than those described above.

Although the preceding examples described the techniques for reference picture list construction being performed by video decoder 30, aspects of this disclosure are not so limited, and video encoder 20 may implement similar techniques for constructing the reference picture lists. However, it may not be necessary for video encoder 20 to construct the reference picture lists in the same manner in which video decoder 30 constructs the reference picture lists.

Accordingly, a video coder (e.g., video encoder 20 or video decoder 30) may be configured to code (e.g., encode or decode) information indicative of reference pictures that belong to a reference picture set. As described above, the reference pictures set identifies reference pictures that can potentially be used for inter-predicting a current picture and can potentially be used for inter-predicting one or more pictures following the current picture in decoding order.

The video coder may also be configured to construct a plurality of reference picture subsets that each identifies zero or more reference pictures. For example, the video coder may construct at least the RefPicSetStCurr0, RefPicSetStCurr1, and RefPicSetLtCurr reference picture subsets. The video coder may construct additional reference picture subsets, such as the ones described above.

The video coder may then add reference pictures from a first reference picture subset, followed by reference pictures from a second reference picture subset, and followed by reference pictures from the a third reference picture subset into an initial reference picture list as long as a number of initial reference picture list entries is not greater than a maximum number of allowable reference picture list entries. For example, the video coder may list reference pictures from the RefPicSetStCurr0 reference picture subset, followed by the RefPicSetStCurr1 reference picture subset, and followed by the RefPicSetLtCurr subset into the initial List 0 as long as the number of entries in the initial List 0 is not greater than num_ref_idx_l0_active_minus1. Again, the value of num_ref_idx_l0_active_minus1 may indicate the maximum number of allowable reference picture list entries for List 0.

In some examples, the video coder may add the reference pictures from the first reference picture subset in the initial reference picture list until all reference pictures in the first reference picture subset are listed in the initial reference picture list or the number of initial reference picture list entries is equal to the maximum number of allowable reference picture list entries. When the number of initial reference picture list entries is less than the maximum number of allowable reference picture list entries, and after adding the reference pictures from the first reference picture subset, the video coder may add the reference pictures from the second reference picture subset in the initial reference picture list until all reference pictures in the second reference picture subset are listed in the initial reference picture list or the number of initial reference picture list entries is equal to the maximum number of allowable reference picture list entries. When the number of initial reference picture list entries is less than the maximum number of allowable reference picture list entries, and after adding the reference pictures from the second reference picture subset, the video coder may add the reference pictures from the third reference picture subset in the initial reference picture list until all reference pictures in the third reference picture subset are listed in the initial reference picture list or the number of initial reference picture list entries is equal to the maximum number of allowable reference picture list entries.

The video coder may similarly construct the initial List 1. For example, the video coder may add reference pictures from the second reference picture subset, followed by reference pictures from the first reference picture subset, and followed by reference pictures from the third reference picture subset into initial List 1 as long as the number of initial reference picture list entries in initial List 1 is not greater than num_ref_idx_l1_active_minus1. The num_ref_idx_l1_active_minus1 syntax element may define the maximum number of allowable entries in List 1.

In some examples, such as when modification is not needed, the initial List 0 and initial List 1 may equal final List 0 and final List 1. In other words, the video coder may construct the final List 0 and final List 1 without modification of the initial List 0 and the initial List 1 when modification is not needed. In these cases, after constructing the initial List 0 and initial List 1, the video coder may not need to perform additional steps to construct the final List 0 and final List 1 (i.e., the reference pictures lists that the video coder uses to code a block of the current picture).

As indicated in the above pseudo code, video decoder 30 may construct the initial List 0, while cIdx is less than or equal to num_ref_idx_l0_active_minus1, and may construct initial List 1, while cIdx is less than or equal to num_ref_idx_l1_active_minus1. This may result in video decoder 30 constructing the initial List 0 and the initial List 1 without any non-completed entry in the reference picture lists. For example, in some other video coding techniques, a video decoder for these other video techniques would construct the initial List 0 and List 1, utilizing techniques other than those described in this disclosure. For these other video coding techniques, if the number of entries in the initial List 0 and the initial List 1 were less than the maximum allowable number of entries, the video decoder for these other video coding techniques, would fill the remaining entries in List 0 and List 1 with "no reference picture" for the non-completed entries. The non-completed entries refer to entries in List 0 and List 1 after the last entry that identifies a reference picture and up to the last possible entry.

As an illustrative example to assist with understanding, a video decoder for these other video coding techniques may construct a List 0 with five entries, where the maximum number of allowable entries is ten entries. In this example, the video decoder for these other video coding techniques would fill the sixth through tenth entries as "no reference picture." In this example, the non-completed entries would be the sixth entry (e.g., the entry after the last entry that identifies a reference picture) up to the tenth entry (e.g., the last possible entry as defined by the maximum number of allowable entries).

In accordance with the techniques of this disclosure, video decoder 30 may construct initial List 0 and initial List 1 such that there are no non-completed entries. Also, in examples where no reference picture list modification is required, final List 0 and final List 1 may equal initial List 0 and initial List 1. Therefore, in examples where no reference picture list modification is required, video decoder 30 may construct final List 0 and final List 1 such that there are no non-completed entries. Even where reference picture list modification is required, the modification may not result in any non-completed entries. Therefore, even in examples where reference picture list modification is required, video decoder 30 may construct final List 0 and final List 1 such that there are no non-completed entries.

For example, List 0 and List 1 may be considered as lists with entries, and each entry may identify a reference picture (e.g., by its POC value). In other words, video decoder 30 may identify a reference picture by its POC value in each entry of List 0 and List 1. The number of entries in List 0 and List 1 may be defined by the num_ref_idx_l0_active_minus1 and the num_ref_idx_l1_active_minus1 syntax elements, respectively.

To ensure that there are no non-completed entries, video decoder 30 may repeatedly list (e.g., add or identify) reference pictures from the reference picture subsets in initial List 0 and initial List 1 until video decoder 30 determines which reference picture should be identified in each possible entry of the initial List 0 and the initial List 1. For example, as described above, for constructing the initial List 0, after adding reference pictures from the RefPicSetStCurr0 and the RefPicSetStCurr1 reference picture subsets in the initial List 0, video decoder 30 may add reference pictures from the RefPicSetLtCurr reference picture subset in the initial List 0.

In some examples, it may be possible that the total number of entries in the initial List 0 is less than the maximum number of allowable entries in List 0 after video decoder 30 adds reference pictures from the RefPicSetLtCurr reference picture subset in the initial List 0. For instance, in the pseudo code for constructing the initial List 0, cIdx may indicate the number of entries in List 0. In some examples, after video decoder 30 identifies the reference pictures in RefPicSetLtCurr in initial List 0, the value of cIdx may be less than num_ref_idx_l0_active_minus1, where num_ref_idx_l0_active_minus1 specifies the maximum number of allowable entries in List 0.

In accordance with the techniques described in this disclosure, after listing the reference pictures from the three of the plurality of reference picture subsets, if the number of entries in the initial List 0 is less than the maximum number of allowable entries, video decoder 30 may repeatedly add reference pictures from the three reference picture subsets until all entries in List 0 are full. For example, after video decoder 30 adds reference pictures from the RefPicSetLtCurr reference picture set and the number of entries in the initial List 0 is less than the maximum number of allowable entries, video decoder 30 may then relist (e.g., re-add or re-identify) reference pictures from the RefPicSetStCurr0 reference picture subset.

In aspects described in this disclosure, when video decoder 30 lists the reference pictures from the RefPicSetStCurr0, RefPicSetStCurr1, and the RefPicSetLtCurr reference picture subsets, video decoder 30 may be considered as adding reference pictures from these plurality of reference picture subsets into a first set of entries in the reference picture list (e.g., List 0). For instance, the first set of entries may be the entries in the reference picture list in which video decoder 30 identified the reference pictures from the RefPicSetStCurr0, RefPicSetStCurr1, and the RefPicSetLtCurr reference picture subsets. Then, if the number of entries in the reference picture list is less than the maximum allowable number of entries, video decoder 30 may relist (e.g., re-add or re-identify) one or more reference pictures from at least one of the RefPicSetStCurr0, RefPicSetStCurr1, and the RefPicSetLtCurr reference picture subsets into entries in the reference picture list that are subsequent to the first set of entries. The entries subsequent to the first set of entries may be the entries following the first set of entries, in which video decoder 30 adds already listed reference pictures from one or more the RefPicSetStCurr0, RefPicSetStCurr1, and the RefPicSetLtCurr reference picture subsets, as described below.

If, while re-adding reference pictures from the RefPicSetStCurr0 reference picture subset, the total number of entries in initial List 0 equals num_ref_idx_l0_active_minus1, video decoder 30 may stop re-adding reference pictures in initial List 0. In this case, video decoder 30 may have completed the construction of initial List 0, and there may be no non-completed entries. Otherwise, video decoder 30 may re-add reference pictures from the RefPicSetStCurr0 reference picture subset until all reference pictures from the RefPicSetStCurr0 reference picture subset are relisted.

If after re-adding all reference pictures in the RefPicSetStCurr0 reference picture subset, the number of entries in the initial List 0 is less than num_ref_idx_l0_active_minus1, video decoder 30 may then re-add reference pictures from the RefPicSetStCurr1 reference picture subset, in a manner similar to the manner in which video decoder 30 relisted reference pictures from the RefPicSetStCurr0 reference picture subset. If after re-adding all reference pictures in the RefPicSetStCurr1 reference picture subset, the number of entries in the initial List 0 is less than num_ref_idx_l0_active_minus1, video decoder 30 may then re-add reference pictures from the RefPicSetLtCurr reference picture subset, in a manner similar to the manner in which video decoder 30 relisted reference pictures from the RefPicSetStCurr0 and RefPicSetStCurr1 reference picture subsets. Video decoder 30 repeatedly add reference pictures from the reference picture subsets until the number of entries in the initial List 0 is equal to the maximum number of allowable entries for List 0 (i.e., equal to num_ref_idx_l0_active_minus1).

For instance, assume that there is one reference picture in RefPicSetStCurr0, one reference picture in RefPicSetCurr1, and one reference picture in RefPicSetLtCurr. Also, assume that num_ref_idx_l0_active_minus1 equals five. In this example, video decoder 30 may identify the reference picture in RefPicSetStCurr0 in two entries in initial List 0. For example, video decoder 30 may identify the reference picture in RefPicSetStCurr0 in the first entry of initial List 0, and re-identify the reference picture in RefPicSetStCurr0 in the fourth entry of initial List 0. In this example, the index value for the reference picture in RefPicSetStCurr0 may index[0] for the first entry in the initial list 0, and index[3] for the fourth entry in initial list 0. Accordingly, in some examples, one reference picture from one of the reference picture subsets may be listed (e.g., identified) more than once in the initial reference picture lists.

Video decoder 30 may similarly construct initial List 1 such that there are no non-completed entries in initial List 1. For example, video decoder 30 may repeatedly add reference pictures from the RefPicSetStCurr1, RefPicSetStCurr0, and RefPicSetLtCurr reference picture subsets, in that order, until the number of entries in the initial List 1 equals the maximum number of allowable entries in List 1 (i.e., equals num_ref_idx_l1_active_minus1).

In this manner, because the "for" loops are nested within the "while" loop, in the above pseudo code for constructing the initial List 0 and the initial List 1, video decoder 30 may construct initial List 0 and initial List 1 such that there are no non-completed entries in the initial List 0 and the initial List 1 (i.e., no non-completed entries after the initialization process). In some examples, each of the entries in the initial List 0 and the initial List 1 may identify a reference picture from one of the reference picture subsets. In some examples, it may be possible one or more reference pictures from one of the reference picture subsets is identified more than once in the final reference pictures lists, but at different entries with different index values.

Although the preceding examples described the techniques for reference picture list construction with no non-completed entries as being performed by video decoder 30, aspects of this disclosure are not so limited, and video encoder 20 may implement similar techniques for constructing the reference picture lists with no non-completed entries. However, it may not be necessary for video encoder 20 to construct the reference picture lists in the same manner in which video decoder 30 constructs the reference picture lists.

Accordingly, a video coder (e.g., video encoder 20 or video decoder 30) may be configured to code (e.g., encode or decode) information indicative of reference pictures that belong to a reference picture set. As described above, the reference picture set identifies reference pictures that can potentially be used for inter-predicting a current picture and can potentially be used for inter-predicting one or more pictures following the current picture in decoding order.

The video coder may construct a plurality of reference picture subsets that each identifies zero or more of the reference pictures (e.g., the RefPicSetStCurr0, RefPicSetStCurr1, and the RefPicSetLtCurr reference picture subsets). The video coder may list (e.g., identify or add) reference pictures from the plurality of reference picture subsets into a first set of entries in a reference picture list. The video coder may determine whether a number of entries in the reference picture list is equal to a maximum number of allowable entries in the reference picture list.

When the number of entries in the reference picture list is not equal to the maximum number of allowable entries in the reference picture list, the video coder may repeatedly re-add (e.g., re-identify) one or more reference pictures from at least one of the reference pictures into entries in the reference picture list that are subsequent to the first set of entries until the number of entries in the reference picture list is equal to the maximum number of allowable entries in the reference picture list. The video coder may then code the current picture based on the constructed reference picture list.

As described above, in some examples, video encoder 20 may signal syntax elements that instruct video decoder 30 to modify an initial reference picture list or lists. For example, video decoder 30 may construct the initial reference picture list or lists in the manner described above. Then, in some instances, video decoder 30 may decode syntax elements from the coded bitstream that instruct video decoder 30 to modify the initial reference picture list or lists to construct the final reference picture list or lists. In general, in modification, video decoder 30 may map one or more of the pictures identified in one or more of the plurality of reference picture subsets in an entry of one of the reference picture lists after the initialization of the reference picture list.

For example, after video decoder 30 constructs the initial reference picture list or lists in the manner described above, video decoder 30 may modify at least one of the entries in one of the initial reference picture lists in the manner instructed by the coded bitstream. For instance, video encoder 20 may indicate as part of the modification syntax elements which picture from one of the plurality of reference picture subsets should be identified in an entry of the reference picture list, even though that entry of the reference picture list may already identify a reference picture as part of the initialization process. In some examples, the reference picture list modification techniques described in this disclosure may allow for modification in a flexible matter. For instance, it may be possible for video decoder 30 to identify in one or both of the reference picture lists a reference picture that is not in the initial reference picture lists.

As used in this disclosure, the phrase "modified reference picture list" refers to the reference picture list after the modification of the initial reference picture list. The modified reference picture list may be the final reference picture list. The number of entries in the modified reference picture list is num_ref_idx_l0_active_minus1+1 for List 0, and num_ref_idx_l1_active_minus1+1 for List 1. A reference picture may appear at more than one index (e.g., entry) in the modified reference lists for List 0 and List 1.

For reference picture list modification, video encoder 20 may signal the syntax elements of Table 6.

TABLE 6

| Reference Picture List Modification Syntax | |
|---|---|
| ref_pic_list_modification( ) { | Descriptor |
|   if( slice_type != 2 ) { | |
|     ref_pic_list_modification_flag_l0 | u(1) |
|     if( ref_pic_list_modification_flag_l0 ) | |
|       do { | |
|         modification_of_ref_pic_idc | ue(v) |
|         if( modification_of_ref_pic_idc != 3 ) | |
|           ref_pic_set_idx | |
|       } while( modification_of_ref_pic_idc != 3 ) | |
|   } | |
|   if( slice_type == 1 ) { | |
|     ref_pic_list_modification_flag_l1 | u(1) |
|     if( ref_pic_list_modification_flag_l1 ) | |
|       do { | |
|         modification_of_ref_pic_idc | ue(v) |
|         if( modification_of_ref_pic_idc != 3 ) | |
|           ref_pic_set_idx | |
|       } while( modification_of_ref_pic_idc != 3 ) | |
|   } | |
| } | |

The syntax elements modification_of_ref_pic_idc, short_term_ref_pic_set_idx and long_term_ref_pic_set_idx may specify the change from the initial reference picture lists to the reference picture lists to be used for decoding the slice.

ref_pic_list_modification_flag_l0 equal to 1 may specify that the syntax element modification_of_ref_pic_idc is present for specifying reference picture list 0. ref_pic_list_modification_flag_l0 equal to 0 specifies that this syntax element is not present.

When ref_pic_list_modification_flag_l0 is equal to 1, the number of times that modification_of_ref_pic_idc is not equal to 3 following ref_pic_list_modification_flag_l0 may not exceed num_ref_idx_l0_active_minus1+1.

ref_pic_list_modification_flag_l1 equal to 1 may specify that the syntax modification_of_ref_pic_idc is present for specifying reference picture list 1. ref_pic_list_modification_flag_l1 equal to 0 may specify that this syntax element is not present.

When ref_pic_list_modification_flag_l1 is equal to 1, the number of times that modification_of_ref_pic_idc is not equal to 3 following ref_pic_list_modification_flag_l1 may not exceed num_ref_idx_l1_active_minus1+1.

modification_of_ref_pic_idc together with short_term_ref_pic_set_idx or long_term_ref_pic_set_idx may specify which of the reference pictures are re-mapped. The values of modification_of_ref_pic_idc are specified in Table 7. The value of the first modification_of_ref_pic_idc that follows immediately after ref_pic_list_modification_flag_l0 or ref_pic_list_modification_flag_1 may not be equal to 3.

ref_pic_set_idx specifies the index, to RefPicSetStCurr0, RefPicSetStCurr1 or RefPicSetLtCurr, of the reference picture being moved to the current index in the reference picture list. The value of ref_pic_set_idx may be in the range of 0 to max_num_ref_frames, inclusive.

TABLE 7 modification_of_ref_pic_idc operations for modification of reference picture lists

| modification_of_ref_pic_idc | modification specified |
|---|---|
| 0 | For list 0: ref_pic_set_idx is present and corresponds to an index to RefPicSetStCurr0; For list 1: ref_pic_set_idx is present and corresponds to an index to RefPicSetStCurr1 |
| 1 | For list 0: ref_pic_set_idx is present and corresponds to an index to RefPicSetStCurr1; For list 1: ref_pic_set_idx is present and corresponds to an index to RefPicSetStCurr0 |
| 2 | ref_pic_set_idx is present and corresponds to an index to RefPicSetLtCurr |
| 3 | ref_pic_idx is not present and loop ends for modification of the initial reference picture list |

For reference picture list modification, when ref_pic_list_modification_flag_l0 is equal to 1, video decoder 30 may modify initial reference picture list 0 (i.e., initial List 0), and when ref_pic_list_modification_flag_l1 is equal to 1, video decoder 30 may modify initial reference picture list 1 (i.e., initial List 1). To assist with understanding the reference picture list modification, assume that the variable refIdxL0 is an index into initial List 0, and the variable refIdxL1 is an index into initial List 1. In other words, refIdxL0 may identify the entry of initial List 0 (i.e., an index to initial List 0 identifies an entry of initial List 0), and refIdxL1 may identify the entry of initial List 1. The refIdxL0 and refIdxL1 variables may be set equal to 0 initially.

Video decoder 30 may process the syntax elements for the modification_of_ref_pic_idc in the process the syntax elements occur in the bitstream. For example, if video encoder 20 signals that reference picture list modification is needed for the initial List 0, then video decoder 30 may process the order in which video encoder 20 signaled the modification_of_ref_pic_idc syntax elements for modifying the initial List 0. Similarly, if video encoder 20 signals that reference picture list modification is needed for initial List 1, then video decoder 30 may process the order in which video encoder 20 signal the modification_of_ref_pic_idc syntax elements for modifying initial List 1.

The value of the modification_of_ref_pic_idc syntax element may be 0, 1, 2, or 3, as indicated in Table 7. If the value of modification_of_ref_pic_idc syntax element is 3, then video decoder 30 may stop the modification of the initial reference picture list. Otherwise, video decoder 30 may keep modifying the initial reference picture list until the value of modification_of_ref_pic_idc syntax element is 3. For example, video encoder 20 may signal a plurality of values for the modification_of_ref_pic_idc syntax element, and video decoder 30 may process each of the values in the order in which the values are present in coded bitstream. When video decoder 30 processes the value of the modification_of_ref_pic_idc syntax element to be 3, video decoder 30 may determine that no further modification is needed.

The value of modification_of_ref_pic_idc syntax element being something other than 3 (i.e., 0, 1, or 2) may indicate from which reference picture subset video decoder 30 is to identify a reference picture that is to be listed (e.g., added into) in a current entry of the reference picture list. As described above, the current entry of the reference picture list may be identified by the value of refIdxLX, where LX is either List 0 or List 1. For example, if video decoder 30 is modifying initial List 0, and the modification_of_ref_pic_idc is 0, then according to Table 7, video decoder 30 may determine which reference picture from RefPicSetStCurr0 is to be identified in a current entry of the reference picture list based on the value of the ref_pic_set_idx. If video decoder 30 is modifying initial List 1, and the modification_of_ref_pic_idc is 0, then according to Table 7, video decoder 30 may determine which reference picture from RefPicSetStCurr1 is to be identified in a current entry of the reference picture list based on the value of the ref_pic_set_idx. For example, the variable curRefPicSet may define which reference picture subset video decoder 30 should use for modifying the initial List 0 or initial List 1.

For instance, if modification_of_ref_pic_idc is equal to 0, and video decoder 30 is modifying the initial List 0, then curRefPicSet is equal to the RefPicSetStCurr0 reference picture subset. If modification_of_ref_pic_idx is equal to 0, and video decoder 30 is modifying the initial List 1, then curRefPicSet is equal to RefPicSetStCurr1 reference picture subset.

If video decoder 30 is modifying the initial List 0, and the modification_of_ref_pic_idc is 1, then according to Table 7, video decoder 30 may determine which reference picture from RefPicSetStCurr1 is to be identified in a current entry of the reference picture list based on the value of the ref_pic_set_idx. If video decoder 30 is modifying the initial List 1, and the modification_of_ref_pic_idc is 1, then according to Table 7, video decoder 30 may determine which reference picture from RefPicSetStCurr0 is to be identified in a current entry of the reference picture list based on the value of the ref_pic_set_idx.

In this case, if modification_of_ref_pic_idc is equal to 1, and video decoder 30 is modifying the initial List 0, then curRefPicSet is equal to the RefPicSetStCurr1 reference picture subset. If modification_of_ref_pic_idx is equal to 1, and video decoder 30 is modifying the initial List 1, then curRefPicSet is equal to RefPicSetStCurr0 reference picture subset.

If video decoder 30 is modifying the initial List 0 or the initial List 1, and the modification_of_ref_pic_idc is 2, then according to Table 7, video decoder 30 may determine which reference picture from RefPicSetLtCurr is to be identified in a current entry of the reference picture list based on the value of the ref_pic_set_idx. In this example, if modification_of_ref_pic_idc is equal to 2, and video decoder 30 is modifying the initial List 0 or the initial List 1, then curRefPicSet is equal to the RefPicSetLtCurr reference picture subset.

As described above, the ref_pic_set_idx syntax element may indicate the index into one of the plurality of reference picture subsets. In other words, the ref_pic_set_idx syntax element may indicate to video decoder 30 the entry from one the plurality of reference picture subsets. Video decoder 30 may determine the reference picture identified in the entry of one of the plurality of reference picture subsets as the reference picture that is to be identified in a current index of initial List 0 or initial List 1.

The variable curRefPicPoc may equal PicOrderCnt(curRefPicSet[ref_pic_set_idx]). In this way, the value of curRefPicPoc may be the POC value of the reference picture identified in the ref_pic_set_idx entry of curRefPicSet. As described above, curRefPicSet may equal RefPicSetStCurr0, RefPicSetStCurr1, or RefPicSetLtCurr based on the value of the modification_of_ref_pic_idc syntax element and based on whether video decoder 30 is modifying the initial List 0 or the initial List 1.

Video decoder 30 may implement the following pseudo code for reference picture list modification. For example, in the following pseudo code, video decoder 30 may identify the picture with the POC value equal to curRefPicPoc in an entry of the initial reference picture list. The refIdxLX variable indicates the index position for the entry in the initial reference picture list. For example, when video decoder 30 is modifying the initial List 0, refIdxLX may be refIdxL0, and when video decoder 30 is modifying the initial List 1, refIdxLX may be refIdxL1.

After video decoder 30 identifies the reference picture with POC value equal to curRefPicPOC in the initial reference picture list (i.e., the initial List 0 or the initial List 1), video decoder 30 may shift the position of the other remaining pictures to later in the list. For example, video decoder 30 may move reference pictures identified in the initial reference picture list in entries following the current entry to a next entry to construct the modified reference picture list. As an illustrative example, assume that the current entry in the initial reference picture list is the third entry with index [2]. Video decoder 30 may move the reference picture currently identified in the third entry with index [2] into a next entry (e.g., the fourth entry with index [3]). Video decoder 30 may move the reference picture currently identified in the fourth entry with index [3] to the fifth entry with index [4]. In some examples, video decoder 30 may start from the last entry in the initial reference picture list, and move the reference picture identified in that entry to a temporary new entry. Then move the reference picture identified in the second to last entry to the last entry, and so forth, until video decoder 30 reaches the current entry.

Video decoder 30 may then increment the value of the refIdxLX variable. In this pseudo code, the length of the RefPicListX (i.e., RefPicList0 or RefPicList1) is temporarily made one element longer than the length needed for the final reference picture list. For instance, as described above, video decoder 30 may start from the last entry in the initial reference picture list, move that last entry to the temporary entry, move the second to last entry to the last entry, and so forth to modify the initial reference picture list. After execution of the pseudo code, video decoder 30 may retain only the entries in index 0 through num_ref_idx_lX_active_minus1, where num_ref_idx_lX_active_minus1 is num_ref_idx_l0_active_minus1 for List 0, and num_ref_idx_l1_active_minus1 for List 1.

---

```
for( cIdx = num_ref_idx_lX_active_minus1 + 1; cIdx > refIdxLX;
cIdx- - )
    RefPicListX[ cIdx ] = RefPicListX[ cIdx - 1]
RefPicListX[ refIdxLX++ ] = reference picture with PicOrderCnt equal to
curRefPicPoc
nIdx = refIdxLX
for( cIdx = refIdxLX; cIdx <= num_ref_idx_lX_active_minus1 + 1;
cIdx++ )
    if( PicOrderCnt( RefPicListX[ cIdx ] ) != currRefPicPoc)
        RefPicListX[ nIdx++ ] = RefPicListX[ cIdx ]
```

---

In the above pseudo code, RefPicListX refers to either RefPicList0 (i.e., the final List 0) or RefPicList1 (i.e., the final List 1) based on whether video decoder 30 is modifying the initial List 0 or the initial List 1. num_ref_idx_lX_active_minus1 refers to either num_ref_idx_l0_active_minus1 or ref_idx_l1_active_minus1 based on whether video decoder 30 is modifying initial List 0 or initial List 1.

The above techniques describe an example manner in which video decoder 30 may modify an initial reference picture list. During the encoding process, video encoder 20 may also need to decode encoded picture for purposes of encoding subsequent pictures. Accordingly, in some examples, video encoder 20 may also be configured to construct the initial reference picture lists, and modify the initial reference picture lists in the manner described above. However, video encoder 20 may not need to modify the initial reference picture list or lists in every example. In some examples, video decoder 30 may be the only coder that modifies the initial reference picture utilizing the techniques described above.

Accordingly, in some examples, a video coder (e.g., video encoder 20 or video decoder 30) may construct an initial reference picture list (e.g., initial List 0 or initial List 1) utilizing the techniques described above. The video coder may determine whether reference picture list modification is needed based on the coded syntax elements in the coded bitstream. When reference picture list modification is needed, the video coder may modify the initial reference picture list.

For example, when reference picture list modification is needed, the video coder may identify a reference picture in at least one of the constructed reference picture subsets. The video coder may list (e.g., add) the identified reference picture subset in a current entry of the initial reference picture list to construct a modified reference picture list. The video coder may then code (e.g., encode or decode) the current picture based on the modified reference picture list.

As one example, the video coder may construct the RefPicSetStCurr0, RefPicSetStCurr1, and the RefPicSetLtCurr reference picture subsets. To identify a reference picture in at least one of these reference picture subsets, the video coder may determine an index into at least one of these reference picture subsets. The video coder may then determine the reference picture identified at an entry of at least one of these reference picture subsets based on the determined index.

For example, the video coder may code (e.g., encode or decode) a first syntax element, such as the modification_of_ref_pic_idc syntax element, with which the video coder identifies one of the reference picture subsets (e.g., one of the RefPicSetStCurr0, RefPicSetStCurr1, and the RefPicSetLtCurr reference picture subsets). The video coder may code a second syntax element, such as the ref_pic_set_idx syntax element, that indicates the index into the identified reference picture subset (e.g., one of the RefPicSetStCurr0, RefPicSetStCurr1, and the RefPicSetLtCurr reference picture subsets).

In some examples, the video coder may be further configured to move the reference pictures in the initial reference picture list. For example, the video coder may move reference pictures identified in the initial reference picture list in entries following the current entry to a next entry in the modified reference picture list.

The previous examples described the manner in which video encoder 20 and video decoder 30 may derive a reference picture set, as well as example techniques for constructing reference picture lists when no modification is needed and when modification is needed. However, the techniques described in this disclosure are not so limited. In some examples, the techniques described in this disclosure may be directed to decoded picture buffer (DPB) management. The DPB may be a buffer that stores decoded pictures.

Each of video encoder 20 and video decoder 30 may include respective DPBs. For example, as part of the encoding process, video encoder 20 may decode a current picture, store the decoded picture in the DPB of video encoder 20, and utilize the decoded picture stored in the DPB for inter-predicting a subsequent picture. Similarly, as part of the decoding process, video decoder 30 may decode a current picture and store the decoded picture in the DPB of video decoder 30. Video decoder 30 may then utilize the decoded picture for inter-predicting a subsequent picture.

In some examples, the DPB for either video encoder 20 or video decoder 30 may store decoded pictures for output reordering or output delay. For example, video decoder 30 may determine that the decoded pictures should be reordered for outputting or that the output of a decoded picture should be delayed. In these examples, the DPB of video decoder 30 may store the decoded pictures for output reordering or output delay.

The DPB management techniques described in this disclosure may be directed to the manner in which the DPB outputs and removes decoded pictures. The output_flag syntax element may affect the decoded picture output and removal process, and may be defined as part of the network abstraction layer (NAL) unit semantics. A NAL unit may be defined as a syntax structure that includes an indication of the type of data to follow and bytes that include that data in the form of a raw byte sequence payload (RBSP) interspersed as necessary with emulation prevention bytes. The RBSP may be a syntax structure that includes an integer number of bytes that is encapsulated in a NAL unit. An RBSP may be either empty or has the form of a string of data bits that include syntax elements followed by an RBSP stop bit and followed by zero or more subsequent bits equal to 0. Table 8 defines the NAL unit syntax.

TABLE 8

NAL unit syntax

| nal_unit( NumBytesInNALunit ) { | Descriptor |
|---|---|
| forbidden_zero_bit | f(1) |
| nal_ref_idc | u(2) |
| nal_unit_type | u(5) |
| NumBytesInRBSP = 0 | |
| nalUnitHeaderBytes = 1 | |
| if( nal_unit_type = = 1 \|\| nal_unit_type = = 4 \|\| nal_unit_type = = 5 ) { | |
|    temporal_id | u(3) |
|    output_flag | u(1) |
|    reserved_one_4bits | u(4) |
|    nalUnitHeaderBytes += 1 | |
| } | |
| for( i = nalUnitHeaderBytes; i < NumBytesInNALunit; i++ ) { | |
|    if( i + 2 < NumBytesInNALunit && next_bits( 24 ) = = 0x000003 ) { | |
|      rbsp_byte[ NumBytesInRBSP++ ] | b(8) |
|      rbsp_byte[ NumBytesInRBSP++ ] | b(8) |
|      i += 2 | |
|      emulation_prevention_three_byte /* equal to 0x03 */ | f(8) |
|    } else | |
|      rbsp_byte[ NumBytesInRBSP++ ] | b(8) |
| } | |
| } | |

In Table 8, the output_flag may affect the decoded picture output and removal process as described in more detail below. For any picture, if output_flag is equal to 1, the picture is intended for output. Otherwise, the picture is never outputted. In the techniques described in this disclosure, the variable OutputFlag is equal to the output_flag syntax element.

In some examples, any coded slice NAL unit of the coded picture of the current access unit may be different from any coded slice NAL unit of the coded picture of the previous access unit in one or more of the following ways. For example, the pic_parameter_set_id values may be different, the nal_ref_idc values may be different, with one of the nal_ref_idc values being equal to 0. The pic_order_cnt_lsb values may be different. The IdrPicFlag values may be different. The IdrPicFlag may be equal to 1 for both, and the idr_pic_id values may be different.

In the techniques described in this disclosure, the access unit may be defined as a set of NAL units that are consecutive in decoding order and contain one coded picture. In addition to the coded picture one auxiliary coded picture, or other NAL units may not contain slices of a coded picture. In some examples, the decoding of an access unit may result in a decoded picture. The coded picture may be the coded representation of a picture to be used by the decoding process.

As indicated in Table 4, the slice header syntax may include the pic_parameter_set_id syntax element, the pic_order_cnt_lsb syntax element, the IdrPicFlag syntax element, and the idr_pic_id syntax element. As indicated in Table 8, the NAL unit syntax may include the nal_ref_idc syntax element.

For purposes of illustration, the DPB management techniques are described from the perspective of a hypothetical reference decoder (HRD). The HRD may be defined as a hypothetical decoder model that specifies constraints on the variability of conforming NAL unit streams or conforming byte streams that an encoding process may produce. However, in accordance with the techniques described in this disclosure, video decoder 30 may implement the DPB management techniques, and in some examples, it may be possible for video encoder 20 to also implement the DPB management techniques.

The HDR model may define a coded picture buffer (CPB), an instantaneous decoding process, and a decoded picture buffer (DPB). The CPB may be similar to the CPB of HDR models defined in other previous standards (i.e., the CPB may store coded pictures). The techniques described in this disclosure are directed to the DPB operations which are different than operations in other standards. Again, it should be understood that video decoder 30 and possibly video encoder 20 may implement the DPB operations as described below.

In general, in the techniques described in this disclosure are related to outputting and removal of decoded pictures in the DPB. Outputting of a decoded picture, in this context, means outputting of the decoding picture for display, storage or other purposes. However, a decoded picture that is outputted need not necessarily be removed from the DPB. For example, video decoder 30 may not remove a decoded picture that is outputted from the DPB because video decoder 30 may need to utilize that decoded picture as a reference picture for inter-predicting a subsequent picture. Removal of a decoded picture, in this context, means the removal of the decoded picture from the DPB.

For instance, video decoder 30 may store decoded pictures in the DPB of video decoder 30 in the order in which the picture are decoded. However, the decoding order of the pictures may not be the same as the output order of the pictures. For example, there may be pictures subsequent to a current picture in decoding order that are to be outputted earlier than the current picture. Accordingly, in some examples, video decoder 30 may perform reordering by which video decoder 30 reorders pictures in the DPB that are ordered in decoding order into output order. Video decoder 30 may then output the decoded pictures in their output order. Video decoder 30 may also remove pictures from the decoded picture if the picture is not needed for output (i.e., it has been outputted or is not intended for output) and is not needed for inter-prediction (i.e., not needed to be used as a reference picture for inter-prediction).

In the techniques described in this disclosure, video decoder 30 may remove a decoded picture from the DPB if the decoded picture has been outputted or is not intended for output, and if the decoded picture is not identified in the derived reference picture set, which is equivalent to being no longer needed for inter-prediction reference (i.e., no longer needed to be used as a reference picture for inter-prediction). Again, as described above, the reference picture set may identify reference pictures that can potentially be used to inter-predict the current picture, and that can potentially be used to inter-predict one or more pictures following the current picture in decoding order. In accordance with the techniques described in this disclosure, if a decoded picture is not identified in the derived reference picture set, then that decoded picture may not be needed as a reference picture for inter-predicting (e.g., decoding) the current picture and one or more pictures following the current picture in decoding order. Therefore, such a decoded picture can be removed from the DPB if the decoded picture is not needed for output because there may be no need to keep such a decoded picture in the DPB given that the decoded picture will not be used for inter-prediction.

Furthermore, in the techniques described in this disclosure, video decoder 30 may remove a decoded picture prior to the decoding of a current picture. For example, as described above, video decoder 30 may derive a reference picture set, and construct reference picture list(s) prior to the decoding of the current picture. Because video decoder 30 may derive the reference picture set prior to decoding the current picture, video decoder 30 may be configured to determine whether a decoded picture that is not needed for output should be removed prior to decoding the current picture. For example, after deriving the reference picture set and prior to decoding the current picture, video decoder 30 may determine whether an outputted decoded picture or a decoded picture not intended for output is not identified in the reference picture set. Then, prior to decoding the current picture, video decoder 30 may remove the decoded picture not needed for output (i.e., outputted already or not intended for output) if the decoded picture is not identified in the reference picture set.

In some examples, video decoder 30 may remove a decoded picture prior to decoding the current picture. However, video decoder 30 may remove the decoded picture after constructing the reference picture list(s). For instance, video decoder 30 may derive the reference picture set, and may construct the reference picture lists based on the reference picture set. Then, prior to decoding the current picture, video decoder 30 may remove the decoded picture. In some examples, video decoder 30 may also output the decoded picture after constructing the reference picture list(s).

This disclosure describes the removal techniques of decoded pictures in the DPB from at least two perspectives. In the first perspective, video decoder 30 may remove decoded pictures based on an output time if the pictures are intended for output. In the second perspective, video decoder 30 may remove decode pictures based on the POC values if the pictures are intended for output. In either perspectives, video decoder 30 may remove decoded pictures that are not needed for output (i.e., outputted already or not intended for output) when the decoded picture is not in the reference picture set, and prior to decoding the current picture.

The DPB may include a plurality of buffers, and each buffer may store a decoded picture that is to be used as a reference picture or is held for future output. Initially, the DPB is empty (i.e., the DPB fullness is set to zero). In the described example techniques, the removal of the decoded pictures from the DPB may occur before the decoding of the current picture, but after video decoder 30 parses the slice header of the first slice of the current picture.

In the first perspective, the following techniques may occur instantaneously at time $t_r(n)$ in the following sequence. In this example, $t_r(n)$ is CPB removal time (i.e., decoding time) of the access unit n containing the current picture. As described in this disclosure, the techniques occurring instantaneously may means that the in the HDR model, it is assumed that decoding of a picture is instantaneous (i.e., unlimited fast) with a time period for decoding a picture equal to zero.

If the current picture is an IDR picture, and when the IDR picture is not the first IDR picture and the value of value of pic_width_in_luma_samples or pic_height_in_luma_samples or max_dec_frame_buffering derived from the active sequence parameter set is different from the value of pic_width_in_luma_samples or pic_height_in_luma_samples or max_dec_frame_buffering derived from the sequence parameter set that was active for the preceding picture, respectively, video decoder 30 may infer that the no_output_of_prior_pics_flag syntax element is equal to 1, regardless of the actual value of no_output_of_prior_pics_flag. If the current picture is an IDR picture, and when no_output_of_prior_pics_flag is equal to 1 or is inferred to be equal to 1, video decoder 30 may empty all buffers of the DPB without outputting the pictures in the DPB, and may set the DPB fullness to 0.

As indicated above in Table 1, the sequence parameter set may include the pic_width_in_luma_samples, and the pic_height_in_luma_samples syntax elements. The sequence parameter set may also include the max_dec_frame_buffering syntax element. As indicated above in Table 4, the slice header syntax may include the no_output_of_prior_pics_flag syntax element.

When the current picture is not an IDR picture, video decoder 30 may remove all pictures (m) in the DPB for which the following conditions are true. The first condition may be that the picture is not included in the reference picture set of the current picture. The second condition may be that the picture has an OutputFlag equal to 0 or its DPB output time is less than or equal to the CPB removal time of the current picture. In this example, the CPB removal time is $t_r(n)$, which the instance at which the removal process occurs (e.g., a time prior to the decoding of the current picture). The DPB output time of a decoded picture m may be defined by the variable $t_{o,dpb}(m)$. Therefore, the DPB output time being less than or equal to the CPB removal time may be represented as $t_{o,dpb}(m) \le t_r(n)$. The derivation of the DPB output time ($t_{o,dpb}$) is defined in more detail below.

In this manner, video decoder 30 may remove decoded pictures from the DPB, prior to decoding a picture, based on the output time of the decoded picture and when the decoded picture is not identified in the reference picture set. When video decoder 30 removes a decoded picture from the DPB, video decoder 30 may decrement the DPB fullness by one.

The following describes the manner in which video decoder 30 may determine a time when to output the decoded picture (e.g., the DPB output time of a decoded picture), and also describes when video decoder 30 may store the decoded picture in the DPB. As described above, the DPB output time of the picture may be factor in determining whether or not that picture is removed from the DPB.

When video decoder 30 decodes a picture, video decoder 30 stores the picture in the DPB, and increments the DPB fullness by one. When the picture has an OutputFlag equal to 1, video decoder 30 may derive the DPB output time for the picture based on the following equation.

$$t_{o,dpb}(n) = t_r(n) + t_c * dpb\_output\_delay(n)$$

In the equation, dpb_output_delay(n) may be specified in the picture timing SEI message associated with the access unit that includes the picture. The SEI message may be defined in some standards such as the H.264/AVC standard.

The $t_{o,dpb}(n)$ value may define when a picture is to be outputted. For example, if OutputFlag is equal to 1 and $t_{o,dpb}(n)$ equals $t_r(n)$, video decoder 30 may output the picture. Otherwise, if OutputFlag is equal to 0, video decoder 30 may not output the picture. In instances where OutputFlag equals 1 and $t_{o,dpb}(n)$ is greater than $t_r(n)$, video decoder 30 may output the picture at a later time (e.g., at time $t_{o,dpb}(n)$).

In some examples, when video decoder 30 outputs a picture, video decoder 30 may crop the picture. For example, video decoder 30 may utilize the cropping rectangle specified in the active sequence parameter set for the picture. The techniques for cropping the picture are generally well established and described in standards such as the H.264/AVC standard.

In some examples, video decoder 30 may determine a difference between the DPB output time for a picture and the DPB output time for a picture following the picture in output order. For example, when picture (n) is a picture that video decoder 30 outputs, and is not the last picture of the bitstream that is output, video decoder 30 may determine the value of $\Delta t_{o,dpb}(n)$ is defined as:

$$\Delta t_{o,dpb}(n) = t_{o,dpb}(n_n) - t_{o,dpb}(n)$$

In the above equation, $n_n$ indicates the picture that follows after the picture (n) in output order and has OutputFlag equal to 1. Also, in the above equation, $\Delta t_{o,dpb}(n)$ represents the difference in the DPB output times between a picture and the following picture in output order.

In the second perspective for removing decoded pictures, the HDR may implement the techniques instantaneously when an access unit is removed from the CPB. Again, video decoder 30 may implement the removing of decoded pictures from the DPB, and video decoder 30 may not necessarily include the CPB. In general, in this disclosure, the removal of decoded pictures is performed by video decoder 30, and may also be performed by video encoder 20. In these examples, video decoder 30 and video encoder 20 may not require the CPB. Rather, the CPB is described as part of the HDR model for purposes of illustration only.

As above, in the second perspective for removing decoded pictures, video decoder 30 may remove the pictures from the DPB before the decoding of the current picture, but after parsing the slice header of the first slice of the current picture. Also, similar to the first perspective for removing decoded pictures, in the second perspective, video decoder 30 may perform similar functions to those described above with respect to the first perspective when the current picture is an IDR picture.

Otherwise, if the current picture is not an IDR picture, video decoder 30 may empty, without output, buffers of the DPB that store a picture that is marked as "not needed for output" and that store pictures not included in the reference picture set of the current picture. Video decoder 30 may also decrement the DPB fullness by the number of buffers that video decoder 30 emptied. When there is not empty buffer (i.e., the DPB fullness is equal to the DBP size), video decoder 30 may implement a "bumping" process described below. In some examples, when there is no empty buffer, video decoder 30 may implement the bumping process repeatedly unit there is an empty buffer in which video decoder 30 can store the current decoded picture.

When the current picture is an IDR picture for which the no_output_of_prior_pics_flag is not equal to 1, and is not inferred to equal to 1, video decoder 30 may perform the following. Video decoder 30 may empty, without output, buffers of the DPB that store a picture that is marked as "not needed for output" and that is not included in the reference picture set of the current picture. Video decoder 30 may empty all non-empty buffers in the DPB by repeatedly invoking the "bumping" process, and may set the DPB fullness to 0.

In other words, when the current picture is an IDR picture, video decoder 30 may implement techniques to empty all buffers in the DPB. When the current picture is not an IDR picture, video decoder 30 may implement techniques to remove decoded pictures to free buffers for storing the current decoded picture.

For example, after video decoder 30 decodes the current picture, video decoder 30 may store the current picture in the DPB, and increment the DPB fullness by one. In some examples, if the OutputFlag of the current picture is equal to 1, video decoder 30 may mark the current picture as "needed for output." Otherwise, if the OutputFlag of the current picture is equal to 0, video decoder 30 may mark the current picture as "not needed for output."

As described above, in some examples, video decoder 30 may implement a bumping process. In general, the bumping process involves outputting decoded pictures. For instance, video decoder 30 may implement the bumping process for when the current picture is an IDR picture and the no_output_of_prior_pics_flag is not equal to 1, and is not inferred to be equal to 1. Video decoder 30 may also implement the bumping process if there is no empty buffer in the DPB (i.e., the DPB fullness is equal to the size of the DPB), and an empty buffer is needed for storage of a decoded (non-IDR) picture.

In general, video decoder 30 may implement the following steps to implement the bumping process. Video decoder 30 may first determine the picture to be outputted. For example, video decoder 30 may select the picture having the smaller PicOrderCnt (POC) value of all the pictures in the DPB that are marked as "needed for output." Video decoder 30 may crop the selected picture using the cropping rectangle specified in the active sequence parameter set for the picture. Video decoder 30 may output the cropped picture, and may mark the picture as "not needed for output." Video decoder 30 may check the buffer of the DPB that stored the cropped and outputted picture. If the picture is not included in the reference picture set, video decoder 30 may empty that buffer and may decrement the DPB fullness by one.

Although the above techniques for the DPB management are described from the context of video decoder 30, in some examples, video encoder 20 may implement similar techniques. However, video encoder 20 implementing similar techniques is not required in every example. In some examples, video decoder 30 may implement these techniques, and video encoder 20 may not implement these techniques.

In this manner, a video coder (e.g., video encoder 20 or video decoder 30) may code information indicative of reference pictures that belong to a reference picture set. Again, the reference picture set may identify the reference pictures that can potentially be used for inter-predicting the current picture and can potentially be used for inter-predicting one or more picture following the current picture in decoding order.

The video coder may derive the reference picture set in any manner, including the example techniques described above. The video coder may determine whether a decoded picture stored in the decoded picture buffer is not needed for output and is not identified in the reference picture set. When the decoded picture has been outputted and is not identified in the reference picture set, the video coder may remove the decoded picture from the decoded picture buffer. Subsequent to removing the decoded picture, the video coder may code the current picture. For example, the video coder may construct the reference picture list(s) as described above, and code the current picture based on the reference picture list(s).

The previous examples described techniques that video encoder 20 and video decoder 30 may employ for deriving the reference picture set, constructing reference picture lists from the reference picture lists when modification is not needed and when modification is needed, as well as techniques for decoded picture buffer (DPB) management. However, aspects of this disclosure are not so limited. In some examples, the techniques described in this disclosure may be related to the manner which video encoder 20 signals which pictures belong in the reference picture set and are long-term reference pictures (or in other words, which picture belong to the long-term reference picture set), and the manner in which video decoder 30 determines which picture belong to the long-term reference picture set.

For example, Table 2 includes the num_long_term_ref_pics_pps, and the long_term_ref_pic_id_pps[i] syntax elements as being part of the picture parameter set. However, aspects of this disclosure are not so limited. In some other examples, the sequence parameter set (e.g., Table 1) may include the num_long_term_ref_pics_pps and the long_term_ref_pic_id_pps[i] syntax elements. In examples where the sequence parameter set includes these syntax elements, this disclosure may refer to the syntax elements as num_long_term_ref_pics_sps and long_term_ref_pic_id_sps[i] to avoid confusion. For purposes of illustration, the techniques are described with examples where the sequence parameter set includes these syntax elements.

Similar to the definition of the num_long_term_ref_pics_pps, the num_long_term_ref_pics_sps syntax element may specify the number of candidate long-term reference pictures that are included in the sequence parameter set. The value of num_long_term_ref_pics_sps may be in range of 0 to 32, inclusive. Similar to the definition of the long_term_ref_pic_id_pps[i] syntax element, the long_term_ref_pic_id_sps[i] syntax element may specify the i-th long term reference picture identification information included in the sequence parameter set.

In some examples, the long_term_ref_pic_id_sps[i] syntax element may indicate candidate long-term reference pictures that belong to a reference picture set of a current picture. The candidate long-term reference pictures are one or more of the candidate long-term reference pictures that may be long-term reference pictures that video decoder 30 may utilize to inter-predict the current picture or one or more picture following the current picture in decoding order. In other words, the candidate long-term reference pictures may indicate pictures that are long-term reference pictures and that can possibly be used to inter-predict the current picture and used to inter-predict one or more pictures following the current picture in decoding order. In some examples, the long_term_ref_pic_id_sps[i] syntax element may include the POC values for the candidate long-term reference pictures.

However, not all candidate long-term reference pictures are necessarily used for inter-prediction. For example, not all candidate long-term reference pictures belong in the reference picture set of a current picture. Rather, zero or more of the candidate long-term reference pictures belong in the reference picture set.

In the techniques described in this disclosure, video encoder 20 may signal the long_term_ref_pic_id syntax element in a parameter set (e.g., the long_term_ref_pic_id_sps syntax element in the sequence parameter set, or the long_term_ref_pic_id_pps syntax element in the picture parameter set). Video decoder 30 may receive the long_term_ref_pic_id syntax element and identify the candidate long-term reference pictures. In accordance with the techniques described in this disclosure, video decoder 30 may further determine which ones of the candidate long-term reference pictures belong to the reference picture set. For example, video decoder 30 may be configured to perform this determination based on additional syntax elements signaled by video encoder 20 in the coded bitstream.

As indicated in Table 4, video encoder 20 may signal the long_term_ref_pic_set( ) syntax structure in the slice header of the current picture. Table 5 describes the long_term_ref_pic_set( ) syntax structure. For instance, the long_term_ref_pic_set( ) syntax structure may include the num_long_term_pps_curr and the num_long_term_pps_foll syntax elements. Again, it should be noted that although the num_long_term_pps_curr and the num_long_term_pps_foll syntax elements are defined as the number of long-term reference pictures included in the picture parameter set, in examples where the candidate long-term reference pictures are included in the sequence parameter set, these syntax elements may define the number of candidate long-term reference pictures included in the sequence parameter set. For example, to avoid confusion, the num_long_term_pps_curr syntax element may be referred to as the num_long_term_sps_curr syntax element, and the num_long_term_pps_foll syntax element may be referred to as the num_long_term_sps_curr syntax element.

Similar to the num_long_term_pps_curr syntax element, the num_long_term_sps_curr syntax element may define the number of all long-term reference pictures whose identification information is included in the referred sequence parameter set, as the candidate long-term reference pictures, and that may be used for inter-prediction of the current picture and one or more pictures following the current picture in decoding order. Similar to the num_long_term_pps_foll syntax element, the num_long_term_sps_foll syntax element may define the number of all long-term reference pictures whose identification information is included in the sequence parameter set, as the candidate long-term reference pictures, that are not used for inter-prediction of the current picture, and that may be used for inter-prediction of one or more pictures following the current picture in decoding order.

Also, the long_term_ref_pic_set( ) syntax structure signaled in the slice header may include the long_term_ref_pic_set_idx_pps[i] syntax element. Again, in examples where the candidate long-term reference pictures are signaled in the sequence parameter set, the long_term_ref_pic_set_idx_pps[i] syntax element may be considered as the long_term_ref_pic_set_idx_sps[i] syntax element. Similar to the long_term_ref_pic_set_idx_pps[i] syntax element, the long_term_ref_pic_set_idx_sps[i] syntax element may define the index, into the list of the candidate long-term reference picture identification information included in the referred sequence parameter set, of the i-th long-term reference picture inherited form the reference picture parameter set to the reference picture set of the current picture. In other words, the long_term_ref_pic_set_idx_sps[i] syntax element may identify an index into the list of the candidate long-term reference pictures in the sequence parameter set. From the index, video decoder 30 may identify a long-term reference picture in the candidate long-term reference pictures, and may determine that the identified long-term reference picture belongs to the reference picture set of the current picture.

For example, video decoder 30 may implement the following pseudo code, similar to that in Table 5, to determine which ones of the candidate long-term reference pictures belong in the reference picture set of the current picture.

```
for (i = 0; i < num_long_term_sps_curr + num_long_term_sps_foll;
i++)
    long_term_ref_pic_set_idx_sps[i]
```

In this manner, video decoder 30 may decode syntax elements indicating candidate long-term reference pictures that are identified in a parameter set. For instance, if the parameter set is the sequence parameter set, video decoder 30 may decode the long_term_ref_pic_id_sps[i] syntax elements that indicate candidate long-term reference pictures that are identified in the sequence parameter set. If the parameter set is the picture parameter set, video decoder 30 may decode the long_term_ref_pic_id_pps[i] syntax elements that indicate candidate long-term reference pictures that are identified in the picture parameter set.

Video decoder 30 may also decode syntax elements that indicate which candidate long-term reference pictures, identified in the parameter set, belong in the reference picture set of the current picture. For example, if the parameter set is sequence parameter set, video decoder 30 may decode the num_long_term_sps_curr, the num_long_term_sps_foll, and the long_term_ref_pic_set_idx_sps[i] syntax elements, and if the parameter set is the picture parameter set, video decoder 30 may decode the num_long_term_pps_curr, the num_long_term_pps_foll, and the long_term_ref_pic_set_idx_pps[i] syntax elements. In either example, video decoder 30 may decode these syntax elements from the slice header of the current picture.

In accordance with the techniques described in this disclosure, the long_term_ref_pic_id_sps[i] and the long_term_ref_pic_id_pps[i] syntax elements may be considered as a list of picture order count (POC) values for the candidate long-term reference pictures that belong in the reference picture set, and may be coded (i.e., encoded or decoded) as part of a parameter set (e.g., the picture parameter set and the sequence parameter set). The long_term_ref_pic_set_idx_sps[i] or the long_term_ref_pic_set_idx_pps[i] syntax element may be considered as providing an index value into the list of the POC values for the candidate long-term reference pictures (e.g., an index into long_term_ref_pic_id_sps[i] or long_term_ref_pic_id_pps[i]). In some examples, the long_term_ref_pic_set_idx_sps[i] or the long_term_ref_pic_set_idx_pps[i] syntax element may be coded as part of the slice header of the current picture.

The above describes one way in which video encoder 20 and video decoder 30 may encode or decode, respectively, syntax elements for indicating which pictures belong to the long-term reference picture set of the current picture. From the syntax elements, video decoder 30 and video encoder 20 may determine which pictures belong to the long-term reference picture set of the current picture. After video decoder 30 and video encoder 20 determine which pictures belong to the long-term reference picture set, video encoder 20 and video decoder 30 may construct at least one reference picture subset of the plurality of reference picture subsets, and derive the reference picture set in the manner described above. For example, based on the determination as to which pictures belong to the long-term reference picture set, video encoder 20 and video decoder 30 may construct the RefPicSetLtCurr reference picture subset which video encoder 20 and video decoder 30 utilize to derive the reference picture set.

In some examples, there may be pictures that belong to the long-term reference picture set that are not included in the candidate long-term reference pictures. Accordingly, there may be additional ways in which video encoder 20 and video decoder 30 may determine which pictures belong to the long-term reference picture set of the current picture.

For example, as indicated in Table 5, the long_term_ref_pic_set( ) syntax structure of the slice header includes the long_term_ref_pic_id_delta_add[i] syntax element. This syntax element may specify long-term reference picture identification, such as POC values, of the i-th long-term reference picture that is not inherited from the reference picture parameter set, but is included in the reference picture set of the current picture. Again, in examples where candidate long-term reference pictures are identified in the sequence parameter set, the long_term_ref_pic_id_delta_add[i] syntax element may specify the long-term reference picture identification of the i-th long-term reference picture that is not inherited from the sequence parameter set, but is included in the reference picture set of the current picture.

In other words, the long_term_ref_pic_id_pps[i] or the long_term_ref_pic_id_sps[i] syntax element may identify candidate long-term reference pictures, but may not necessarily identify all of the long-term reference pictures in the reference picture set of the current picture. For example, there may be long-term reference pictures that are to be used for inter-predicting the current picture and one or more pictures following the current picture in decoding order that are not included in the listing of the candidate long-term reference pictures. For such long-term reference pictures, video encoder 20 and video decoder 30 may encode or decode, respectively, identification information that identifies long-term reference pictures that belong to the reference picture set of the current picture.

For instance, as indicated in Table 5, video encoder 20 and video decoder 30 may encode or decode, respectively, the num_long_term_add_curr and the num_long_term_add_foll syntax elements. The num_long_term_add_curr syntax element may define the number of all long-term reference pictures whose identification information is not included in the referred picture parameter set or sequence parameter set (as applicable) and that may be used for inter-prediction of the current picture and one or more pictures following the current picture in decoding order. The num_long_term_add_foll syntax element may define the number of all long-term reference pictures whose identification information is not included in the referred picture parameter set or sequence parameter set (as applicable), that may not be used for inter-prediction of the current picture, and that may be used for inter-prediction of one or more pictures following the current picture in decoding order.

Video decoder 30 may implement the following pseudo code to determine which long-term reference pictures belong in the reference picture set. In this example, the long-term reference pictures may not be included in the candidate long-term reference pictures.

```
for (i = 0; i < num_long_term_add_curr + num_long_term_add_foll;
i++)
    long_term_ref_pic_id_delta_add[i]
```

As described above, the techniques described in this disclosure may be performed in accordance with the HEVC standard. The following is a brief description of the HEVC standard to assist with understanding. Furthermore, although the techniques are described in context of the HEVC standard, the techniques may be extendable to other standards, including proprietary standards.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. A treeblock has a similar purpose as a macroblock of the H.264 standard. A slice includes a number of consecutive treeblocks in decoding order. A video frame or picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a treeblock may be split, and may also define a minimum size of the coding nodes. Treeblocks may be referred to as LCUs in some examples.

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

In general, a PU includes data related to the prediction process. For example, when the PU is intra-mode encoded, the PU may include data describing an intra-prediction mode for the PU. As another example, when the PU is inter-mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

In general, a TU is used for the transform and quantization processes. A given CU having one or more PUs may also include one or more transform units (TUs). Following prediction, video encoder 20 may calculate residual values corresponding to the PU. The residual values comprise pixel difference values that may be transformed into transform coefficients, quantized, and scanned using the TUs to produce serialized transform coefficients for entropy coding. This disclosure typically uses the term "video block" to refer to a coding node of a CU. In some specific cases, this disclosure may also use the term "video block" to refer to a treeblock, i.e., LCU, or a CU, which includes a coding node and PUs and TUs.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data.

The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Figure 2:
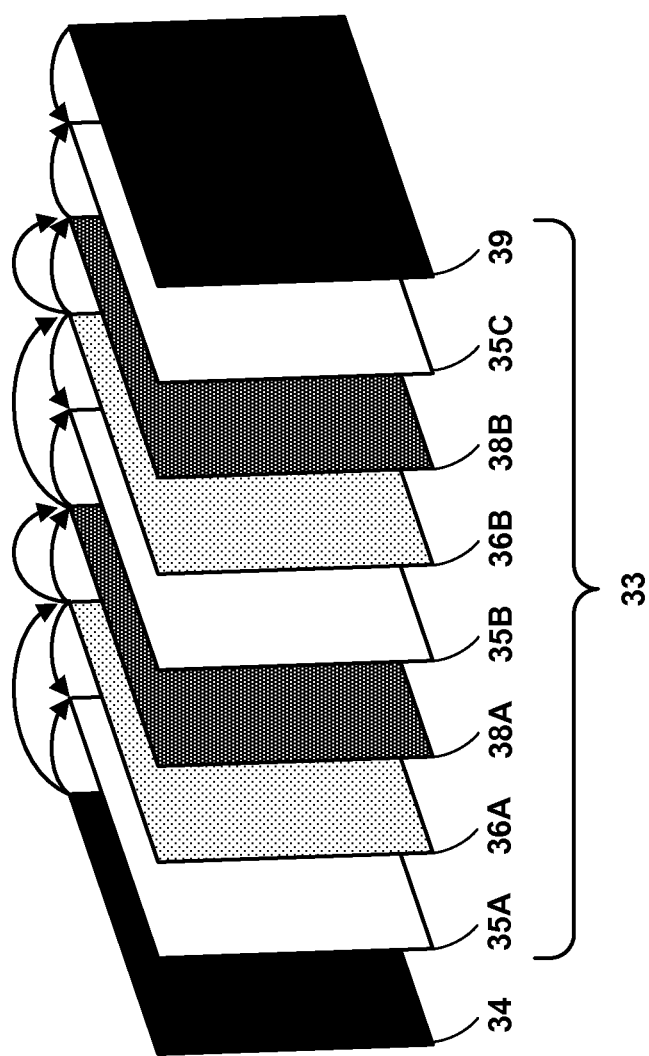
FIG. 2 is a conceptual diagram illustrating an example video sequence that includes a plurality of pictures that are encoded and transmitted.

FIG. 2 is a conceptual diagram illustrating an example video sequence 33 that includes a plurality of pictures that are encoded and transmitted. In some cases, video sequence 33 may be referred to as a group of pictures (GOP). Video sequence 33, as illustrated, includes pictures 35A, 36A, 38A, 35B, 36B, 38B, and 35C, and final picture 39 in display order. Picture 34 is a final picture in display order for a sequence occurring before sequence 33. FIG. 2 generally represents an exemplary prediction structure for a video sequence and is intended only to illustrate the picture references used for predicting video blocks of different slice or picture types (e.g., P picture or slice, or B picture or slice). An actual video sequence may contain more or fewer video pictures of different picture types and in a different display order. Video sequence 33 may include more or fewer pictures than those illustrated in FIG. 2, and the pictures illustrated in video sequence 33 are illustrated for purposes of understanding and as examples.

For block-based video coding, each of the video pictures included in sequence 33 may be partitioned into video blocks, such as coding units (CUs) or prediction units (PUs). For instance, each CU of a video picture may include one or more PUs. Video blocks in an intra-coded (I) picture are predicted using spatial prediction with respect to neighboring blocks in the same picture. Video blocks in an inter-coded (P or B) picture may use spatial prediction with respect to neighboring blocks in the same picture or temporal prediction with respect to other reference pictures.

Video blocks in a B picture may be predicted using bidirectional prediction to calculate two motion vectors from two different reference picture lists (e.g., reference picture lists 0 and 1, referred to as List 0 and List 1). In some cases, video blocks in a B picture may be predicted using unidirectional prediction from one of the two different reference picture lists (e.g., unidirectional B-coded). Video blocks in a P picture may be predicted using unidirectional prediction to calculate a single motion vector from a single reference picture list. In accordance with the emerging HEVC standard, the video blocks may be encoded using either unidirectional prediction to calculate a single motion vector from one of two reference picture lists or bidirectional prediction to calculate two motion vectors from the two reference picture lists. The two reference picture lists may contain past reference pictures or future reference pictures or both past and future reference pictures in display or output order, and always past reference pictures in decoding order, for example.

In the example of FIG. 2, final picture 39 is designated for intra-mode coding as an I picture. In other examples, final picture 39 may be coded with inter-mode coding (e.g., as a P picture) with reference to final picture 34 of the preceding sequence, which may be an I picture. Video pictures 35A-35C (collectively "video pictures 35") are designated for coding as B pictures using bidirectional prediction with reference to a past picture and a future picture. In the illustrated example, picture 35A is encoded as a B picture with reference to final picture 34 and picture 36A, as indicated by the arrows from pictures 34 and 36A to video picture 35A. Pictures 35B and 35C are similarly encoded.

Video pictures 36A-36B (collectively "video pictures 36") may be designated for coding as pictures using unidirectional prediction with reference to a past picture. In the illustrated example, picture 36A is encoded as a P picture with reference to final picture 34, as indicated by the arrow from picture 34 to video picture 36A. Picture 36B is similarly encoded.

Video pictures 38A-38B (collectively "video pictures 38") may be designated for coding using bidirectional prediction with reference to the same past picture. In other examples, video pictures 38 may be encoded using bidirectional prediction with reference to substantially similar past pictures included in the reference picture lists. In the illustrated example, picture 38A is encoded with two references to picture 36A, as indicated by the two arrows from picture 36A to video picture 38A. Picture 38B is similarly encoded.

In accordance with the techniques described in this disclosure, video encoder 20 may signal a reference picture set for each of the pictures in sequence 33. For example, for picture 35A, this reference picture set may identify all reference pictures that can be used to inter-predict picture 35A, as well as all reference pictures that can potentially be used for inter-predicting pictures following picture 35A in decoding order. For example, the reference picture set for picture 35A may include the POC value for picture 34 and picture 36A, as well as POC values for additional reference pictures such as those that can potentially be used for inter-predicting pictures following picture 35A in decoding order. The pictures following picture 35A may be those pictures that follow picture 35A in decoding order, and that are within video sequence 33, in this example.

Video decoder 30 may then derive the reference picture set for picture 35A in the manner described above. For example, video decoder 30 may determine the POC values for the reference pictures that belong to the reference picture set, as described above. Video decoder 30 may further construct at least four or at least five reference picture subsets, and in some examples, up to the six reference picture subsets descried above. Video decoder 30 may arrange the six reference picture sets in a particular order to derive the reference picture set for picture 35A.

Video decoder 30 may further construct initial reference picture lists in the manner described above, wherein no reordering of pictures to be included in the initial reference pictures lists is needed. When reference picture list modification is disabled, video decoder 30 may set the final reference picture lists equal to the initial reference picture lists. Also, video decoder 30 may construct the reference picture lists in such a manner that there are no non-completed entries in the reference picture lists. For example, video decoder 30 may repeatedly list reference pictures from the reference picture subsets until the number of entries in the reference picture lists is equal to the maximum number of allowable entries of the reference picture lists. In some examples, video decoder 30 may modify the initial reference picture lists in the manner described above (e.g., based on reference pictures in at least one of the constructed reference picture subsets). Furthermore, in some examples, video decoder 30 may remove decoded pictures from the DPB of video decoder 30 utilizing the example techniques described in this disclosure, such as removing decoded pictures that are not identified in the reference picture set of the current picture to be decoded and that are not needed for output. Also, in some examples, video decoder 30 may determine which long-term reference pictures belong in the reference picture set in the manner described above, wherein identification information of a list of candidate long-term reference pictures may be included in a parameter set.

Figure 3:
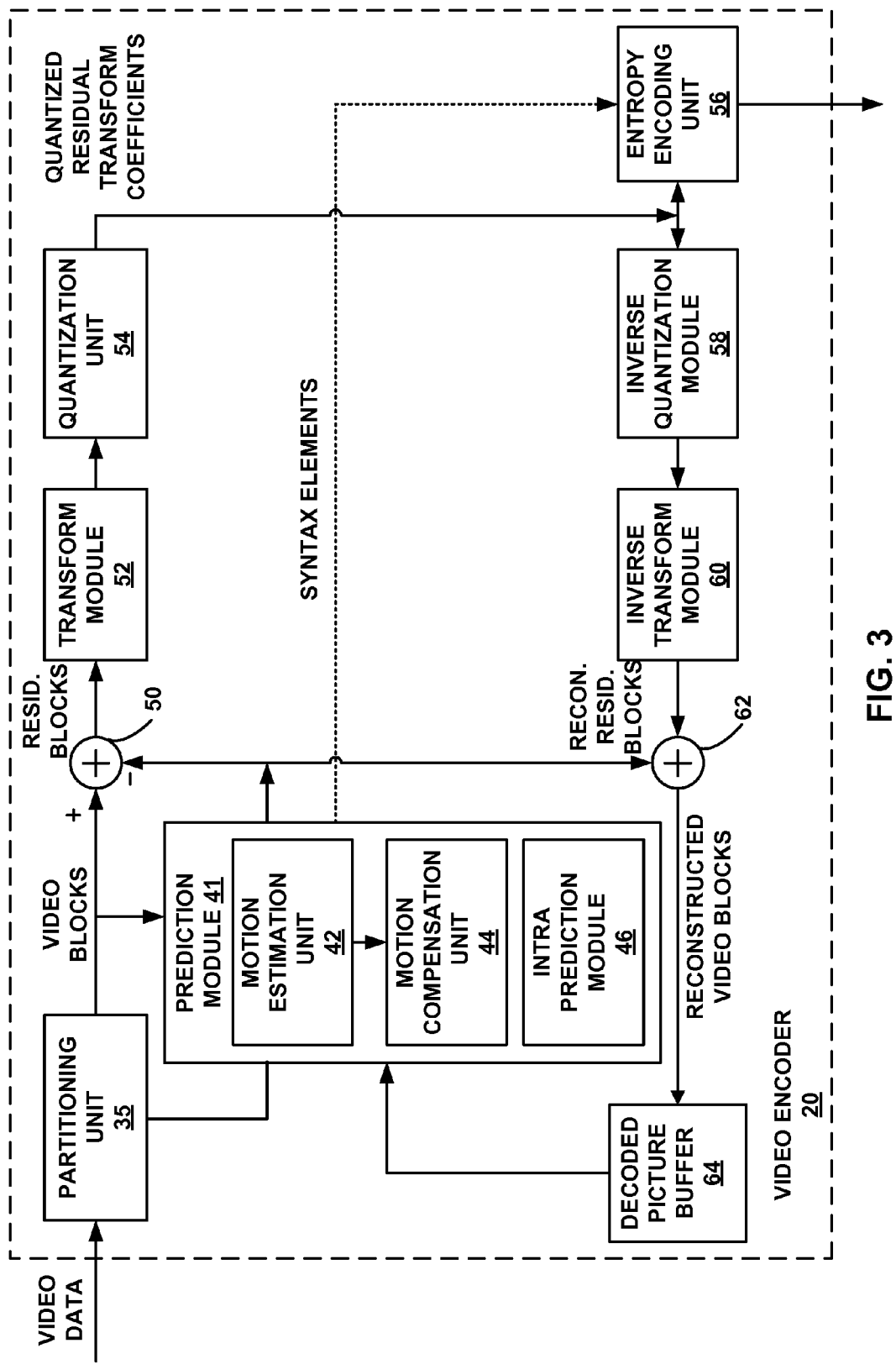
FIG. 3 is a block diagram illustrating an example video encoder that may implement the techniques described in this disclosure.

FIG. 3 is a block diagram illustrating an example video encoder 20 that may implement the techniques described in this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 3, video encoder 20 includes a partitioning unit 35, prediction module 41, decoded picture buffer (DPB) 64, summer 50, transform module 52, quantization unit 54, and entropy encoding unit 56. Prediction module 41 includes motion estimation unit 42, motion compensation unit 44, and intra prediction module 46. For video block reconstruction, video encoder 20 also includes inverse quantization unit 58, inverse transform module 60, and summer 62. A deblocking filter (not shown in FIG. 3) may also be included to filter block boundaries to remove blockiness artifacts from reconstructed video. If desired, the deblocking filter would typically filter the output of summer 62. Additional loop filters (in loop or post loop) may also be used in addition to the deblocking filter.

As shown in FIG. 3, video encoder 20 receives video data, and partitioning unit 35 partitions the data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction module 41 may select one of a plurality of possible coding modes, such as one of a plurality of intra coding modes or one of a plurality of inter coding modes, for the current video block based on error results (e.g., coding rate and the level of distortion). Prediction module 41 may provide the resulting intra- or inter-coded block to summer 50 to generate residual block data and to summer 62 to reconstruct the encoded block for use as a reference picture.

Intra prediction module 46 within prediction module 41 may perform intra-predictive coding of the current video block relative to one or more neighboring blocks in the same picture or slice as the current block to be coded to provide spatial compression. Motion estimation unit 42 and motion compensation unit 44 within prediction module 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices or B slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in decoded picture buffer 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in decoded picture buffer 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

Intra-prediction module 46 may intra-predict a current block, as an alternative to the inter-prediction performed by motion estimation unit 42 and motion compensation unit 44, as described above. In particular, intra-prediction module 46 may determine an intra-prediction mode to use to encode a current block. In some examples, intra-prediction module 46 may encode a current block using various intra-prediction modes, e.g., during separate encoding passes, and intra-prediction module 46 (or mode select unit 40, in some examples) may select an appropriate intra-prediction mode to use from the tested modes. For example, intra-prediction module 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction module 46 may calculate ratios from the distortions and rates for the various encoded blocks to determine which intra-prediction mode exhibits the best rate-distortion value for the block.

After selecting an intra-prediction mode for a block, intra-prediction module 46 may provide information indicative of the selected intra-prediction mode for the block to entropy encoding unit 56. Entropy encoding unit 56 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction module 41 generates the predictive block for the current video block via either inter-prediction or intra-prediction, video encoder 20 forms a residual video block by subtracting the predictive block from the current video block. The residual video data in the residual block may be included in one or more TUs and applied to transform module 52. Transform module 52 transforms the residual video data into residual transform coefficients using a transform, such as a discrete cosine transform (DCT) or a conceptually similar transform. Transform module 52 may convert the residual video data from a pixel domain to a transform domain, such as a frequency domain.

Transform module 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform module 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in decoded picture buffer 64. The reference block may be used by motion estimation unit 42 and motion compensation unit 44 as a reference block to inter-predict a block in a subsequent video frame or picture.

In accordance with this disclosure, prediction module 41 represents one example unit for performing the example functions described above. For example, prediction module 41 may determine which reference pictures belong to a reference picture set, and cause video encoder 20 to code information indicative of the reference pictures that belong to the reference picture set. Also, during the reconstruction process (e.g., the process used to reconstruct a picture for use as a reference picture and storage in decoded picture buffer 64), prediction module 41 may construct the plurality of reference picture subsets that each identifies one or more of the reference pictures. Prediction module 41 may also derive the reference picture set from the constructed plurality of reference picture subsets. Also, prediction module 41 may implement any one or more of the sets of example pseudo code described above to implement one or more example techniques described in this disclosure.

In some examples, prediction module 41 may construct the initial reference picture lists in the manner described above. In some examples, no reordering of the pictures to be included in the initial reference picture lists is needed. Also, prediction module 41 may construct the reference picture lists in such a manner that there are no non-completed entries in the reference picture lists. In some examples, prediction module 41 may also modify the initial reference picture lists in the manner described above to construct the modified reference picture list. Furthermore, in some examples, prediction module 41 may implement the removal of decoded pictures from DPB 64 in the manner described above. Moreover, in some examples, prediction module 41 may be configured to determine which long-term reference pictures belong to the reference picture set for the current picture in the manner described above.

In other examples, a unit other than prediction module 41 may implement the examples described above. In some other examples, prediction module 41 in conjunction with one or more other units of video encoder 20 may implement the examples described above. In yet some other examples, a processor or unit of video encoder 20 (not shown in FIG. 3)

may, alone or in conjunction with other units of video encoder 20, implement the examples described above.

Figure 4:
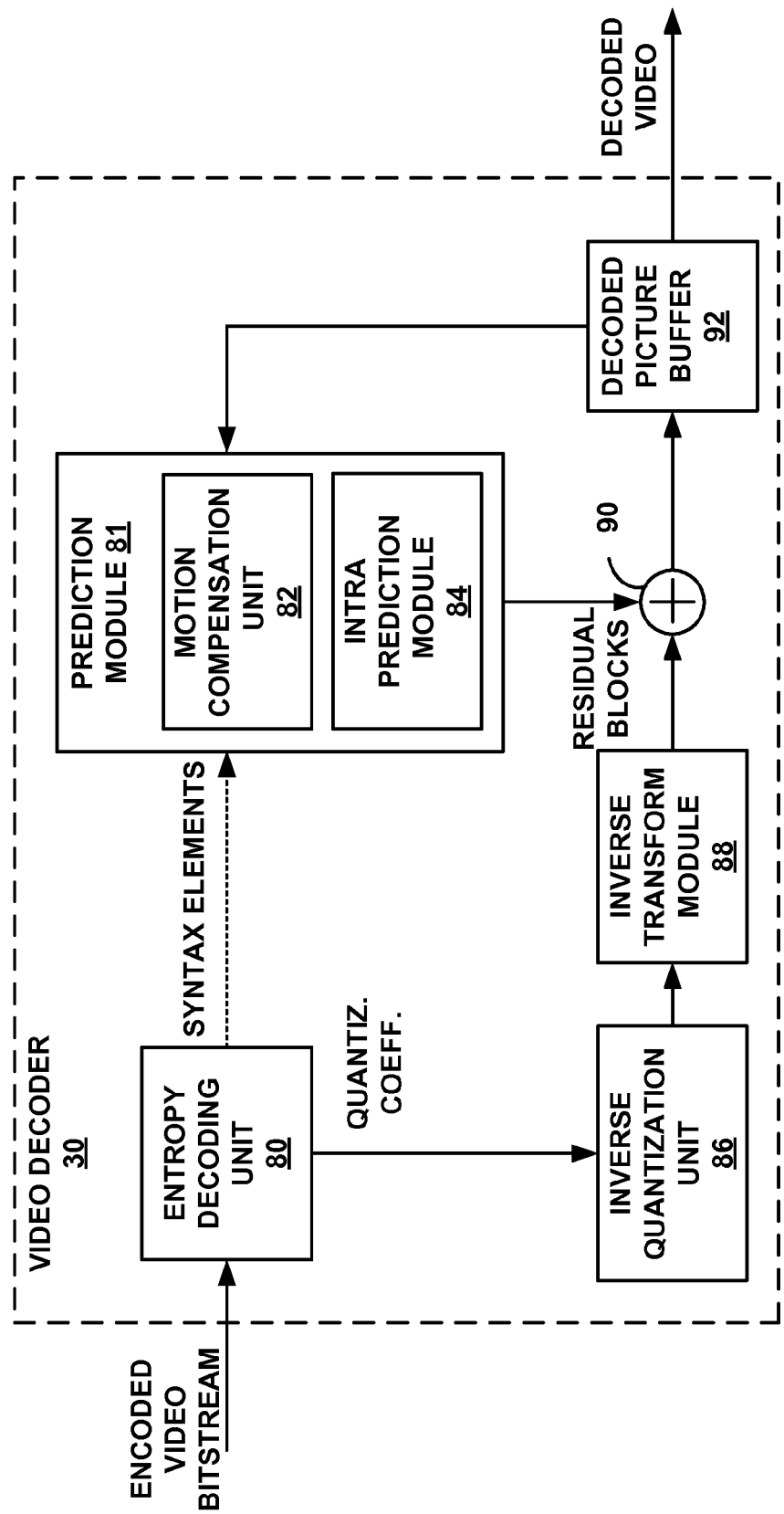
FIG. 4 is a block diagram illustrating an example video decoder that may implement the techniques described in this disclosure.

FIG. 4 is a block diagram illustrating an example video decoder 30 that may implement the techniques described in this disclosure. In the example of FIG. 4, video decoder 30 includes an entropy decoding unit 80, prediction module 81, inverse quantization unit 86, inverse transformation unit 88, summer 90, and decoded picture buffer (DPB) 92. Prediction module 81 includes motion compensation unit 82 and intra prediction module 84. Video decoder 30 may, in some examples, perform a decoding pass generally reciprocal to the encoding pass described with respect to video encoder 20 from FIG. 3.

During the decoding process, video decoder 30 receives an encoded video bitstream that represents video blocks of an encoded video slice and associated syntax elements from video encoder 20. Entropy decoding unit 80 of video decoder 30 entropy decodes the bitstream to generate quantized coefficients, motion vectors, and other syntax elements. Entropy decoding unit 80 forwards the motion vectors and other syntax elements to prediction module 81. Video decoder 30 may receive the syntax elements at the video slice level and/or the video block level.

When the video slice is coded as an intra-coded (I) slice, intra prediction module 84 of prediction module 81 may generate prediction data for a video block of the current video slice based on a signaled intra prediction mode and data from previously decoded blocks of the current picture. When the video picture is coded as an inter-coded (i.e., B or P) slice, motion compensation unit 82 of prediction module 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in decoded picture buffer 92. In some examples, video decoder 30 may construct List 0 and List 1 from the reference pictures identified in the derived reference picture set.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform module 88 applies an inverse transform, e.g., an inverse DCT, an inverse integer transform, or a conceptually similar inverse transform process, to the transform coefficients in order to produce residual blocks in the pixel domain.

After prediction module 81 generates the predictive block for the current video block based on either inter- or intra-prediction, video decoder 30 forms a decoded video block by summing the residual blocks from inverse transform module 88 with the corresponding predictive blocks generated by prediction module 81. Summer 90 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given picture are then stored in decoded picture buffer 92, which stores reference pictures used for subsequent motion compensation. Decoded picture buffer 92 also stores decoded video for later presentation on a display device, such as display device 32 of FIG. 1.

In accordance with this disclosure, prediction module 81 represents one example unit for performing the example functions described above. For example, prediction module 81 may determine which reference pictures belong to a reference picture set. Also, prediction module 81 may construct the plurality of reference picture subsets that each identifies one or more of the reference pictures. Prediction module 81 may also derive the reference picture set from the constructed plurality of reference picture subsets. Also, prediction module 81 may implement any one or more of the sets of example pseudo code described above to implement one or more example techniques described in this disclosure.

In some examples, prediction module 81 may construct the initial reference picture lists in the manner described above. In some examples, no reordering of the pictures to be included in the initial reference picture lists is needed. Also, prediction module 81 may construct the reference picture lists in such a manner that there are no non-completed entries in the reference picture lists. In some examples, prediction module 81 may also modify the initial reference picture lists in the manner described above to construct the modified reference picture list. Furthermore, in some examples, prediction module 81 may implement the removal of decoded pictures from DPB 94 in the manner described above. Moreover, in some examples, prediction module 81 may be configured to determine which long-term reference pictures belong to the reference picture set for the current picture in the manner described above.

In other examples, a unit other than prediction module 81 may implement the examples described above. In some other examples, prediction module 81 in conjunction with one or more other units of video decoder 30 may implement the examples described above. In yet some other examples, a processor or unit of video decoder 30 (not shown in FIG. 4) may, alone or in conjunction with other units of video decoder 30, implement the examples described above.

Figure 5:
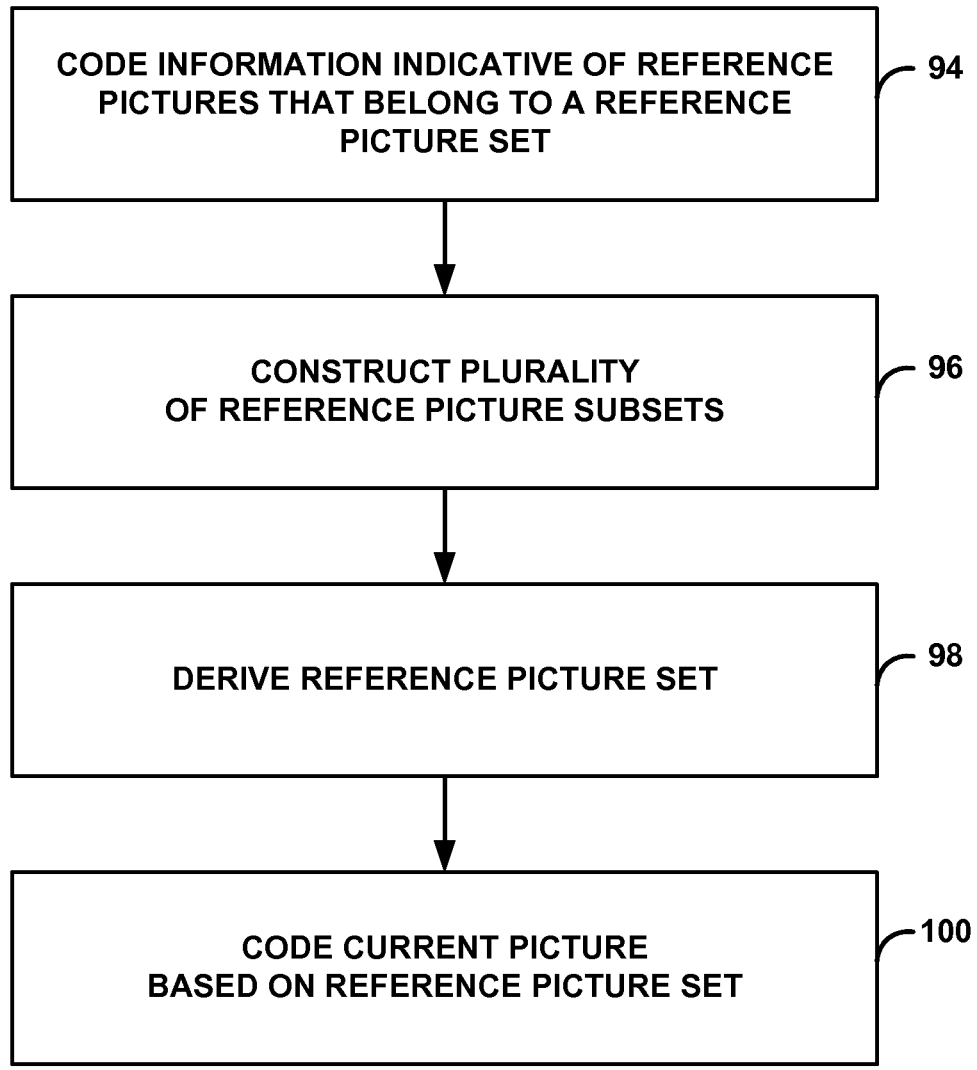
FIG. 5 is a flowchart illustrating an example operation of deriving a reference picture set.

FIG. 5 is a flowchart illustrating an example operation of deriving a reference picture set. For purposes of illustration only, the method of FIG. 5 may be performed by a video coder corresponding to either video encoder 20 or video decoder 30. For example, a video coder (e.g., video encoder 20 or video decoder 30) may code (e.g., encode or decode) information indicative of reference pictures that belong to a reference picture set (94). The reference picture set may identify the reference pictures that can potentially be used for inter-predicting a current picture and for inter-predicting one or more pictures following the current picture in decoding order.

For example, when video encoder 20 performs step 94, video encoder 20 may encode values that indicate identifiers for the reference pictures that belong to the reference picture set. For example, video encoder 20 may signal in the bitstream the pic_order_cnt_lsb syntax element, and the log 2_max_pic_order_cnt_lsb_minus4 syntax element. When video decoder 30 performs step 94, from the log 2_max_pic_order_cnt_lsb_minus4 syntax element, video decoder 30 may determine the value of MaxPicOrderCntLsb. Video decoder 30 may then determine the identifiers (e.g., the POC values) for the reference pictures that belong to the reference picture set.

The video coder may construct a plurality of reference picture subsets that each identifies zero or more of the reference pictures (96). For example, the video coder may construct the RefPicSetStCurr0, RefPicSetStCurr1, RefPicSetStFoll0, RefPicSetStFoll1, RefPicSetLtCurr, and the RefPicSetLtFoll reference picture subsets. However, aspects of this disclosure are not so limited. In some examples, the video coder may construct five reference picture subsets, four of which may be four of the RefPicSetStCurr0, RefPicSetStCurr1, RefPicSetStFoll0, RefPicSetStFoll1, RefPicSetLtCurr, and the RefPicSetLtFoll reference picture subsets, and the fifth may be a combination of two of the remaining six reference picture subsets (e.g., a combination of the RefPicSetFoll0 and the RefPicSetFoll1 reference picture subsets).

In some examples, the video coder may construct at least two of the following four reference picture subsets. In other examples, the video coder may construct at least the following four reference picture subsets. The first reference picture subset may identify short-term reference pictures that are prior to the current picture in decoding order and prior to the current picture in output order and that can potentially be used for inter-predicting the current picture and one or more of the one or more pictures following the current picture in decoding order. The second reference picture subset may identify short-term reference pictures that are prior to the current picture in decoding order and subsequent to the current picture in output order and that can potentially be used for inter-predicting the current picture and one or more of the one or more pictures following the current picture in decoding order.

The third reference picture subset may identify long-term reference pictures that are prior to the current picture in decoding order and that can potentially be used for inter-predicting the current picture and one or more of the one or more pictures following the current picture in decoding order. The fourth reference picture subset may identify long-term reference pictures that are prior to the current picture in decoding order and that cannot be used for inter-predicting the current picture, and can potentially be used for inter-predicting one or more of the one or more pictures following the current picture in decoding order.

The video coder may derive the reference picture set from the plurality of reference picture subsets (98). For example, the video coder may order at least two of the RefPicSetStCurr0, RefPicSetStCurr1, RefPicSetStFoll0, RefPicSetStFoll1, RefPicSetLtCurr, and the RefPicSetLtFoll reference picture subsets in a particular order to derive the reference picture set.

In some examples, the ordering performed by the video code may mean that the pictures in each of the reference picture subsets may be identified sequentially within the reference picture set. In these examples, the video coder may reference the reference pictures in the reference picture set by an index value into the reference picture set.

The video coder may code the current picture based on the derived reference picture set (100). It should be understood that because the video coder derives the reference picture set from the reference picture subsets, the video coder may be considered as coding the current picture based on the plurality of reference picture subsets. For example, the video coder may construct at least one of a first reference picture list and a second reference picture list based on the plurality of reference picture subsets (e.g., from the derived reference picture set which is derived from the plurality of reference picture subsets). The video coder may then code the current picture based on at least one of the first reference picture list and the second reference picture list.

Figure 6:
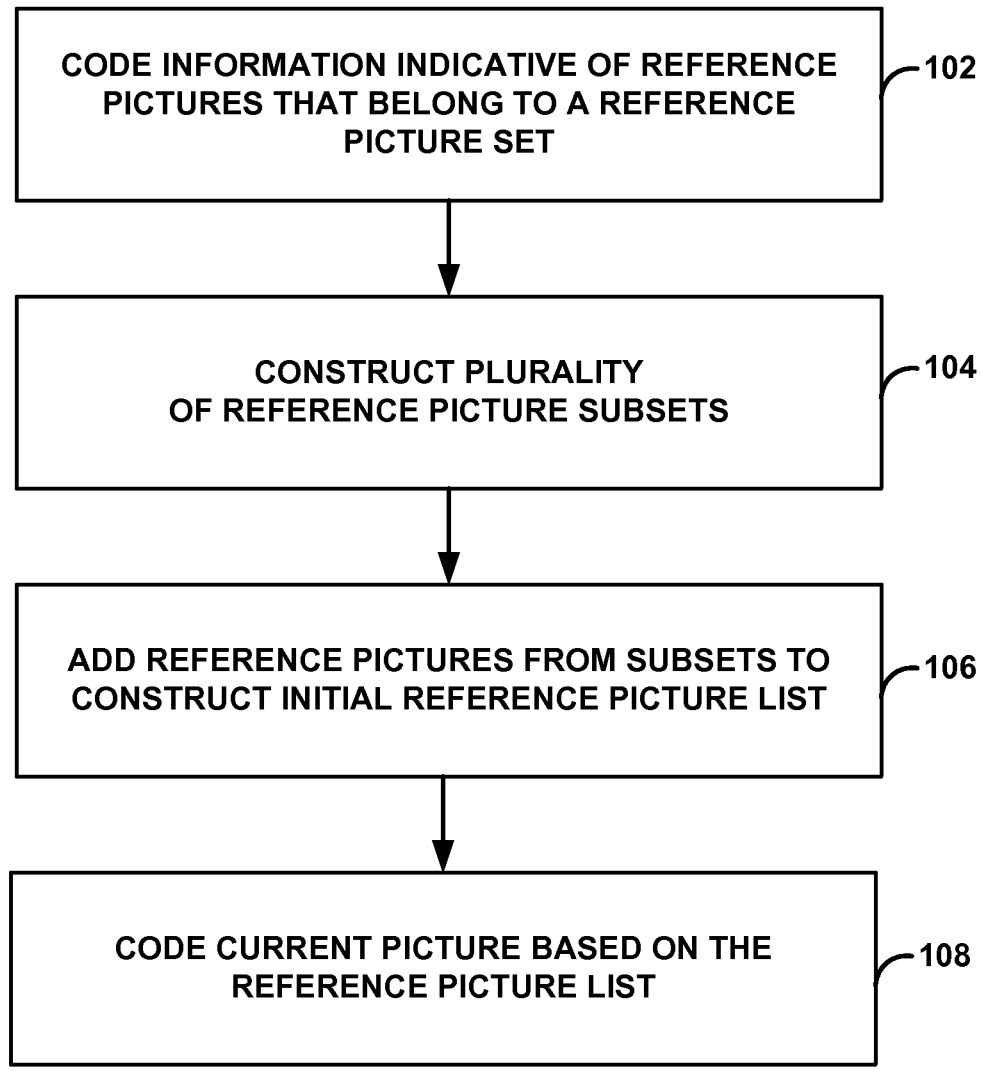
FIG. 6 is a flowchart illustrating an example operation of constructing a reference picture list.

FIG. 6 is a flowchart illustrating an example operation of constructing a reference picture list. For purposes of illustration only, the method of FIG. 6 may be performed by a video coder corresponding to either video encoder 20 or video decoder 30. Similar to FIG. 5, the video coder may code information indicative of reference pictures (102), and construct plurality of reference picture subsets (104).

The video coder may then add reference pictures from reference picture subsets, into an initial reference picture list, to construct the initial reference picture list (106). In some examples, both video encoder 20 and video decoder 30 may construct the initial reference picture list. For example, video encoder 20 may construct the initial reference picture list to create the reconstructed video blocks for storing in DPB 64. Video decoder 30 may construct the initial reference picture list as part of its decoding process, and may implement a default construction technique in which video decoder 30 does not need to receive information from video encoder 20 regarding the manner in which to construct the initial reference picture list.

In some examples, to construct the initial reference picture list, the video coder may add reference pictures from a first subset of the plurality of reference picture subsets into the initial reference picture list, followed by reference pictures from a second subset into the initial reference picture list, and then followed by reference pictures from a third subset into the initial reference picture list. The video coder may add reference pictures from these reference picture subsets so long as the total number of reference pictures listed in the initial reference picture list is not greater than the maximum number of allowable entries in the initial reference picture list. For example, if at any time during the adding of the reference pictures in the reference picture list, the number of entries in the initial reference picture list becomes equal to the maximum number of allowable initial reference list entries, the video coder may stop adding any additional pictures in the initial reference picture list.

The video coder may similarly construct another initial reference picture list, such as in examples where the video block of the current picture is bi-predicted. In this example, to construct this another initial reference picture list, the video coder may add reference pictures from the second subset into the another initial reference picture list, followed by reference pictures from the first subset into the another initial reference picture list, and then followed by reference pictures from the third subset into the another initial reference picture list so long as the total number of entries in this another initial reference picture list is not greater than the allowable number of entries. In these examples, the first subset may be the RefPicSetStCurr0 reference picture subset, the second subset may be the RefPicSetStCurr1 reference picture subset, and the third subset may be the RefPicSetLtCurr reference picture subset.

In some example, to add reference pictures identified in the RefPicSetStCurr0, RefPicSetStCurr1, and the RefPicSetLtCurr reference picture subsets, the video coder may code (e.g., encode or decode) syntax elements from which the video coder may determine the number of reference pictures in each of these reference picture subsets. For example, the video coder may code a num_short_term_curr0 syntax element and a num_short_term_curr1 syntax element. The num_short_term_curr0 syntax element and the num_short_term_curr1 syntax element may indicate the number of reference pictures identified in the RefPicSetStCurr0 reference picture subset and the RefPicSetStCurr1 reference picture subset, respectively.

The video coder may also code a num_long_term_pps_curr syntax element, and a num_long_term_add_curr syntax element. The num_long_term_pps_curr syntax element may indicate a number of long-term reference pictures whose identification is included in a picture parameter set (PPS), and the num_long_term_add_curr syntax element may indicate a number of long-term reference pictures whose identification information is not included in the PPS. In this example, these long-term reference pictures can potentially be used for inter-predicting the current picture and can potentially be used for inter-predicting one or more pictures following the current picture in decoding order.

The video coder may determine the number of reference pictures in the RefPicSetLtCurr reference picture subset based on the num_long_term_pps_curr syntax element and the num_long_term_add_curr syntax element. For example, the video coder may sum the values of the num_long_term_pps_curr syntax element and the num_long_term_add_curr syntax element to determine the number of reference pictures in the RefPicSetLtCurr reference picture subset.

The video coder may code the current picture based on the reference picture list or lists (108). For instance, the video coder may construct at least one of a first reference picture list and a second reference picture list based on the derived reference picture set. The video coder may then code the current picture based on at least one of the first reference picture list and the second reference picture list.

Figure 7:
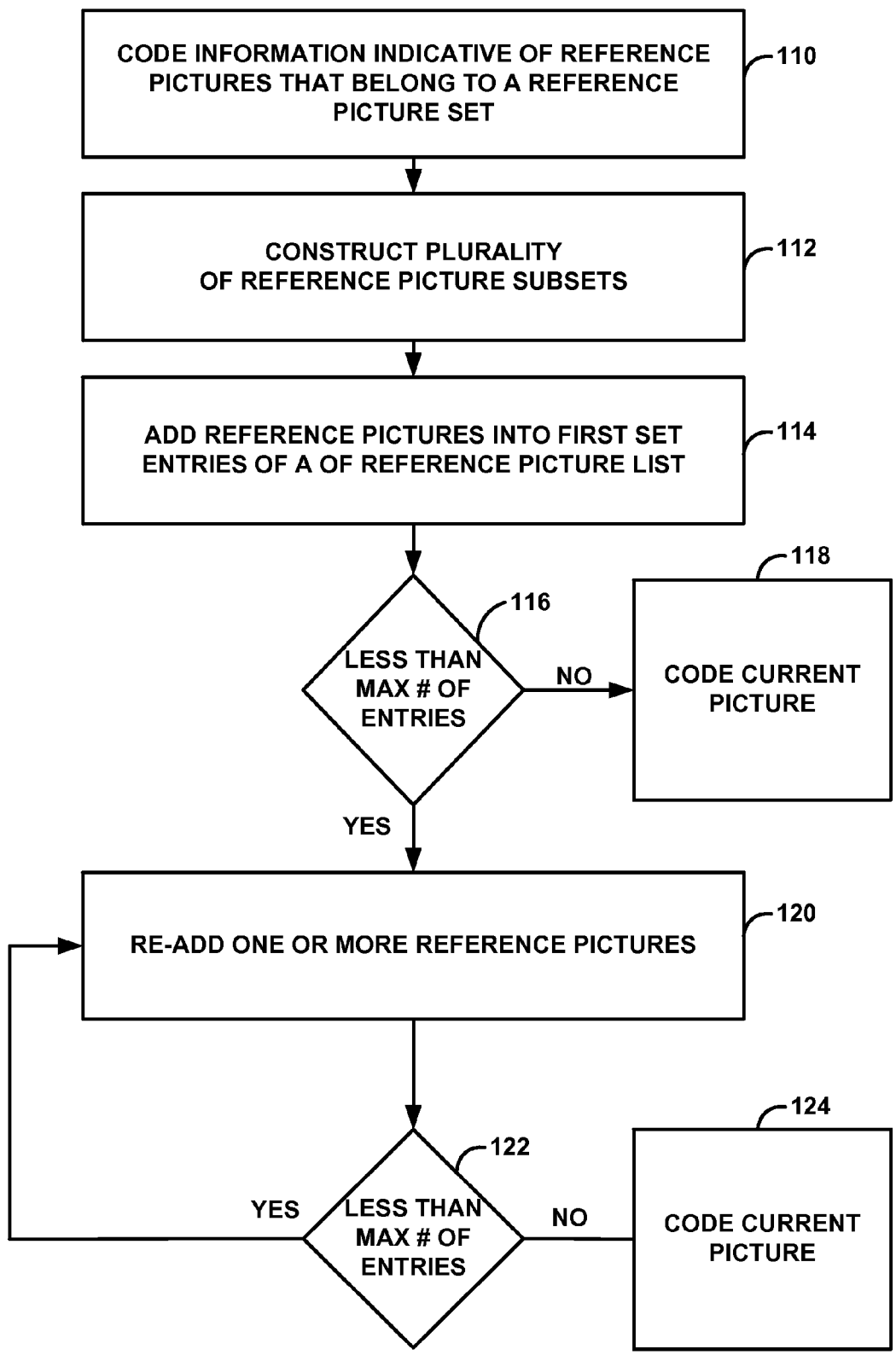
FIG. 7 is a flowchart illustrating another example operation of constructing a reference picture list.

FIG. 7 is a flowchart illustrating another example operation of constructing a reference picture list. For purposes of illustration only, the method of FIG. 7 may be performed by a video coder corresponding to either video encoder 20 or video decoder 30. Similar to FIG. 5, the video coder may code information indicative of reference pictures (110), and construct plurality of reference picture subsets (112). The video coder may add the reference pictures into a first set of entries of a reference picture list (114). For example, the number of entries in the reference picture list may equal the maximum number of allowable entries as defined by the num_ref_idx_l0_active_minus1 or the num_ref_idx_l1_active_minus1 syntax elements.

In this example, the video coder may list (e.g., add) into the first set of entries the reference pictures identified in the RefPicSetStCurr0, RefPicSetStCurr1, and RefPicSetLtCurr reference picture subsets. For example, for List 0, the video coder may add into the first set of entries of List 0, in order, the reference pictures identified in the RefPicSetStCurr0, RefPicSetStCurr1, and RefPicSetLtCurr reference picture subsets. For List 1, the video coder may add into the first set of entries of List 1, in order, the reference pictures identified in the RefPicSetStCurr1, RefPicSetStCurr0, and RefPicSetLtCurr reference picture subsets.

The video coder may then determine whether the number of entries in the reference picture list is equal to a maximum number of allowable entries in the reference picture list (116). If the number of entries in the reference picture list is not less than the maximum number of allowable entries ("NO" of 116), the video coder may code the current picture based on the reference picture list (118).

Otherwise, if the number of entries in the reference picture list is less than the maximum number of allowable entries ("YES" of 116), the video coder may relist (e.g., re-identify or re-add) one or more reference pictures from at least one of the reference picture subsets into entries in the reference picture list that are subsequent to the first set of entries (120). For example, the video coder may add one or more reference pictures identified in the RefPicSetStCurr0 reference picture subset into List 0 in entries subsequent to the first set of entries in List 0, or one or more reference pictures identified in RefPicSetStCurr1 reference picture subset into List 1 in entries subsequent to the first set of entries in List 1. In this manner, the video coder may identify at least one reference picture of the first reference picture subset in more than one entry in the reference picture list.

The video coder may then determine whether the number of entries in the reference picture list is equal to a maximum number of allowable entries in the reference picture list (122). If the number of entries in the reference picture list is not less than the maximum number of allowable entries ("NO" of 122), the video coder may code the current picture based on the reference picture list (124).

Otherwise, if the number of entries in the reference picture list is less than the maximum number of allowable entries ("YES" of 122), the video coder may relist (e.g., re-identify or re-add) one or more reference pictures from at least one of the reference picture subsets into entries in the reference picture list that are subsequent to the first set of entries (120). For example, in this situation, the video coder may re-add additional reference pictures identified in the first reference picture subset. If, the video coder already re-added all of the reference pictures in the first reference picture subset, the video coder may re-add one or more reference pictures from the second reference picture subset (e.g., the RefPicSetStCurr0 reference picture subset for List 0, or the RefPicSetStCurr1 reference picture subset for List 1). This process may repeat until the number of entries in the reference picture list is not less than the maximum number of allowable entries ("NO" of 122).

In this manner, when the number of entries in the reference picture list is not equal to the maximum number of allowable entries in the reference picture list, the video coder may repeatedly relist (e.g., re-identify or re-add) one or more reference pictures from at least one of the reference picture subsets into entries in the reference picture list that are subsequent to the first set of entries until the number of entries in the reference picture list is equal to the maximum number of allowable entries in the reference picture list. This may result in the video coder listing reference pictures in entries of the reference picture list such that each entry of the reference picture list identifies one of the reference pictures, and such that at least two entries of the reference picture list identify a same reference picture of the reference pictures.

Figure 8:
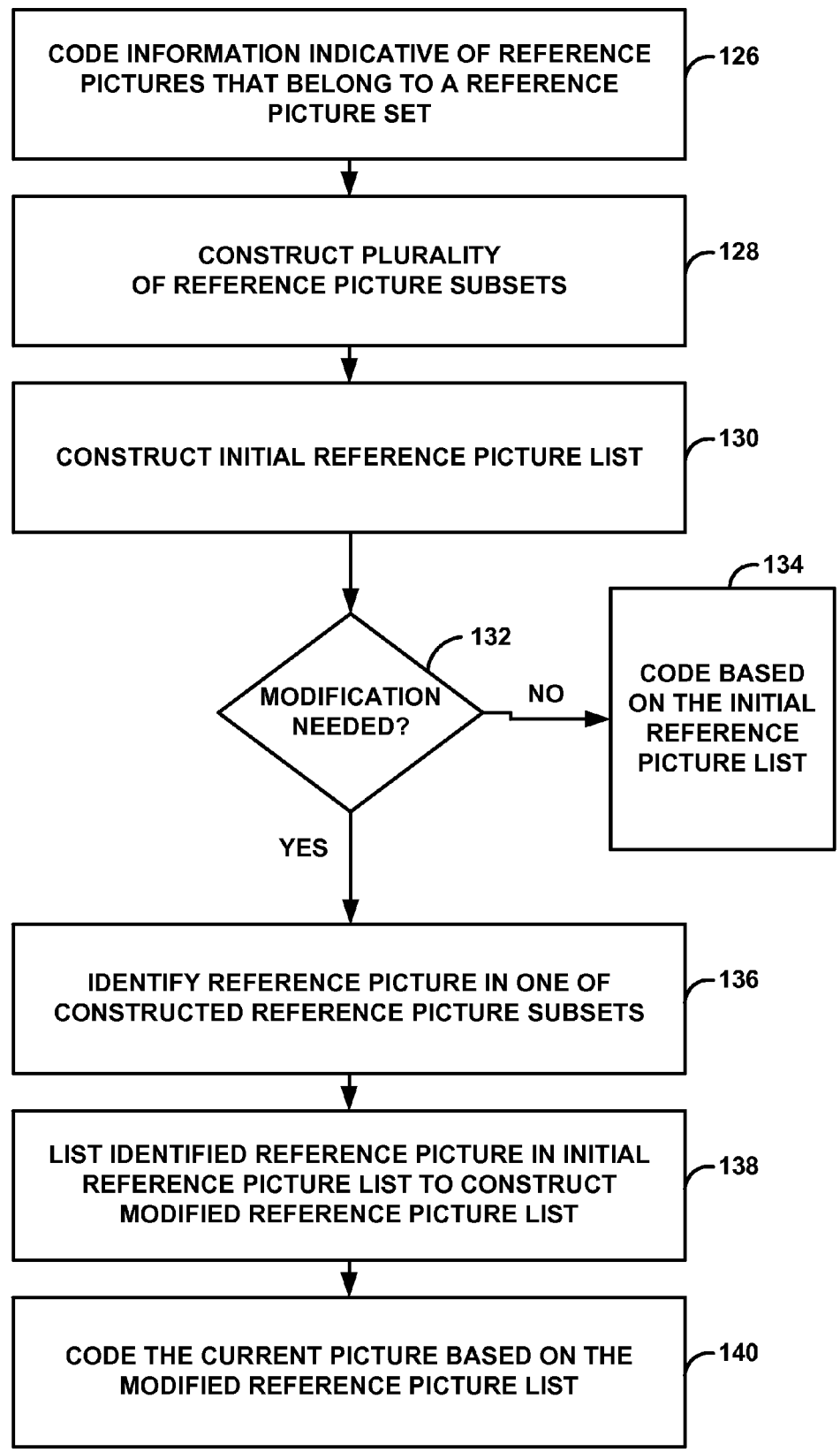
FIG. 8 is a flowchart illustrating an example operation of modifying an initial reference picture list.

FIG. 8 is a flowchart illustrating an example operation of modifying an initial reference picture list. For purposes of illustration only, the method of FIG. 8 may be performed by a video coder corresponding to either video encoder 20 or video decoder 30. Similar to FIG. 6, the video coder may code information indicative of reference pictures (126), and construct plurality of reference picture subsets (128). The plurality of reference picture subsets may include the RefPicSetSt-Curr0, RefPicSetStCurr1, and the RefPicSetLtCurr reference picture subsets. The video coder may construct an initial reference picture list in the manner described above based on the RefPicSetStCurr0, RefPicSetStCurr1, and the RefPicSetLtCurr reference picture subsets (130).

The video coder may determine whether reference picture list modification is needed (132). For example, the video coder may code syntax elements such as the ref_pic_list_modification_flag_l0 and the ref_pic_list_modification_flag_l1 that indicate whether the initial List 0 or the initial List 1 needs to be modified. If modification of the initial reference picture list is not needed ("NO" of 132), the video coder may code the current picture based on the initial reference picture list (134).

If modification is needed ("YES" of 132), the video coder may identify a reference picture in at least one of the constructed reference picture subsets (136). For example, the video coder may code the modification_of_ref_pic_idc syntax element. The value of the modification_of_ref_pic_idc syntax element may indicate which reference picture subset the video coder is to utilize to identify the reference picture. The video coder may also code the ref_pic_set_idx syntax element that indicates the index into the reference picture subset which the video coder is to utilize to identify the reference picture.

The video coder may list (e.g., add or identify) the identified reference picture in the initial reference picture list at a current entry to construct the modified reference picture list (138). The current entry may initially the entry in the initial reference picture list defined by the index 0. For each instance of the modification_of_ref_pic_idc syntax element in the coded bitstream where the value of the modification_of_ref_pic_idc syntax element is not 3, the video coder may increment the value of the initial entry by one (e.g., the next value of the entry will be defined by the index 1). The video coder may code the current picture based on the modified reference picture list (140).

Figure 9:
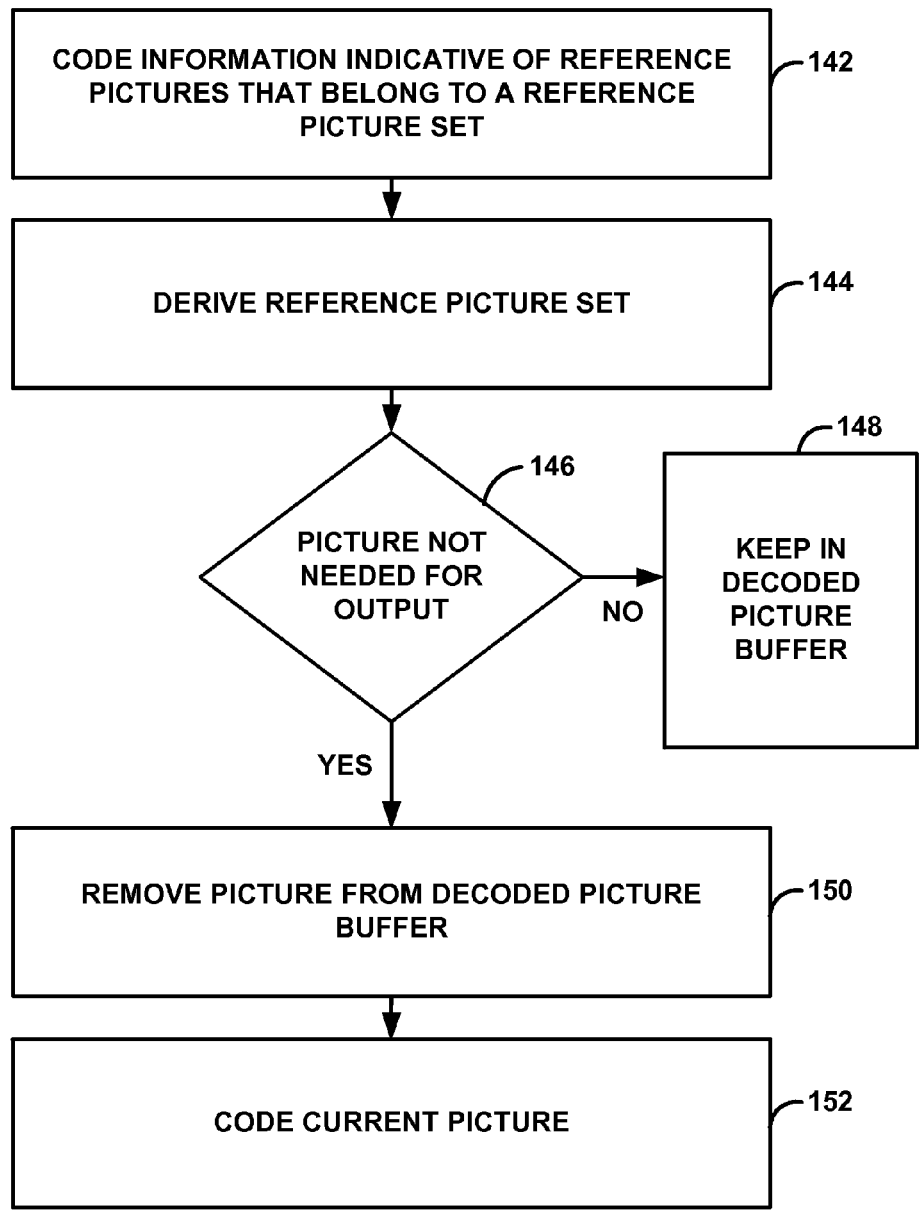
FIG. 9 is a flowchart illustrating an example operation of decoded picture removal.

FIG. 9 is a flowchart illustrating an example operation of decoded picture removal. For purposes of illustration only, the method of FIG. 8 may be performed by a video coder corresponding to either video encoder 20 or video decoder 30. Similar to FIG. 5, a video coder (e.g., video encode 20 or video decoder 30) may code (e.g., encode or decode) information indicative of reference pictures of a reference picture set (142), and may derive the reference picture set from the coded (e.g., encoded or decoded) information (144).

The video coder may determine whether a decoded picture stored in a decoded picture buffer (DPB) is not needed for output (i.e., outputted already or not intended to be outputted) and is not identified in the reference picture set (146). If the decoded picture is needed for output or is identified in the reference picture set ("NO" of 146), the video coder may not remove the decoded from the DPB, and may keep the decoded picture stored in the DPB (148).

When the decoded picture has been outputted and is not identified in the reference picture set ("YES" of 146), the video coder may remove the decoded picture from the DPB (150). The video coder may then code the current picture after removing the decoded picture (152).

As described above, the video coder may construct a reference picture list based on the reference picture set for coding the current picture. In some examples, the video coder may remove the decoded picture from the DPB after constructing the reference picture list. Moreover, for the outputted decoded picture, the video coder may determine a time when to output the decoded picture, and may output the decoded picture based on the determined time and prior to coding the current picture.

In some examples, the video coder may store the coded (e.g., decoded) picture in the DPB. In some examples, the video coder may determine that the DPB is full prior to the storage. In these examples, the video coder may select a decoded picture currently stored in the DPB that is marked as "needed for output" and having a smallest picture order count (POC) value of all decoded pictures stored in the DPB. The video coder may then output the selected picture. Furthermore, the video coder may determine that the outputted picture is not included in the reference picture set of the current picture. In this case, the video coder may empty a buffer within the DPB that stored the outputted picture, and may store the coded picture in that buffer within the DPB.

Figure 10:
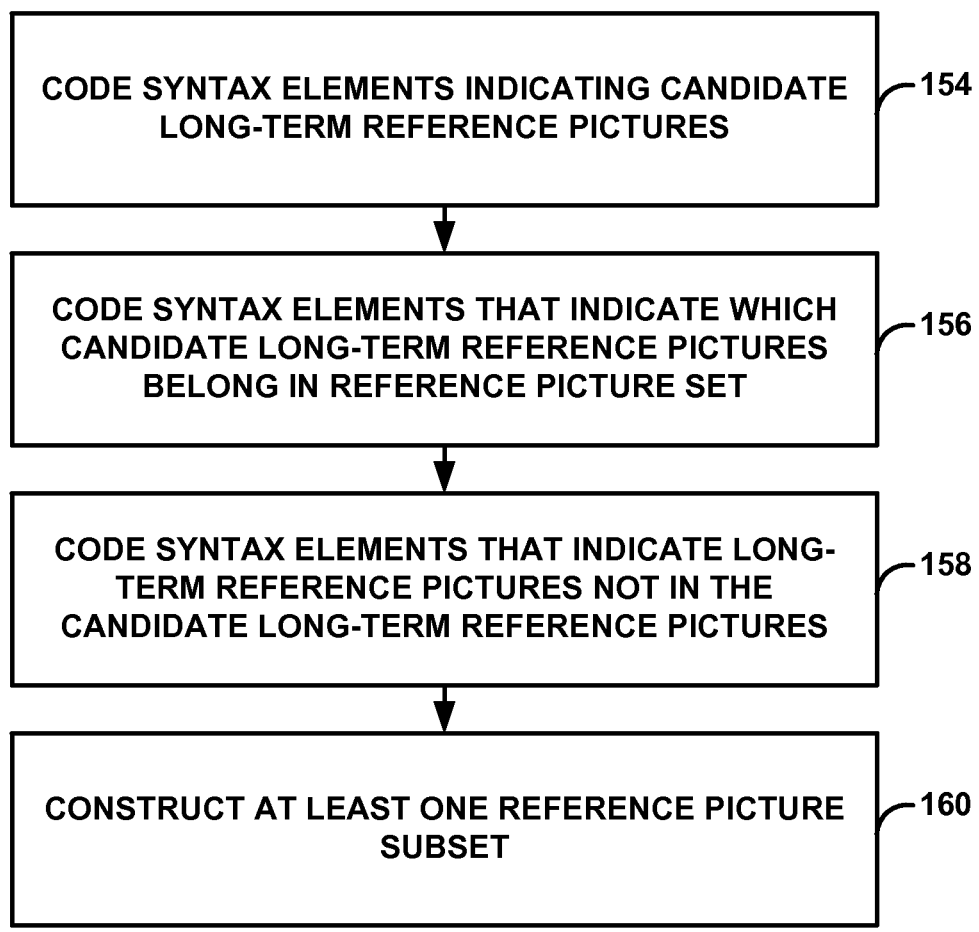
FIG. 10 is a flowchart illustrating an example operation of determining which long-term reference pictures belong to the reference picture set of a current picture.

FIG. 10 is a flowchart illustrating an example operation of determining which long-term reference pictures belong to the reference picture set of a current picture. For purposes of illustration only, the method of FIG. 10 may be performed by a video coder corresponding to either video encoder 20 or video decoder 30.

The video coder (e.g., video encode 20 or video decoder 30) may code syntax elements that indicate candidate long-term reference pictures identified in a parameter set (154). In some examples, one or more of the candidate long-term reference pictures belong in a reference picture set of the current picture. In accordance with the techniques described in this disclosure, the parameter set may be sequence parameter set or the picture parameter set. In some examples, to code the syntax elements that indicate candidate long-term reference pictures, the video coder may code a list of POC values for the candidate long-term reference pictures in the parameter set, and code an index value to the list in the slice header of the current picture.

The video coder may code syntax elements that indicate which candidate long-term reference pictures, identified in the parameter set, belong in the reference picture set of the current picture (156). For example, the video coder may code in the slice header of the current picture the syntax elements that indicate which candidate long-term reference pictures belong in the reference picture set.

In some examples, not all long-term reference pictures that belong in the reference picture set are included in the candidate long-term reference pictures. In these examples, the video coder may further code syntax elements that indicate long-term reference pictures that belong in the reference picture set (158). The video coder may then construct at least one of the plurality of reference picture subsets based on the indication of which candidate long-term reference pictures belong in the reference picture set of the current picture (160).

In the above examples, various examples are described, along with possible alternatives to the examples. The following describes some additional alternatives to the examples, which may be considered as alternative examples to one or more of the examples described above. Furthermore, these alternative examples may be used in conjunction with the examples described above, or separate from the examples described above.

For example, already described above are alternative examples for the reference picture set concept, alternative examples for signaling of reference picture set in the parameter sets, alternative examples of subsets of the reference picture set, and alternative examples for reference picture marking. The following provides additional alternative examples.

For instance, for the NAL unit header, in the above examples, the NAL unit header syntax may include the nal_ref_idc, temporal_id, and output_flag syntax elements. In one alternative example, nal_ref_idc (2 bits) is replaced with nal_ref_flag (1 bit). In this example, nal_ref_flag equal to 1 has the semantics as nal_ref_idc greater than 0, and nal_ref_flag equal to 0 has the same semantics as nal_ref_idc equal to 0. In one alternative example, nal_ref_idc (2 bits) is removed. The definition of reference picture may be changed to: A picture that contains samples that may be used for inter prediction in the decoding process of subsequent pictures in decoding order. In one alternative example, temporal_id is not present in the NAL unit header syntax, and the value is derived to be the same for all pictures. In one alternative example, output_flag is not present in the NAL unit header syntax, and the value is derived to be equal to 1 for all pictures.

For picture order count signaling and calculation, the above techniques may employ one way of signaling and calculation of picture order count that may be similar to the picture order count type 0 in AVC. Two alternative ways for signaling and calculation of picture order count, same as the picture order count types 1 and 2 in AVC, respectively, can be applied. Any combination of two of the three ways, or the combination of all three ways may also be applied.

For picture identification, the above techniques may utilize the picture order count (POC) value for picture identification. In one alternative example, temporal reference (TR) is used as picture identification. One way of defining TR is that it is the same as POC when POC is restricted such that the POC difference between any two pictures is proportional to presentation time or sampling time difference. In one alternative example, frame_num which indicates decoding order (whereas POC indicates output or display order), or a variable (e.g., named UnWrappedFrameNum) which may be any value of a 32-bit unsigned integer values, derived from frame_num may be used as picture identification. Basically, UnWrappedFrameNum may be the un-wrapped version of frame_num. For example, if frame_num is represented by 8 bits, the maximum value of frame_num is 255. The next value after 255 for frame_num is 0. The value of UnWrappedFrameNum continues to increase at positions wherein frame_num wraps to 0.

For signaling long-term reference pictures in parameter sets, in the above examples, video encoder 20 may signal a list of absolute long-term reference picture identification information in the picture parameter set, may signal information on the length, in bit, of the absolute long-term reference picture identification information, and the index to the list may be referenced in the slice header, thus to reduce the signaling overhead. In one alternative example, a list of differential long-term reference picture identification information may be signaled in the sequence parameter set and the index to the list may be referenced in the slice header, thus to reduce the signaling overhead. In one alternative example, information on the length, in bits, of the absolute long-term reference picture identification information may be signaled, but the length may be considered as a constant, e.g., 32. In various examples, a combination of any of the above examples is applied.

For signaling of short-term reference pictures, in the above examples, for short-term reference pictures in the reference picture set of a coded picture, either all are signaled in the referred picture parameter set, or all are signaled in the slice header. In one alternative example, for short-term reference pictures in the reference picture set of a coded picture, some are signaled in the referred picture parameter set, and others are signaled in the slice header.

For reference picture list initialization, in one alternative example, in the reference picture list initialization process, firstly short-term reference pictures may be added into a list, and secondly, optionally, the long-term reference pictures may be added into the list. After that, if the number of entries in the reference picture list (either RefPicList0 or RefPicList1) is still less than the value of num_ref_idx_lx_active_minus1+1 (lx being l0 or l1), the remaining entries may be marked as "no reference picture". In one alternative example, it may also be possible if the reference picture list is still not complete after adding the entries in RefPicSetStCurr0 and RefPicSetStCurr1 and possibly the long term reference pictures, the pictures in the RefPicSetStFoll0 and/or RefPicSetStFoll1 may be added. In one alternative example, the reference picture list initialization process may only add short-term reference pictures in a reference picture list. In such a case, a long-term reference picture may only be added to a reference picture list by using reference picture list modification commands as signaled in Reference Picture List Modification (RPLM) syntax table.

For reference picture list modification, in one alternative example, reference picture list modification may also signal the ref_pic_set_idx in a differential fashion, wherein the previous index is used as a predictor of the current index. In this example, different modification_of_ref_pic_idc values may correspond to a different indexing categories (RefPicSetStCurrx for RefPicListx, RefPicSetStCurrx for RefPicList(1-x), or RefPicSetLtCurr), each of which maintain a different predictor. A predictor may be updated once a syntax element belonging to the same category is just parsed. In one alternative example, reference picture list modifications may be based on the picture number difference. In one alternative example, reference picture list modifications may be based on the POC values difference.

For decoded picture buffer (DPB) operations, in the above example, after decoding of the current picture and before parsing a slice header of the next coded picture in decoding order, the current decoded picture is stored in the DPB. In one alternative example, after decoding of the current picture and before parsing a slice header of the next coded picture in decoding order, the current decoded picture is stored in a temporary memory (not in the DPB). It is stored into the DPB after parsing a slice header of the next coded picture in decoding order and construction of the reference picture set of that picture, if it is still needed for reference or for output. At this moment, if it is needed neither for reference nor for output, the decoded picture may be simply discarded (from the temporary buffer).

Also, in the above examples, removal of a decoded picture from the DPB occurs immediately after parsing a slice header of the current picture and before decoding any slice of the current picture. In one alternative example, marking, if present, and removal of a decoded picture from the DPB occurs after the current picture is entirely decoded.

In the above examples, the subsets RefPicSetStCurr0 and RefPicSetStCurr1 of the reference picture set for the current picture are derived for all decoded pictures. However, this may not be necessary for intra picture. For intra picture reference picture set derivation, in one alternative example, for a non-IDR picture that is intra coded (i.e., all slice of the coded picture are I slices), RefPicSetStCurr0 and RefPicSetStCurr1 are not derived, as even they are not empty after being derived, they are not needed in decoding of the coded picture. Allowing non-empty RefPicSetStCurr0 or RefPicSetStCurr1 for a non-IDR intra picture may allow the sharing of an instance short_term_ref_pic_set( ) syntax structure of one or more inter-coded pictures, for which RefPicSetStCurr0 and RefPicSetStCurr1 may not be both empty.

For loss detection, the following different methods for detection of the loss of a reference picture or early detection of whether the current picture can be correctly decoded may be possible. In various examples, after derivation of the reference picture set, video decoder 30 (e.g., the decoder side) may check for the presence of reference pictures included in RefPicSetStCurr0, RefPicSetStCurr1 and RefPicSetLtCurr. If any of the reference pictures included in RefPicSetStCurr0, RefPicSetStCurr1 and RefPicSetLtCurr is not present in the DPB, the decoder side may infer that that reference picture has been lost, and that the current picture will likely not be correctly decoded, and may take some action to improve the situation, e.g., by notifying the encoder side (e.g., video encoder 20) of the picture loss(es), and the encoder may retransmit the lost reference picture(s) or encoded the next picture(s) using only those reference pictures that are known correct at the decoder side for inter prediction reference.

In various examples, after derivation of the reference picture set, the decoder side may check the presence of reference pictures included in RefPicSetStFoll0, RefPicSetStFoll1 and RefPicSetLtFoll. If any of the reference pictures included in RefPicSetStFoll0, RefPicSetStFoll1 and RefPicSetLtFoll is not present in the DPB, the decoder side may infer that that reference picture has been lost, and that some of the following pictures in decoding order will likely not be correctly decoded unless some actions are taken, and can take some action to remedy the situation, e.g., by notifying the encoder side of the picture loss(es), and the encoder may retransmit the lost reference picture(s) or encoded the next picture(s) using only those reference pictures that are known correct at the decoder side for inter prediction reference.

For encoder-side (e.g., video encoder 20) reference picture set composition, with the above examples, the following different methods for reference picture set composition at the encoder side may be possible. For instance, in various examples, the encoder composes the reference picture set related syntax structures such that after reference picture set derivation at the decoder side for the current picture: (1) RefPicSetStCurr0 includes and only includes the identification information of all short-term reference pictures that have earlier output order than the current picture and that are used for reference in inter prediction of the current picture, (2) RefPicSetStCurr1 includes and only includes the identification information of all short-term reference pictures that have later output order than the current picture and that are used for reference in inter prediction of the current picture, and (3) RefPicSetLtCurr includes and only includes the identification information of all long-term reference pictures that are used for reference in inter prediction of the current picture.

In various examples, the encoder (e.g., video encoder 20) may compose the reference picture set related syntax structures such that after reference picture set derivation at the decoder side for the current picture: (1) RefPicSetStCurr0 includes and only includes the identification information of 1) all short-term reference pictures that have earlier output order than the current picture and that are used for reference in inter prediction of the current picture, as well as 2) one or more short-term reference picture that have earlier output order than the current picture and that are not used for reference in inter prediction of the current picture, (2) RefPicSetStCurr1 includes and only includes the identification information of 1) all short-term reference pictures that have later output order than the current picture and that are used for reference in inter prediction of the current picture, as well as 2) one or more short-term reference picture that have later output order than the current picture and that are not used for reference in inter prediction of the current picture, and RefPicSetLtCurr includes and only includes the identification information of 1) all long-term reference pictures that are used for reference in inter prediction of the current picture, as well as 2) one or more long-term reference pictures that are not used for reference in inter prediction of the current picture.

In this manner, the above individual techniques or any combination thereof, including any combination of the alternate examples, may provide techniques related to the following. However, the below list is provided for ease of understanding and should not be considered limiting. One or more of the above techniques may be implemented together or separately. Furthermore, the above techniques are examples, and should not be considered as limiting to those specific example techniques.

Restrictions on temporal_id for the reference picture set, such that the DPB management methods suit well for temporal scalability, signaling overhead may be reduced, and a simple bitstream extraction process for cleanly extracted bitstream subsets may be enabled.

Long-term reference picture subsets signaled in the picture parameter set and the index may be included in the slice header. This may provide efficient signaling of long-term pictures.

Separation of reference picture set to various subsets, including the separation for the current picture or for the following pictures in decoding order, the separation for those having earlier or later output order than the current picture. These may provide improved efficiency and reduced complexity for reference list initialization and reference picture list modification.

Double-differential coding in short-term picture identification signaling may provide improved efficiency. Extended and restricted long-term picture identification may provide improved efficiency and flexibility. Simplified reference picture list initialization may remove the need of the marking of "no reference picture" for non-completed entries in a reference picture list; however, this may not be required in all examples.

Simplified processes for decoded picture output, insertion into and removal from the DPB. Picture order count (POC) may be negative. This may enable some important use cases which may not have been allowed if POC cannot be negative. The signaling of whether a picture is reference picture is not needed in the decoding process may not be needed, though it may still possibly be signaled. The markings of reference pictures as "unused for reference" may not be needed any more.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for coding video data, the method comprising:
coding information indicative of reference pictures that belong to a reference picture set, wherein the reference picture set identifies the reference pictures that can potentially be used for inter-predicting a current picture and can potentially be used for inter-predicting one or more pictures following the current picture in decoding order;
constructing a plurality of reference picture subsets that each identifies zero or more of the reference pictures of the reference picture set, wherein constructing the plurality of reference picture subsets comprises:
constructing a first reference picture subset that identifies short-term reference pictures that are prior to the current picture in decoding order and prior to the current picture in output order and that can potentially be used for inter-predicting the current picture and one or more of the one or more pictures following the current picture in decoding order, and excludes short-term reference pictures that are prior to the current picture in output order and cannot be used for inter-predicting the current picture;
constructing a second reference picture subset that identifies short-term reference pictures that are prior to the current picture in decoding order and subsequent to the current picture in output order and that can potentially be used for inter-predicting the current picture and one or more of the one or more pictures following the current picture in decoding order, and excludes short-term reference pictures that are subsequent to the current picture in output order and cannot be used for inter-predicting the current picture; and
constructing a third reference picture subset that identifies long-term reference pictures that are prior to the current picture in decoding order and that can potentially be used for inter-predicting the current picture and one or more of the one or more pictures following the current picture in decoding order, and excludes long-term reference pictures that are prior to the current picture in decoding order and that cannot be used for inter-predicting the current picture;
after construction of the first, second, and third reference picture subsets, determining which reference pictures are usable for inter-prediction of the current picture based on which pictures are identified in the first, second, and third reference picture subsets;
subsequent to determining which reference pictures are usable for inter-prediction of the current picture, constructing an initial reference picture list based on reference pictures in the first, second, and third reference picture subsets that are determined to be usable for inter-prediction of the current picture; and
based on reference picture list modification of the initial reference picture list being needed after the construction of the initial reference picture list:
identifying a reference picture, wherein the reference picture is in at least one of the first, second, or third reference picture subsets;
adding the identified reference picture in a current entry of the initial reference picture list to construct a modified reference picture list; and
coding the current picture based on the modified reference picture list.

2. The method of claim 1, wherein identifying the reference picture comprises:
determining an index into at least one of the constructed reference picture subsets; and
determining the reference picture identified at an entry of the at least one of the constructed reference picture subsets based on the determined index.

3. The method of claim 2, wherein determining the index comprises:
coding a first syntax element to identify the at least one of the constructed reference picture subsets from which the reference picture is identified; and coding a second syntax element that indicates the index into the at least one of the constructed reference picture subsets.

4. The method of claim 1, further comprising:
based on the reference picture list modification of the initial reference picture list being needed after the construction of the initial reference picture list:
  moving reference pictures identified in the initial reference picture list in entries following the current entry to a next entry to construct the modified reference picture list.

5. The method of claim 1, further comprising:
coding a syntax element that indicates that the reference picture list modification is needed.

6. The method of claim 1,
wherein coding comprises decoding information indicative of reference pictures that belong to the reference picture set, wherein the reference picture set identifies the reference pictures that can potentially be used for inter-predicting the current picture and can potentially be used for inter-predicting one or more pictures following the current picture in decoding order; and
wherein coding comprises decoding the current picture based on the modified reference picture list.

7. The method of claim 1,
wherein coding comprises encoding information indicative of reference pictures that belong to the reference picture set, wherein the reference picture set identifies the reference pictures that can potentially be used for inter-predicting the current picture and can potentially be used for inter-predicting one or more pictures following the current picture in decoding order; and
wherein coding comprises encoding the current picture based on the modified reference picture list.

8. A device for coding video data, the device comprising:
memory configured to stored reference pictures; and
a video coder configured to:
code information indicative of reference pictures stored in the memory that belong to a reference picture set, wherein the reference picture set identifies the reference pictures that can potentially be used for inter-predicting a current picture and can potentially be used for inter-predicting one or more pictures following the current picture in decoding order;
construct a plurality of reference picture subsets that each identifies zero or more of the reference pictures of the reference picture set, wherein to construct the plurality of reference picture subsets, the video coder is configured to:
  construct a first reference picture subset that identifies short-term reference pictures that are prior to the current picture in decoding order and prior to the current picture in output order and that can potentially be used for inter-predicting the current picture and one or more of the one or more pictures following the current picture in decoding order, and excludes short-term reference pictures that are prior to the current picture in output order and cannot be used for inter-predicting the current picture;
  construct a second reference picture subset that identifies short-term reference pictures that are prior to the current picture in decoding order and subsequent to the current picture in output order and that can potentially be used for inter-predicting the current picture and one or more of the one or more pictures following the current picture in decoding order, and excludes short-term reference pictures that are subsequent to the current picture in output order and cannot be used for inter-predicting the current picture; and
  construct a third reference picture subset that identifies long-term reference pictures that are prior to the current picture in decoding order and that can potentially be used for inter-predicting the current picture and one or more of the one or more pictures following the current picture in decoding order, and excludes long-term reference pictures that are prior to the current picture in decoding order and that cannot be used for inter-predicting the current picture;
after construction of the first, second, and third reference picture subsets, determine which reference pictures are usable for inter-prediction of the current picture based on which pictures are identified in the first, second, and third reference picture subsets;
subsequent to determining which reference pictures are usable for inter-prediction of the current picture, construct an initial reference picture list based on reference pictures in the first, second, and third reference picture subsets that are determined to be usable for inter-prediction of the current picture; and
based on reference picture list modification of the initial reference picture list being needed after the construction of the initial reference picture list:
  identify a reference picture, wherein the reference picture is in at least one of the first, second, or third reference picture subsets;
  add the identified reference picture in a current entry of the initial reference picture list to construct a modified reference picture list; and
  code the current picture based on the modified reference picture list.

9. The device of claim 8, wherein to identify the reference picture, the video coder is configured to:
determine an index into at least one of the constructed reference picture subsets; and
determine the reference picture identified at an entry of the at least one of the constructed reference picture subsets based on the determined index.

10. The device of claim 9, wherein to determine the index, the video coder is configured to:
code a first syntax element to identify the at least one of the constructed reference picture subsets from which the reference picture is identified; and
code a second syntax element that indicates the index into the at least one of the constructed reference picture subsets.

11. The device of claim 8, wherein the video coder is configured to:
based on the reference picture list modification of the initial reference picture list being needed after the construction of the initial reference picture list:
  move reference pictures identified in the initial reference picture list in entries following the current entry to a next entry to construct the modified reference picture list.

12. The device of claim 8, wherein the video coder is configured to:
code a syntax element that indicates that the reference picture list modification is needed.

13. The device of claim 8, wherein the video coder comprises a video decoder, and wherein the video decoder is configured to:
decode information indicative of reference pictures that belong to the reference picture set, wherein the reference picture set identifies the reference pictures that can potentially be used for inter-predicting the current picture and can potentially be used for inter-predicting one or more pictures following the current picture in decoding order;

construct the first, second, and third reference picture subsets;

after construction of the first, second, and third reference picture subsets, determine which reference pictures are usable for inter-prediction of the current picture based on which pictures are identified in the first, second, and third reference picture subsets;

subsequent to determining which reference pictures are usable for inter-prediction of the current picture, construct the initial reference picture list based on the reference pictures in the first, second, and third reference picture subsets that are determined to be usable for inter-prediction of the current picture; and based on the reference picture list modification of the initial reference picture list being needed after the construction of the initial reference picture list:
identify the reference picture;
add the identified reference picture in the current entry of the initial reference picture list to construct the modified reference picture list; and
decode the current picture based on the modified reference picture list.

14. The device of claim 13, further comprising a display configured to display the decoded current picture and one or more of the reference pictures.

15. The device of claim 8, wherein the video coder comprises a video encoder, and wherein the video encoder is configured to:
encode information indicative of reference pictures that belong to the reference picture set, wherein the reference picture set identifies the reference pictures that can potentially be used for inter-predicting the current picture and can potentially be used for inter-predicting one or more pictures following the current picture in decoding order;

construct the first, second, and third reference picture subsets;

after construction of the first, second, and third reference picture subsets, determine which reference pictures are usable for inter-prediction of the current picture based on which pictures are identified in the first, second, and third reference picture subsets;

subsequent to determining which reference pictures are usable for inter-prediction of the current picture, construct the initial reference picture list based on the reference pictures in the first, second, and third reference picture subsets that are determined to be usable for inter-prediction of the current picture; and based on the reference picture list modification of the initial reference picture list being needed after the construction of the initial reference picture list:
identify the reference picture;
add the identified reference picture in the current entry of the initial reference picture list to construct the modified reference picture list; and
encode the current picture based on the modified reference picture list.

16. The device of claim 15, further comprising a camera configured to capture the current picture that is encoded and the reference pictures.

17. The device of claim 8, wherein the device comprises one or more of:

a wireless communication device comprising at least one of a display configured to display the current picture or a camera configured to capture the current picture;
a microprocessor; or
an integrated circuit.

18. A non-transitory computer-readable storage medium having stored thereon instructions that, when executed, cause a processor of a device for coding video data to:
code information indicative of reference pictures that belong to a reference picture set, wherein the reference picture set identifies the reference pictures that can potentially be used for inter-predicting a current picture and can potentially be used for inter-predicting one or more pictures following the current picture in decoding order;

construct a plurality of reference picture subsets that each identifies zero or more of the reference pictures of the reference picture set, wherein the instructions that cause the processor to construct the plurality of reference picture subsets comprise instructions that cause the processor to:
construct a first reference picture subset that identifies short-term reference pictures that are prior to the current picture in decoding order and prior to the current picture in output order and that can potentially be used for inter-predicting the current picture and one or more of the one or more pictures following the current picture in decoding order, and excludes short-term reference pictures that are prior to the current picture in output order and cannot be used for inter-predicting the current picture;

construct a second reference picture subset that identifies short-term reference pictures that are prior to the current picture in decoding order and subsequent to the current picture in output order and that can potentially be used for inter-predicting the current picture and one or more of the one or more pictures following the current picture in decoding order, and excludes short-term reference pictures that are subsequent to the current picture in output order and cannot be used for inter-predicting the current picture; and construct a third reference picture subset that identifies long-term reference pictures that are prior to the current picture in decoding order and that can potentially be used for inter-predicting the current picture and one or more of the one or more pictures following the current picture in decoding order, and excludes long-term reference pictures that are prior to the current picture in decoding order and that cannot be used for inter-predicting the current picture;

after construction of the first, second, and third reference picture subsets, determine which reference pictures are usable for inter-prediction of the current picture based on which pictures are identified in the first, second, and third reference picture subsets;

subsequent to determining which reference pictures are usable for inter-prediction of the current picture, construct an initial reference picture list based on reference pictures the first, second, and third reference picture subsets that are determined to be usable for inter-prediction of the current picture; and based on the reference picture list modification of the initial reference picture list being needed after the construction of the initial reference picture list:
identify a reference picture, wherein the reference picture is in at least one of the first, second, or third reference picture subsets;

add the identified reference picture in a current entry of the initial reference picture list to construct a modified reference picture list; and
code the current picture based on the modified reference picture list.

19. The non-transitory computer-readable storage medium of claim 18, wherein the instructions that cause the processor to identify the reference picture comprise instructions that cause the processor to:
determine an index into at least one of the constructed reference picture subsets; and
determine the reference picture identified at an entry of the at least one of the constructed reference picture subsets based on the determined index.

20. The non-transitory computer-readable storage medium of claim 19, wherein the instruction that cause the processor to determine the index comprise instructions that cause the processor to:
code a first syntax element to identify the at least one of the constructed reference picture subsets from which the reference picture is identified; and
code a second syntax element that indicates the index into the at least one of the constructed reference picture subsets.

21. The non-transitory computer-readable storage medium of claim 18, further comprising instructions that cause the processor to:
based on the reference picture list modification of the initial reference picture list being needed after the construction of the initial reference picture list:
move reference pictures identified in the initial reference picture list in entries following the current entry to a next entry to construct the modified reference picture list.

22. The non-transitory computer-readable storage medium of claim 18, further comprising instructions that cause the processor to:
code a syntax element that indicates that the reference picture list modification is needed.

23. A device for coding video data, the device comprising:
means for coding information indicative of reference pictures that belong to a reference picture set, wherein the reference picture set identifies the reference pictures that can potentially be used for inter-predicting a current picture and can potentially be used for inter-predicting one or more pictures following the current picture in decoding order;
means for constructing a plurality of reference picture subsets that each identifies zero or more of the reference pictures of the reference picture set, wherein the means for constructing the plurality of reference picture subsets comprises:
means for constructing a first reference picture subset that identifies short-term reference pictures that are prior to the current picture in decoding order and prior to the current picture in output order and that can potentially be used for inter-predicting the current picture and one or more of the one or more pictures following the current picture in decoding order, and excludes short-term reference pictures that are prior to the current picture in output order and cannot be used for inter-predicting the current picture;
means for constructing a second reference picture subset that identifies short-term reference pictures that are prior to the current picture in decoding order and subsequent to the current picture in output order and that can potentially be used for inter-predicting the current picture and one or more of the one or more pictures following the current picture in decoding order, and excludes short-term reference pictures that are subsequent to the current picture in output order and cannot be used for inter-predicting the current picture; and
means for constructing a third reference picture subset that identifies long-term reference pictures that are prior to the current picture in decoding order and that can potentially be used for inter-predicting the current picture and one or more of the one or more pictures following the current picture in decoding order, and excludes long-term reference pictures that are prior to the current picture in decoding order and that cannot be used for inter-predicting the current picture;
means for determining which reference pictures are usable for inter-prediction of the current picture based on which pictures are identified in the first, second, and third reference picture subsets after construction of the first, second, and third reference picture subsets;
means for constructing, subsequent to determining which reference pictures are usable for inter-prediction of the current picture, an initial reference picture list based on reference pictures in the first, second, and third reference picture subsets that are determined to be usable for inter-prediction of the current picture;
means for identifying a reference picture, wherein the reference picture is in at least one of the first, second, or third reference picture subsets based on reference picture list modification of the initial reference picture list being needed after the construction of the initial reference picture list;
means for adding the identified reference picture in a current entry of the initial reference picture list to construct a modified reference picture list based on reference picture list modification of the initial reference picture list being needed after the construction of the initial reference picture list; and
means for coding the current picture based on the modified reference picture list based on reference picture list modification of the initial reference picture list being needed after the construction of the initial reference picture list.

24. The device of claim 23, wherein means for identifying the reference picture comprises:
means for determining an index into at least one of the constructed reference picture subsets; and
means for determining the reference picture identified at an entry of the at least one of the constructed reference picture subsets based on the determined index.

25. The device of claim 24, wherein the means for determining the index comprises:
means for coding a first syntax element to identify the at least one of the constructed reference picture subsets from which the reference picture is identified; and
means for coding a second syntax element that indicates the index into the at least one of the constructed reference picture subsets.

26. The device of claim 23, further comprising:
means for moving reference pictures identified in the initial reference picture list in entries following the current entry to a next entry to construct the modified reference picture list based on the reference picture list modification of the initial reference picture list being needed after the construction of the initial reference picture list.

27. The device of claim 23, further comprising:
means for coding a syntax element that indicates that the reference picture list modification is needed.

\* \* \* \* \*